United States Patent [19]

Hasegawa et al.

[11] Patent Number: 4,859,840
[45] Date of Patent: Aug. 22, 1989

[54] CODE READING APPARATUS

[75] Inventors: Kazuo Hasegawa; Junichi Ouchi; Hiroaki Sasaki; Koji Nakase; Makoto Sasaki, all of Furukawa, Japan

[73] Assignee: Alps Electric Co., Ltd., Japan

[21] Appl. No.: 208,182

[22] Filed: Jun. 16, 1988

[30] Foreign Application Priority Data

| Oct. 30, 1987 | [JP] | Japan | 62-275037 |
| Oct. 30, 1987 | [JP] | Japan | 62-275036 |
| Nov. 30, 1987 | [JP] | Japan | 62-300114 |
| Nov. 30, 1987 | [JP] | Japan | 62-300112 |
| Feb. 5, 1988 | [JP] | Japan | 63-23928 |
| Feb. 13, 1988 | [JP] | Japan | 63-30030 |
| Feb. 13, 1988 | [JP] | Japan | 63-16999 |
| Feb. 25, 1988 | [JP] | Japan | 63-40616 |

[51] Int. Cl.$^4$ ............................................. G06K 7/10
[52] U.S. Cl. ..................................... 235/463; 235/472
[58] Field of Search ................................. 235/463, 472

[56] References Cited

U.S. PATENT DOCUMENTS 4,180,204  2/1979  Koenig ........................... 235/472 X
4,608,487  8/1986  Awane et al.

Primary Examiner—Harold I. Pitts
Attorney, Agent, or Firm—Guy W. Shoup; Paul J. Winters

[57] ABSTRACT

A code reading apparatus of a bar code reader which has detecting means for outputting a reading signal responsive to the code displayed on a medium, edge detecting means for detecting the edge of the reading signal, counting means for starting counting each edge detected by the edge detecting means. Discriminating means outputs a reset signal to decoding means when the counted value started for counting by the counting means is a product or more of the quotient produced by dividing the allowable maximum width of the code by the allowable minimum width and the counted value counted between the edges immediately before by the counting means, when the quotient produced by dividing the counted value started for counting by the counting means by the counted value counted between the edges immediately before is a quotient or more produced by dividing the allowable maximum width of the code by the allowable minimum width. Thus, the apparatus can discriminate the start even if the starting margin before the code of the bar code is short.

17 Claims, 36 Drawing Sheets

FIG. 10
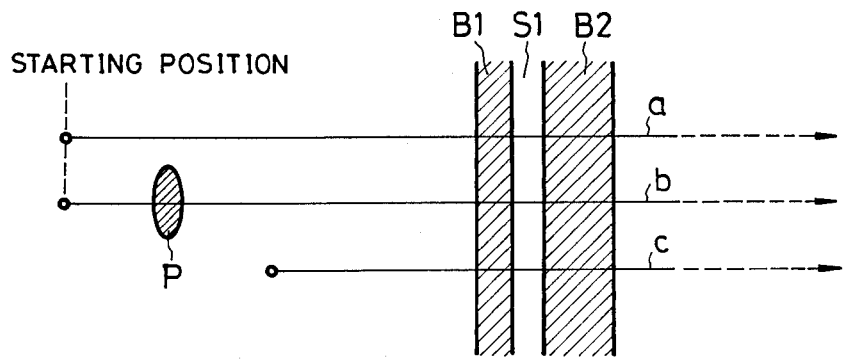
FIG. 11
(a) WHEN STARTING POSITION IS SUFFICIENTLY SEPARATED FROM BAR CODE.
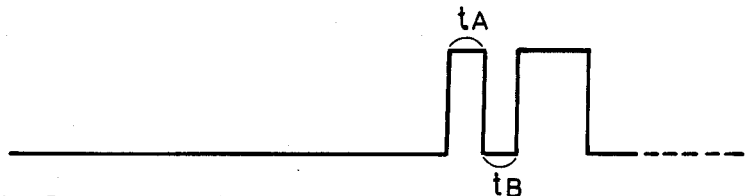
(b) WHEN STARTING POSITION IS SUFFICIENTLY SEPARATED FROM BAR CODE.
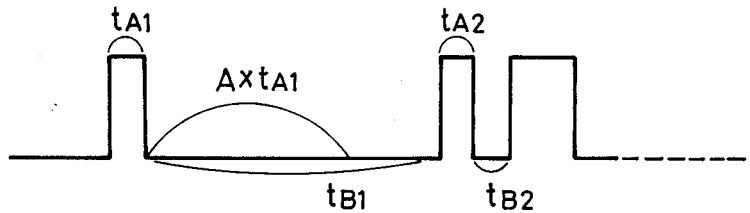
(c) WHEN STARTING POSITION IS APPROACHED TO BAR CODE.
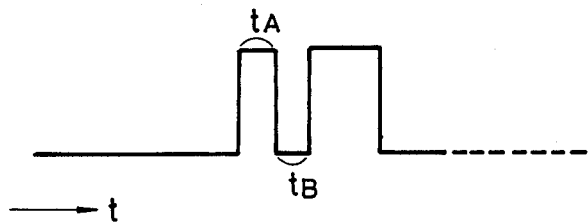

FIG.12
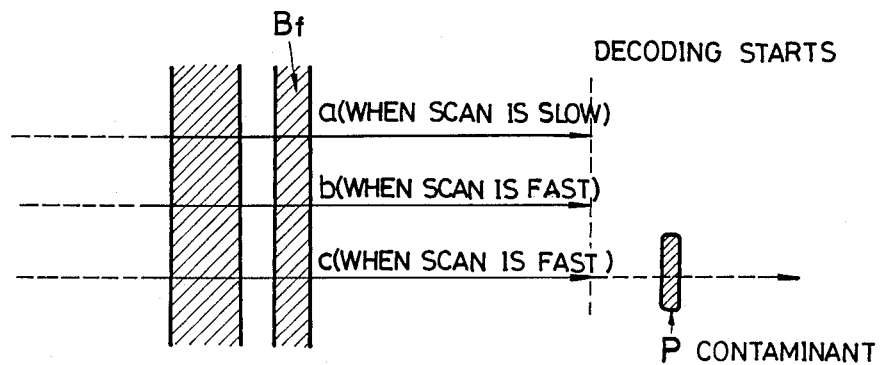
FIG.13
(a) SIGNAL WAVEFORM
(WHEN SCANNING SPEED IS SLOW)
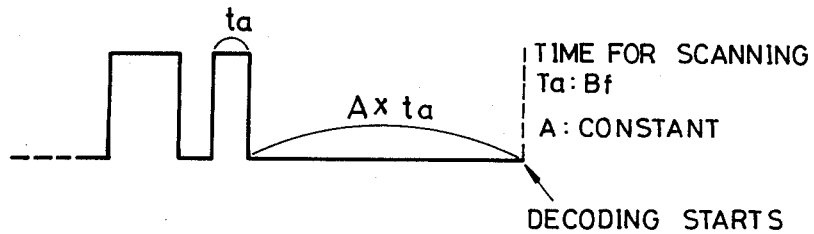
TIME FOR SCANNING
Ta:Bf
A:CONSTANT
DECODING STARTS
(b) SIGNAL WAVEFORM
(WHEN SCANNING SPEED IS FAST)
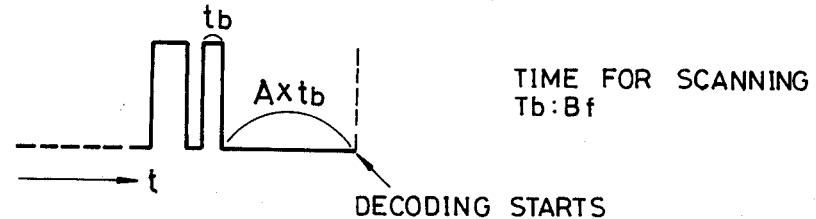
TIME FOR SCANNING
Tb:Bf
DECODING STARTS
(c) SIGNAL WAVEFORM
(WHEN SCANNING SPEED IS FAST)
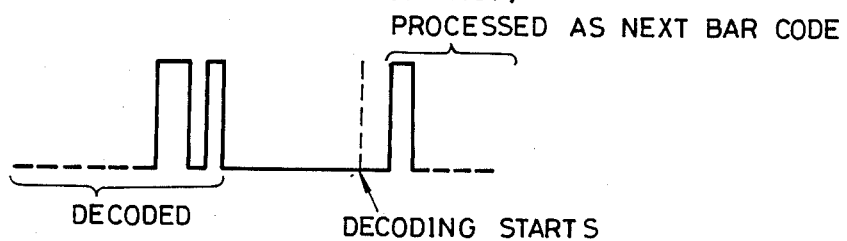
PROCESSED AS NEXT BAR CODE
DECODED     DECODING STARTS

FIG. 21
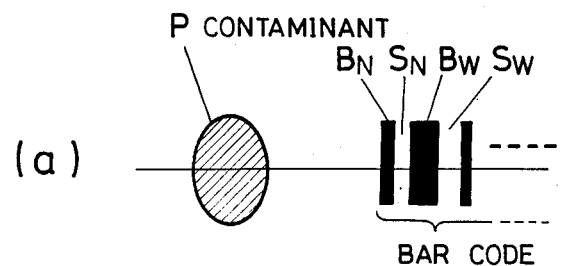
(a)
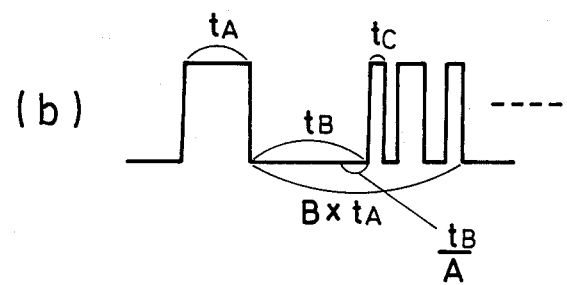
(b)
START IS DISCRIMINATED BY $T_B/A\ t_C$

FIG.23
(a)
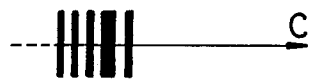
(b)
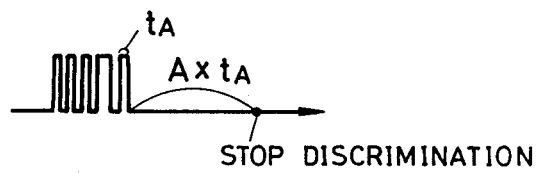
STOP DISCRIMINATION
(c)
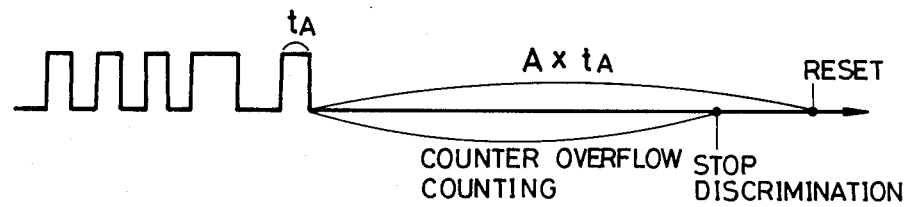
COUNTER OVERFLOW  STOP
COUNTING         DISCRIMINATION FIG. 27
(a)
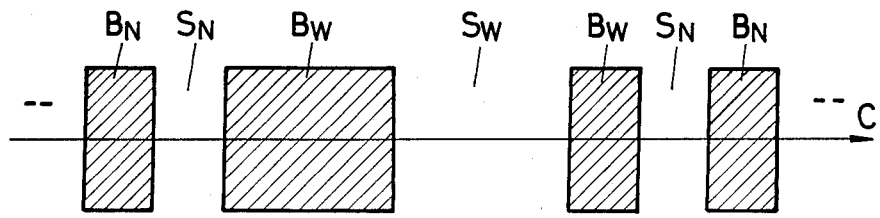
(b)
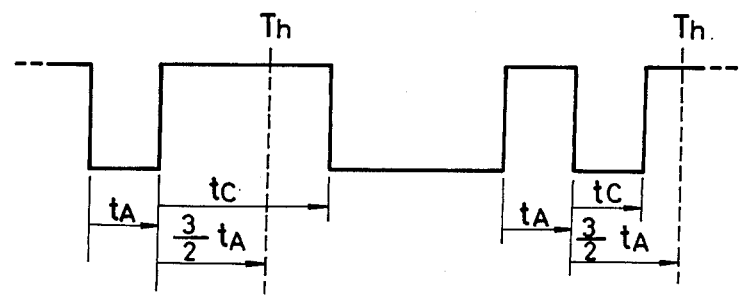
(c)
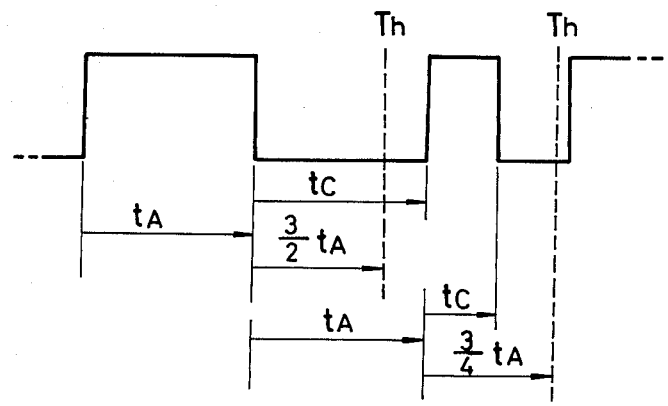

FIG.39
PRIOR ART
(a) 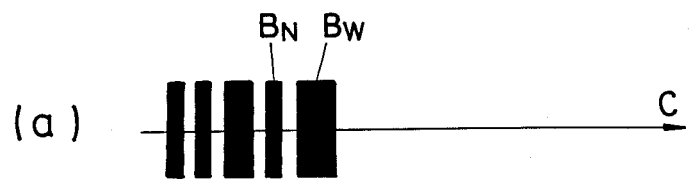
(b) 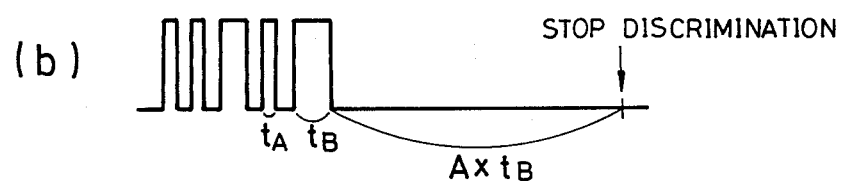
FIG.40
PRIOR ART
(a) 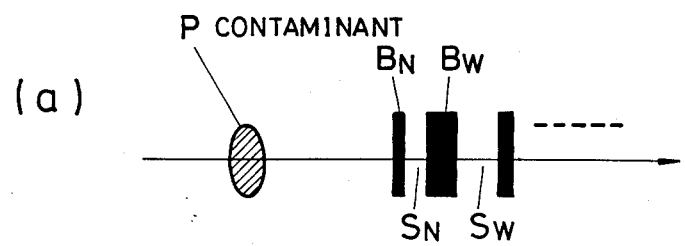
(b) 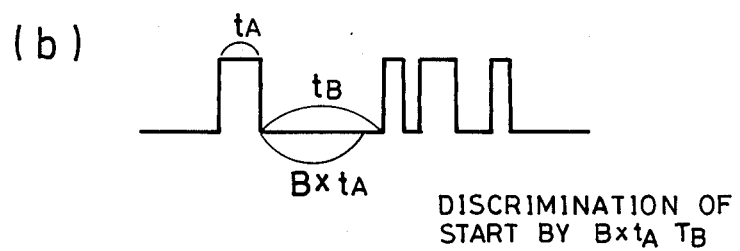
DISCRIMINATION OF START BY $B \times t_A$ $T_B$

CODE READING APPARATUS

BACKGROUND OF THE INVENTION

1. This invention relates to a code reading apparatus for reading a code (e.g., a bar code) displayed on a medium by scanning it with a photoelectric converter to decode information indicated by the code into a signal to be processed by a computer, thereby outputting the signal and, more particularly, to a code reading apparatus improved in a reading and decoding probability due to the difference of scanning speeds.

2. Description Of The Prior Art

A code reading apparatus of this type is operated to photoelectrically convert a code displayed by various types of code systems on a medium, such as a document or the surface of an article by a scanner, such as an optical reader to decode it into a signal to be processed by a computer, such as a microprocessor and to output it. The code to be displayed includes an exclusive display code, such as a bar code, a calra code, or a general character, and a predetermined standard is provided as a displaying method for decoding the code. There are regulations regarding the displaying interval and range as the standards. For example, there are a regulation of Japanese Industrial Standards (JIS X 0502) for a bar code on pages 3 to 9 (first issue on April 30, 1987) and a regulation of American National Standard (ANSI MH10 8M-1983) on page 8. These displays have a priority difference of compensating range of scanning speed on a bar code displaying portion in cases of not only a pen type but a self-scanning type of hand wand model or installation type of representative optical reader as a scanner, and it is difficult to judge the start and the stop of the code due to the remarkable change of displaying environment as the objects and utilities are variously raised and tends to reduce the decoding probability.

An example of a conventional code reading apparatus of a bar code reader will be described as a representative example of the code reading apparatus of this type with reference to FIGS. 29 and 30. FIG. 29 is a block circuit diagram of a code reading apparatus of a conventional bar code reader, and FIG. 20 is a view for explaining the operation of the bar code reader.

In FIG. 29, a code in which spaces each having a high optical reflection efficiency and bars each having high optical absorptivity of two states are alternately displayed on a medium is detected by a photoelectric converter 1, and converted into an electric signal of predetermined voltage levels, in such a manner that the white space having a high optical reflectivity is converted to a low level (hereinafter referred to an "L") and a black bar having a high optical absorptivity is converted to a high level (hereinafter referred to an "H") of a read signal by a binary circuit 2 of detecting means into a binary signal. The binary signal is applied through a normally open first switch 3 to an edge detector 4 and a fall detector 5. The fall detector 5 detects the edge switched from "H" to "L" at the output of the binary circuit 2 in such a manner that the photoelectric converter 1 is opposed to the white of the start margin provided immediately before the bar code to output a short pulse-like edge detection signal. This edge detection signal is applied to a counter 6 to reset the counter 6 and to start counting incoming clocks, and also to a first self-holding circuit 7 to set the self-holding. The first switch 3 is closed by a slight delay from the edge detection signal by the set state of the first self-holding circuit 7. The edge detector 4 of edge detecting means detects both the edges switched from "L" to "H" and "H" to "L" after the binary signal outputted from the binary circuit 2 by the closure of the first switch 3 to output a short pulse-like edge detection signal. The edge detection signal of the edge detector 4 is applied to the counter 6 of counting means to reset the counter 6 and to start counting, also applied to a normally closed second switch 8 and a normally opened third switch 9, and further applied to the second self-holding circuit 10 to set the self-holding. The third switch 9 is closed by a slight delay by the set of the second self-holding circuit 10, and the following edge detection signal is applied to a bit image converter 11. A counted value of the incoming clock between the edge detection signal and the next edge detection signal by the counter 6 is applied to a comparator 12 and the bit image converter 11. When the counter 6 overflows, a reset signal is outputted to a reset line 13 to reset the counter 6. The counter 6 does not start counting at this time. Another reset signal, not shown, to reset the counter 6 is supplied to the reset line 13 when a power source is energized and by external resetting means. The comparator 12 compares the counted value with a constant value stored in advance in a constant circuit 14 to output a signal in case that the counted value is equal to or larger than the constant value. This signal is applied through a fourth normally open switch 15 to an image character converter 16 as a decode signal, also applied to a third self-holding circuit 17 to set the self-holding. The second switch 8 is opened by a slight delay from the signal from the comparator 12 by the set state of the third self-holding circuit 17, and the fourth switch 15 is closed by a slight delay from the signal. The edge detection signal outputted from the edge detector 4 is applied as a reset signal to the reset line 13 in the state that the second switch 8 is closed. The bit image converter 11 reads the counted value by the edge detection signal applied through the third switch 9 to convert it to an image signal and outputs it to the image character converter 16. The image character converter 16 converts the image signal to a character signal, and outputs the signal applied through the fourth switch 15 as a decode signal to an output circuit 18. The image character converter 16 outputs the reset signal to the reset line 13 if it cannot convert the image signal to the character signal, and resets by itself. When the reset signal is applied from the reset line 13, the image signal and the character signal stored in a memory are cleared. The output circuit 18 converts the character signal to an output format suitably adapted for an external unit to output it, and outputs the reset signal to the reset line 13 when the output is finished. The reset signal of the reset line 13 is further applied to the first, second and third self-holding circuits 7, 10 and 17 to reset the self-holding. The constant value stored in advance in the constant circuit 14 is so set that the photoelectric converter 1 is scanned on the bar code at an ordinary speed to be larger than the counted value obtained from the wide space and the wide bar and to be marginal value by sufficiently considering the variation in the scanning speed of the photoelectric converter 1. Decoding means is formed by the bit image converter 11, the image character converter 16 and the output circuit 18.

The configuration having the above-mentioned start judging sequence is explained with reference to Table 1 in "Manufacture of Bar Code System" described on pages 438 to 451 of the magazine "Transistor Technique" issued by CQ Publishing company, in Japan on Apr. 1, 1984, and the content partly corrected is disclosed in Table 2 of "Manufacture of Bar Code System" described on pages 179 to 199 of "Transistor Technique Edition" of separate volume issued by CQ Publishing company, in Japan on July 1, 1984.

In this configuration, as shown in FIG. 30(1)(a), a sufficient starting margin is provided before the bar code. Thus, when the photoelectric converter 1 is scanned from the starting position sufficiently separated from the bar code on the bar code, the binary circuit 2 outputs the binary signal as shown in FIG. 30(2). The edge (1) falling from "H" to "L" is detected by the fall detector 5, and the counter 6 then starts counting. Then, a counted value ta until the edge (2) rising from "L" to "H" by the initial bar is detected by the edge detector 4 becomes larger than the constant value and the counted value becomes equal to or larger than the constant value before the photoelectric converter 1 arrives at the initial bar. Thus, the comparator 12 outputs a signal, the third self-holding circuit 17 is set, and the second switch 8 is opened. Then, even if the edge detector 4 outputs an edge detection signal at the edge (2) in FIG. 30(2), it is not applied as a reset signal to the reset line 13. The counter 6 starts counting by the edge detection signal at the edge (2) in FIG. 30(2), the second self-holding circuit 10 is set, the third switch 9 is closed, the bit image converter 11 is sequentially reads the counted value counted by the counter 6 between the edge and the next edge by the following edge detection signal. Thus, a suitable start is judged. When the bar code is completely scanned, the variation in the binary signal of the binary circuit 2 is finished, the edge detection signal is not outputted from the edge detector 4, the counted value of the counter 6 is increased, the counted value becomes equal to or smaller than the constant value, and the comparator 13 outputs a signal. Here, the fourth switch 15 is closed, and the signal of the comparator 12 is applied as a decode signal to the image character converter 16 to judge the stop.

A conventional code reading apparatus for judging the final display for a bar code reader will be described as a representative example of such a code reading apparatus with reference to FIGS. 31 and 32. FIG. 31 is a block circuit diagram of a final display discriminator of a conventional bar code reader, and FIG. 32 is a view for explaining the operation of the circuit in FIG. 31.

In FIG. 31, a code in which spaces each having a high optical reflection efficiency and bars each having high optical absorptivity of two states are alternately displayed on a medium is detected by a photoelectric converter 1, and converted into an electric signal of predetermined voltage levels, in such a manner that the white space having a high optical reflectivity is converted to a low level (hereinafter referred to an "L") and a black bar having a high optical absorptivity is converted to a high level (hereinafter referred to an "H") of a read signal by a binary circuit 2 of detecting means into a binary signal. The binary signal is selectively applied through a first switching unit 3 to a space detector 4 or a second switching unit 5. The space detector 5 outputs a short pulse-like space detection signal when the binary signal is "L", and this space detection signal is applied to the first switching unit 3, a counter 6 of counting means and a third normally open switching unit 7. The first switching unit 3 is selectively switched by a slight delay from the space detection signal from the space detector 4 to the second switching unit 5 by the space detection signal, and selectively switched to the space detector 4 by the reset signal from a reset line 8. The second switching unit 5 selectively applies the binary signal to a first edge detector 9 or a second edge detector 10 of edge detecting means. The first edge detector 9 detects an edge from "L" to "H" of the initial bar of the binary signal to output a short pulse-like edge detection signal, and applies the edge detection signal to the second switching unit 5, the counter 6, a first margin comparator 11 and a normally open fourth switching unit 12. The second switching unit 5 is selectively switched by a slight delay from the edge detection signal from the first edge detector 9 to the second edge detector 10 by the edge detection signal of the first edge detector 9, and selectively switched to the first edge detector 9 by the reset signal rom the reset line 8. The second edge detector 10 detects an edge thereafter switched from "H" to "L" of the end of the initial bar of the binary signal to output a short pulse-like edge detection signal, and applies the edge detection signal to the counter 6, a bit image converter 13 and a normally open fifth switching unit 14. The counter 6 is reset by the space detection signal from the space detector 4, the edge detection signals from the first and second edge detectors 9, 10 and the reset signal of the reset line 8, starts counting, and applies the counted value of incoming clocks between the space detection signal and the edge detection signal and between the edge detection signal and the next edge detection signal to the third switching unit 7 and an overflow comparator 15. Another reset signal, not shown, to reset the counter 6 and to newly start counting is supplied to the reset line 8 when a power source is energized and by external resetting means. A first constant register 16 is set in advance with a large first constant value smaller than the maximum counted value of the counter 6. The overflow comparator 15 compares the first constant value with the counted value, and outputs a reset signal to the reset line 8 when the counted value is larger than the first constant value. The third switching unit 7 is closed by the space detection signal, and opened by the reset signal from the reset line 8. The counted value is applied through the third switching unit 7 to a first counter memory 17 and a second counter memory 18. The counted value stored in the first counter memory 17 is compared by the first margin comparator 11 with the second constant value set in advance in a second constant register 19. The second constant value is set to a value equal to or larger than the counted value obtained from a wide space to be scanned on a bar code at a normal speed and marginal by sufficiently considering the variation in the scanning speed of the photoelectric converter. The first margin comparator 11 outputs a reset signal to the reset line 8 if the counted value is smaller than the second constant value when the edge detection signal is applied from the first edge detector 9. The counted value stored in the second counter memory 18 is applied to a fifth switching unit 14 and a second margin comparator 20. The fifth switching unit 14 is closed whenever the edge detection signal is applied from the second edge detector 10 to apply the counter value of the second counter memory 18 to the bit image converter 13. The counted value of the second counter memory 18 is compared with the third constant value set in advance in a third constant register 21 by the second margin comparator 20, and applies a decision signal to the fourth switching unit 12 when the counted value is equal to or larger than the third constant value. The third constant value is set to a value larger than the counted value obtained from a wide space by scanning it on a bar code at a normal speed by the photoelectric converter 1 and marginal by sufficiently considering the variation in the scanning speed of the photoelectric converter. The fourth switching unit 12 is closed by the edge detection signal of the first edge detector 9 and opened by the reset signal of the reset line 8. The decision signal is applied through the closed fourth switching unit 12 to a bit image memory 22 and a character converter 23. The bit image converter 13 reads the counted value of the second counter memory 18 in response to the edge detection signal from the second edge detector 10 to suitably convert it to an image signal, stores it in the bit image memory 22, and outputs the reset signal to the reset line 8 if it cannot convert it to an image signal. The stored value is read in the bit image memory 22 by the decision signal from the second margin comparator 20, applied to the character converter 23, and the stored value is cleared by the reset signal of the reset line 8. The character converter 23 converts the image signal by the decision signal into a character signal to apply it to an output circuit 24, and outputs the reset signal to the reset line 8 if it cannot convert it into a character signal. The output circuit 24 converts the character signal to a suitable output format adapted for an external unit to output it, and outputs a reset signal to the reset line 8 when it finishes to output it.

The configuration having the above-mentioned final display judging sequence is explained with reference to Table 1 in "Manufacture of Bar Code System" described on pages 438 to 451 of the magazine "Transistor Technique" issued by CQ Publishing company, in Japan on Apr. 1, 1984, and the content partly corrected is disclosed in Table 2 of "Manufacture of Bar Code System" described on pages 179 to 199 of "Sensor Interfacing No. 4" of "Transistor Technique" of separate volume and "Transistor Technique Edition" of separate volume issued by CQ Publishing company, in Japan on July 1, 1984.

In this configuration, a sufficient starting margin is provided before the bar code. Thus, when the photoelectric converter 1 is scanned from the starting position sufficiently separated from the bar code on the bar code, the binary signal becomes "L" by the starting margin, the space detection signal is outputted from the space detector 4, the binary signal is then switched by the initial bar from "L" to "H", and the counted value counted by the counter 6 becomes the second constant value or larger during a period until the edge detection signal is outputted by the first edge detector 9. Thus, the reset signal is not outputted from the first margin comparator 11, and a suitable start is judged. Here, if the photoelectric converter 1 is scanned from the position near the bar code and a contaminant exists on the way to the bar code, the counted value of the counter 6 is yet smaller than the second constant value when the edge detection signal is outputted from the first edge detector 9, the reset signal is outputted from the first margin comparator 11 to be suitably started.

When a suitable start is executed in this manner, an edge detection signal is outputted from the second edge detector 10 whenever the bar and the space is switched, and the counted value between the edge and the next edge is sequentially read by the bit image converter 13.

The photoelectric converter 1 is assumed to be scanned on a stop margin and further a contaminant D provided immediately after the end of the bar code as shown in FIG. 32(1) at the end of the bar code. Here, if the photoelectric converter 11 is scanned at a slow speed, the binary circuit 2 outputs a binary signal as shown in FIG. 32(2). If the binary signal becomes "L" by the end of the last bar and the counted value $t_1$ until it becomes again "H" is larger than the third constant value $t_c$, the second margin comparator 20 outputs a decision signal when the counted value becomes equal to the third constant value $t_c$, and the final display decision is suitably executed. The fourth switching unit 12 is closed at this time, the decision signal is applied to the bit image memory 22 and the character converter 23, and a suitable output is produced from the output circuit 24.

FIG. 33 is a block diagram for explaining a circuit arrangement of an optical code reading apparatus (hereinafter referred to as "a bar code reader") as a representative example of a code reading apparatus according to another prior art. Reference numeral 101 designates a photoelectric conversion unit, numeral 102 denotes a first space detection unit, numeral 103 depicts a first edge detection unit, numeral 104 indicates a counter unit, numeral 105 designates a start margin discriminator (start discriminator), numeral 107 denotes a decoder unit and numeral 110 depicts a stop margin discriminator (stop discriminator).

FIGS. 34 to 37 are explanatory views of the operation of a bar code reader shown in FIG. 33.

In FIG. 33, the photoelectric conversion unit 101 has a photoelectric converter 1 and a binary circuit 2. A code in which spaces each having a high optical reflection efficiency and bars each having high optical absorptivity of two states are alternately displayed on a medium is detected by a photoelectric converter 1, and converted into an electric signal a of predetermined voltage levels, in such a manner that the white space having a high optical reflectivity is converted to a low level (hereinafter referred to an "L") and a black bar having a high optical absorptivity is converted to a high level (hereinafter referred to an "H") of a read signal by a binary circuit 2 of detecting means into a binary signal b.

The first space detection unit 102 has a switching unit 3 and a space detector 4, and the binary signal b from the photoelectric conversion unit 101 is applied through the switching unit 3 to the space detector 4 or a switching unit 5. The switching unit 3 is connected to the side of the space detector 4 by a reset signal at the initial time. As shown in FIG. 34, the photoelectric conversion unit 101 supplies an "L" signal to the space detector 4 at the space (first space) forward of the displaying position when it starts scanning from the forward of the display position of the bar code. The output of the space detector 4 is applied to the first counter 8 of the counter unit 104, and a signal e is applied to a first counter 8 when a signal c obtained from the space immediately before by the space detector 4 is "L". The first counter 8 is cleared to "0" by the input of the output e and starts counting clock inputs.

The output e from the space detector 4 switches the switching unit 3 to the side of the first edge detection unit 103 to stand by for detecting the first edge. The first counter 8 counts the clocks corresponding to the continuous time of the output e. When the counted value arrives at the overflow value of the counter (e.g., in the state that the photoelectric conversion unit is stopped on the space), it is compared by the overflow comparator 10 with the overflow value set in a first constant register 9, a reset signal is outputted to reset the entire system including the first counter.

The counted value j counted by the first counter 8 is stored in a first counter memory 12 of the start margin discriminator 105 through a switching unit 11, and compared by a first margin comparator 14 with a set value of a second constant register 13 by a signal from a signal line h.

As shown by a in FIG. 34, the output j, i.e., the output 1 to be stored in the first counter memory 12 is represented by $t_M$ (counting time of a space immediately before the bar code, and a start margin time $t_s$ set in the second constant register 13 is provided. If $t_M$ is larger than $t_s$, it is judged that the starting position is sufficiently separated from the bar code as shown in FIG. 35(a).

As shown in FIG. 35(c), if $t_M$ is smaller than $t_s$ at this time, a reset signal is outputted from the first margin comparator 14 as that the start cannot be decided, and the reading operation is stopped.

As shown in FIG. 35(b), even if the starting position is sufficiently separated from the bar code, if there is a contaminant P on the way from the starting position, the counting time $t_{M1}$ from the starting position to the contaminant P and the counting time $t_{M2}$ from the contaminant P to the position of the bar code become smaller than $t_s$ ($t_{M1}$ is smaller than $t_s$, $t_{M2}$ is smaller than $t_s$), and it is judged that the start cannot be decided.

When the starting position is disposed near the bar code as shown in FIG. 34(c), the counting time $t_M$ from the starting position to the bar code becomes smaller than $t_s$, and it is also judged that the start cannot be decided.

In the cases of FIGS. 34(b) and 34(c), the reset signal is outputted from the start margin discriminator 105, and the bar code is not read.

In case that $t_M$ is larger than $t_s$ as shown in FIG. 34(a), the output e of the space detector is applied also to the switching unit 3 to switch the switching unit 3 to the side of the switching unit 5. Thus, a signal f converted from "L" to "H" by the variation (at a point (1) in FIG. 34) outputted from the photoelectric conversion unit 101 when arriving at the initial bar code from the space is detected by the first edge detector 6 of the first edge detection unit 103. When this is detected in this manner, the detection output h switches the switching unit 5 to the side of the second edge detector 7, and starts counting clocks applied to the first counter 8 of the counter unit 104. The switching unit 11 is switched to the side of the stop margin discriminator 110 by the output e of the space detector 4. The second edge detector 7 detects the next edge of the bar code, i.e., the variation of "H" to "L" at a point (2) in FIG. 34 to output a signal i.

The counted value counted by the first counter 8 from when the first edge detector 6 detects the first edge is stored in the second counter memory 15 of the stop margin discriminator 110 at a time point when he second edge detector 7 detects the second edge (at the time of the signal output of the signal line i), and the output O of the memory 15 is supplied from the signal line t through a switching unit 16 operated by the signal of the signal line i to the decoder unit 107. In other words, the counted value corresponding to the width of "bar B1" of the bar code from the point (1) to the point (2) in FIG. 34 is applied to the decoder unit 107 at this time.

Then, the variation of "H" to "L" at the point (2) from a in FIG. 34 and the variation of "L" to "H" of the point c in FIG. 34 are sequentially detected by the edge detector 7, and the counted value from the point (2) to the point (3) is applied to the decoder unit 107.

Similarly, the counted values corresponding to the widths of the space and the bar of the bar code are sequentially applied to the decoder unit 107.

As described above, the start margin discriminator 105 confirms whether the initial space satisfies the starting margin or not, and outputs a reset signal when it does not satisfy that to eliminate the start of the reading operation.

A switching unit 22 feeds a signal of a signal line u from the stop margin discriminator 110 to the decoder unit 107 when the signal of the signal line h from the first edge detection unit 103 is applied thereto.

The second constant register 13 of the start margin discriminator 105 is set in advance with a constant corresponding to the starting margin as described above, and applies its value n to the first margin comparator 14. The margin comparator 14 operates when the signal of the signal line h is inputted thereto to compare the counted value m from the first counter memory 12 with the signal n and outputs a reset signal when m is smaller than n to eliminate the reading operation of the bar code.

When the reading of the bar code is finished and a space is again scanned, the counted value (signal line 1) counted by the first counter 8 from the time point of variation at point (4) in FIG. 36 is stored in the second counter memory 15 of the stop margin discriminator 110. This counted value $t_N$ is compared by a second margin comparator with the value $t_c$ (signal line s) corresponding to the stop margin set in a seventh constant register 42.

The set value $t_c$ is set by considering the variation of the scanning speed by an operator or at the operating time of a bar code reader. If $t_c$ is smaller than $t_N$ as shown in FIGS. 37(a) and 37(b) corresponding to slow or fast time of the scanning speed shown by a or b in FIG. 36, it is judged that the bar code is finished to read, the switching unit 22 is switched, and a decode command is applied as a comparison signal v to the decoder unit 107.

As shown at c in FIG. 36, when a contaminant P' exists on a space obtained as a stop margin and $t_N$ is smaller than $t_c$, there is a possibility that it is erroneously read as a bar code as shown in FIG. 37(c). As described above, the constant corresponding to the stop margin is set in advance in the seventh constant register 42, the value (s) is fed to the second margin comparator 20, and the signal u is applied through the switching unit 22 to the decoder unit 107 when the counted value of the bars or the spaces becomes the constant or larger.

In the description above, the levels of the signals are set to "L" or "H" in the state that the space is white and the bar is black, but they are not limited to them.

The prior art of this type is disclosed in Japanese Patent Publication No. 35707/1985.

In the prior art, since the start of the bar code is judged when the space immediately before the bar code is detected to be a predetermined constant distance (a distance longer than the width of a wide space) or longer or a predetermined time (a time longer than the counting time of the width of the wide space) or longer, the space immediately before the bar code is necessary to be the predetermined distance or time or longer.

Thus, it is difficult to densify the display of the bar code, and there is a high possibility that a contaminant exists on the space to be easily erroneously operated.

Since the decoding operation is controlled by regarding as the end of the bar code when the counted value of the bar or the space is equal to or larger than the predetermined value, the width of the space/the bar necessary for the stopping margin is varied according to the scanning speed of the bar code reader. Thus, the width of the stopping margin must be increased to correspond to the fast scanning speed, it is difficult to densify the display of the bar code, and there is a high possibility that a contaminant exists on the margin to be easily erroneously operated.

In order to countermeasure it, it is proposed to minimize the starting and stopping margins to the necessary limit and to narrow the width of the bar or the space of the bar code itself to density it or to reduce the reading errors by judging the decision of the possibility of starting or stopping by comparing the counted value immediately before with the predetermined value or the value multiplied by the constant.

FIG. 38 is a block diagram showing the arrangement of the prior art. Reference numeral 101 designates a photoelectric conversion unit, numeral 102 denotes a first space detection unit, numeral 103 depicts a first edge detection unit, numeral 104 indicates a counter unit, numeral 106 designates a stop discriminator, numeral 107 denotes a decoder unit, numeral 108 indicates a first bar/space discriminator, numeral 109 designates a start discriminator, numeral 7 denotes a second edge detector, and numerals 11, 21, 22, 27, 31, 39 and 40 depict switching units.

The photoelectric conversion unit 101 first scans to read a code, such as a bar code by a photoelectric detector 1 to apply the read signal through a signal line a to a binary circuit 2 which converts it to binary level signals of "0" and "1" ("H", "L") and applies a conversion signal to the switching unit 3.

The switching unit 3 is initially connected by a reset signal to the side x in FIG. 38, and switched to the side y by the signal of a signal line e. Thus, the switching unit 3 connects a signal line b to a space detector 4 to apply an output to the signal line 3 when the signal of the signal line c corresponds to that of the space (e.g., "L") and switches itself to the side y. Thus, the signal b of the output line of the photoelectric conversion unit 101 is switched from the signal line d through the switching unit 3 to the switching unit 5. The switching unit 5 is connected by a reset signal to the side x. Thus, the signal line d is connected through a signal line f to the first edge detector 6.

The first edge detector 6 detects a variation of a signal from the signal line f from a space to a bar ("L" to "H") or a variation of a signal from the bar to the space ("H" to "L") when the signal from the signal line f is varied from the space to the bar or from the bar to the space and applies an output to a signal line h. An edge detection signal on the signal line h switches the switching unit 5 to the side 6 and is connected to the first counter 8 of the counter unit 104 to set the counted value of the first counter 8 to "0" to start counting of clocks CL. The first counter 8 similarly clears it to "0" by the input of the reset signal or the signal input on the output line i of a second edge detector 7 to be described later to start counting, and feeds the counted value to the signal line j. The counted value of the first counter 8 is compared by an overflow comparator 10 with the overflow value (constant) set in the first constant register 9 of an overflow detection unit 100, and a reset signal is outputted from the overflow comparator 10 when the counter 8 overflows (e.g., when a scanner is stopped on the way).

The second edge detector 7 inputs a signal from the photoelectric conversion unit 101 through the switching units 3 and 5 according to the detection of the first edge of the first edge detector 6 to supply a detection signal through the signal line i to the first counter 8 when the signal on the input signal line g is varied ("H" to "L" or "L" to "H"), and applies it to the second counter 28 of the first bar/space discriminator 108.

The first bar/space discriminator 108 detects the first bar and then counts the sum of the bar and the space, and outputs a signal to a signal line 30a when the content of the second counter 28 arrives at a value set in advance in a fourth constant register 29 (counts the numbers of the space and the bar to decide the start).

The second counter 28 sequentially increments the counter by a signal from the signal line i and applies the counted value to a signal lines 28a. The counter is cleared to "0" by the reset signal. The sum (2 or more) of the numbers of the bar and the space used to decide the start of the bar code is set in advance in the fourth constant register 29, and the value is fed by the signal lines 29a to a first margin comparator 30. The comparator 40 compares the counted value from the signal line 28a with the value from the signal line 29a, and outputs a signal to the signal line 30a when the counted value is equal to or larger than the set value of the fourth constant register 29.

The switching unit 31 applies a signal from the second edge detector to a start discriminator 109 and a switching unit 39 or a stop discriminator 106 and a switching unit 21. This switching is executed by the reset signal and the output signal of the first bar/space discriminator 108. When the reset signal is applied, the switching unit is switched from the side y to the side x, and when the signal is fed from the signal line 30a, it is switched from the side x to the side y.

The switching unit 11 is operated by the output signal of the first edge detector 6 from the signal h to feed the counted value from the counter 8 of the counter unit 104 to the start discriminator 109 and the stop discriminator 106.

The start discriminator 109 compares at least initial bar with the counted value of the space, and judges as a start if the counted value of the space or the bar (the content of the first counter memory 12) is less than the magnification of a predetermined constant (the content of the sixth constant register 36) of the counted value of the space or the bar immediately before (the content of the second previous counter memory 35) to apply a reset signal to the signal line 38a when it becomes the magnification or more of the predetermined constant. In other words, in case of judging the start, at least initial counted value of the bar or space is compared without observing the starting margin, and the reset signal is output to stop reading when judging no start as described above.

The first counter memory 12 stores the counted value from the signal line 1, and applies it to a signal line m. Then, the stored counted value is reset by the reset signal.

Larger counted value (than a wide bar or a space/slow scanning speed) is set in advance in the fifth constant register 33, applied to the signal line 33a, and stored in the second previous counter memory 35 through a switching unit 34 for connecting the signal line 33a to the signal line 32a only when the reset signal is applied thereto. The counted value thus stored is applied through the signal line 35a to a second multiplier 37, in which it is multiplied by the larger value than (wide bar or space/narrow bar or space) set in the sixth constant register 36. The multiplied result is supplied through the signal line 37a to a third margin comparator 38.

The third margin comparator 38 compares the output signal (counted value) of the first counter memory 12 from the signal line m with the multiplied output value of the second multiplier 37, and outputs a signal to the signal line 38a when the counted value is the multiplied output value or larger.

The switching unit 40 operates (i) to connect the signal line 38a to the reset line when the reset signal is inputted to output the signal from the signal line 38a as a reset signal, and (ii) to separate the signal line 38a from the reset output line when the signal from the signal line 30a (the output of the first bar/space discriminator 108) is inputted. The switching unit 32 connects the signal line m to the signal line 32a only when a signal is inputted from the signal line 31a, supplies the stored value of the first counter memory 12 to the second previous counter memory 35, and disconnect the signal line m from the signal line 32a except the above cases.

The switching unit 39 connects the signal line m to the signal line t only when the signal from the signal line 31a is inputted and supplies the value of the first counter memory 12 to the decoder unit 107.

The switching units 39, 21 are operated by the signal from the second edge detector 7, the switching unit 39 applies the counted value of the bar or space from the first counter memory 12 and the switching unit 21 applies the counted value of the bar or space from the second counter memory 15 to be described later, to the decoder unit 107.

The switching unit 27 is operated only when the signal from the signal line 30a is inputted, i.e., by the signal from the first bar/space discriminator 108 to lead the signal from the signal line m to the signal line p to supply the counted value of the final bar or space used to decide in the start discriminator 109 to the first previous counter memory 17 of the stop discriminator 106.

Then, the operation of the stop discriminator 106 will be described.

The stop discriminator 106 applies a signal to the signal line u when the counted value of the bar or space to be read at present, i.e., the content of the second counter memory 15 becomes the counted value of the space or bar immediately before, i.e., the magnification of the constant (the value set in the third constant register 18) of the content of the previous counter memory 17. The second counter memory 15 stores the signal from the signal line 1, i.e., the counted value of the first counter 8 of the counter unit 104, and applies it to the signal line o. The switching unit 16 connects the signal line o to the signal line p only when the signal from the signal line 31b, i.e, the output signal of the second edge detector 7 through the switching unit 31 is inputted and applies the value of the second counter memory 15 to the first previous counter memory 17. The first previous counter memory 17 stores the signal from the signal line p, and applies the value through a signal line q to the first multiplier 19. A value larger than the counted value of (wide bar or space/narrow bar or space) of the bar code is set in advance in the third constant register 18, the set value is applied through a signal line r to the first multiplier 19, multiplied by the value stored in the first previous counter memory 17, and outputted through the signal line s to the second margin comparator 20.

The second margin comparator 20 compares the value of the second counter memory 15 inputted through the signal line o with the multiplied output of the first multiplier 19, and applies a comparison output to the signal line 7 when the value from the second counter memory 15, i.e., the counted value of the first counter 8 of the counter unit 104 is the output value or more of the first multiplier 19.

The switching unit 22 which inputs the output of the stop discriminator 106 disconnects the signal line u from the signal line v when the reset signal is inputted, and connects the signal line u to the signal line v by the output signal from the first bar/space discriminator 108 from the signal line 30a. In other words, the output signal from the stop discriminator 106 is applied to the decoder unit 107 from when the first bar/space decision signal (starting margin decision signal) from the first bar/space discriminator 108 is inputted to control the decoding operation.

The decoder unit 107 decodes the meaning of the code of the bar code according to the counted value of the clock CL corresponding to the width of the bar or space of the read bar code, and has an arrangement as shown in FIG. 38.

The functions of the blocks of the decoder unit 107 shown in FIG. 38 are as described below.

The bit image converter 23 is operated by the detection output of the second edge detector 7 from the signal line i to convert the counted value inputted from the signal line t, and stores it through a signal line 2 in a bit image memory 24. When an error is generated at the time of the conversion, a reset signal is outputted. The bit image memory 24 operates (i) to store a bit image from the signal line w, (ii) to apply a bit image stored by a signal input from the signal line v through a signal line x to a character converter 25, and (iii) to clear the bit image stored when the reset signal is inputted.

The character converter 25 starts operating by a signal input from the signal line v, converts a bit image inputted from the bit image memory 24 into a character, and applies it, through a signal line y to the output circuit 26. If an error is generated in case of the character conversion, the reset signal is outputted.

The output circuit 26 applies a data character signal from the signal line y to an output line z, and supplies it to display means, not shown, or other information processor. The reset signal is outputted when the signal is completely outputted.

In the arrangement described above, to decide the starting margin or the stopping margin, the counted value of the present bar or space by scanning of reading the bar code is compared by the value multiplied by a predetermined constant of the counted value of the space or bar of the previous time. In other words, since the start or stop is judged in relation to the counted value at present with the counted value immediately before, the width of the space (for the starting margin or stopping margin) to be installed around a display code can be reduced and the width of the bar or space for forming the code is not according to the scanning speed of reading, the code display can be densified. Thus, the probability that a contaminant is adhered to the code display is reduced to decrease the occurrence of an erroneous operation.

In the prior art, since the decision of the stop is executed at the magnification of the constant of the counted value of the last bar or space, the stop deciding distance of twice or more of the case of the narrow bar or narrow space is required if the last bar or space is of a wide bar or a wide space.

FIG. 39 is an explanatory view of an example of discriminating the stop according to the prior art. FIG. 39(a) shows a bar code, where $B_N$ is a narrow bar, $B_W$ is a wide bar, and C is a scanning direction. FIG. 39(b) shows a waveform obtained by scanning the bar code of FIG. 39(a), where $t_A$ is the counted value of the narrow bar $B_N$, $t_B$ is the counted value of the wide bar $B_W$, and A is a predetermined constant.

As shown in FIG. 39, the stop is discriminated when it becomes the magnification of the predetermined constant (A) of the last bar or space (the wide bar $B_W$) in FIG. 39) of the bar code in the prior art arrangement in FIG. 38.

In the arrangement in FIG. 38, the start is discriminated by comparing the initial bar with the next space, the start is discriminated when the counted value of the next space is smaller than the value produced by multiplying the counted value of the minimum bar by the predetermined constant, the reading is then continued, while the reset is applied when it is larger than that, and new reading is started.

FIG. 40 is an explanatory view of the start discriminating operation according to the prior art, FIG. 40(a) shows a bar code, where P is a contaminant, $B_N$ is a first bar (narrow), and $S_N$ is a space (narrow), and FIG. 40(b) shows the reading waveform of FIG. 40(a) by the counted value of the clock, where $t_A$ is the counted value of the contaminant P, and B is set to a value larger than the constant (the wide bar or space/the narrow bar or space).

In the prior art described with respect to FIG. 38, the discrimination of the stop becomes difficult due to the difference of scanning speeds, and particularly to low scanning speed, and repeated reading operation might be performed.

More specifically, the photoelectric conversion unit 101 scans to read the bar code of the code, converts it to a binary level signal of "H", "L", and outputs it. The counter unit 104 counts and outputs the time of "H" and "L" from the photoelectric conversion unit 101 by a clock signal CL, and there are considered as the counting (i) a method of sequentially outputting the value (counted value) during counting, (ii) a method of outputting the counted value at each end of counting "H" and "L", and (iii) a method of temporarily storing the counted value of "H" and "L" and outputting it after the counting of the bar code is finished.

The start discriminator 109 discriminates the start by the counted value from the counter unit 104, and resets the operation of the counter unit 104 when a starting error is judged. The stop discriminator 106 discriminates the stop by the counted value outputted from the counter unit 04, and decodes the counted value outputted from the counter unit 104 by the decoder unit 107. The decoder unit 107 decodes the counted value from the counter unit 104, and outputs the resulting reading data.

FIG. 41 shows a block diagram showing other example of a conventional code reading apparatus, which is the same as that in FIG. 38 except that the functions of the start discriminator 109 and the stop discriminator 106 are executed by a common start/stop discriminator. Therefore, the description of FIG. 41 will be omitted for the same description as that in FIG. 38 regarding the start/stop discriminator.

In FIG. 41, the start/stop discriminator 110 has the functions of discriminating both the start and the stop, and the switching unit 31 for switching the edge detection signal of the edge detector 109 to the start discriminator 109 and the stop discriminator 106 is eliminated.

The start/stop discriminator 110 is operated to compare at least counted value of the initial bar and space, and applies a reset signal to a signal line 38a when the counted value (the content of the counter memory 12) of the space or bar becomes the magnification of a predetermined constant (the content of the sixth constant register 36) of the counted value (the content of the previous counter memory 35) immediately before. In other words, in case of discriminating the start, at least counted value of the initial bar and space is compared without observing the start margin, and the reset signal is outputted when no start is judged as described above.

The counter memory 12 stores the counted value from a signal line 1, and applies it to the signal line m. Then, the stored counted value is reset by the reset signal.

The larger counted value (than the wide bar or space/the slow scanning speed) is set in advance in the fifth constant register 33, the value is applied to the signal line 33a, and stored in the previous counter memory 35 through the switching unit 34 for connecting the signal line 33a to the signal line 32a only when the reset signal is inputted thereto. The stored counted value is applied through a signal line 35a to a multiplier 37, in which it is multiplied by the constant set in the sixth constant register 36, i.e., the larger value (than the wide bar or space/narrow bar or space). The multiplied result is supplied through a signal line 37a to a margin comparator 38.

The margin comparator 38 compares the output signal (counted value) of the counter memory 12 from the signal line m with the multiplied output value of the multiplier 37, and outputs a signal to the signal line 38a when the counted value is equal to or larger than the multiplied output value.

The switching unit 40 (i) connects the signal lie 38a to the reset line when the reset signal is inputted, and outputs the signal of reading stop from the signal line 38a as a reset signal, and (ii) disconnects the signal line 30a from the reset output line and connects the signal line 38a to the signal line v when the signal (the output signal of the first bar/space discriminator 108) from the signal line 30a is inputted thereto.

The switching unit 39 connects the signal line m to the signal line t only when the signal from the signal line i is inputted thereto, and supplies the value of the first counter memory 12 to the decoder unit 107.

The stop discrimination applies a signal to the signal line 37a when the counted value of the bar or space to be read at present, i.e., the content of the first counter memory 12 becomes the counted value of the space or bar immediately before, i.e., the magnification of the constant (the value set in the third constant register 36) of the content of the previous counter memory 35. The counter memory 12 stores the signal from the signal line 1, i.e., the counted value of the first counter 8 of the counter unit 104, and applies it to the signal line m. The switching unit 32 applies the value of the counter memory 12 to the previous counter memory 35 by the signal from the signal line i. The previous counter memory 35 stores the signal from the signal line 32a, and applies the value through a signal line 35a to the first multiplier 37. A value larger than the counted value of (wide bar or space/narrow bar or space) of the bar code is set in advance in the sixth constant register 36, the set value is applied through a signal line 38a to the multiplier 37, multiplied by the value stored in the previous counter memory 35, and outputted through the signal line 37a to the margin comparator 38.

The margin comparator 38 compares the value of the counter memory 12 with the multiplied output of the multiplier 37, and applies a comparison output to the signal line 38a when the value from the counter memory 12, i.e., the counted value of the first counter 8 of the counter unit 104 is the output value or more of the multiplier 37.

The switching unit 40 which inputs the output of the margin comparator 38 disconnects the signal line 38a from the signal line v when the reset signal is inputted thereto, and connects the signal line 38a to the signal line v by the output signal from the first bar/space discriminator 008 from the signal line 30a. In other words, the output signal from the stop discriminator 108 is applied to the decoder unit 107 from when the first bar/space decision signal (starting margin decision signal) from the first bar/space discriminator 108 is inputted to control the decoding operation.

The decoder unit 107 decodes the meaning of the code of the bar code according to the counted value of the clock CL corresponding to the width of the bar or space of the read bar code, and has an arrangement as shown in FIG. 38.

FIG. 28 is a schematic block diagram of a bar code reading apparatus for describing an example of a code reading apparatus of this type considered to compensate the variation of the scanning speed. Reference numeral 10 designates a photoelectric conversion unit, numeral 20 denotes a counter unit, numeral 30 depicts a start/stop discriminator, and numeral 40 indicates a decoder unit.

In FIG. 28, the photoelectric conversion unit 10 scans the bar code, converts it to a level signal of "H", "L", and outputs it. The counter unit 30 counts and outputs the time of "H" and "L" from the photoelectric conversion unit 10 by a clock signal CL, and there are considered as the counting (i) a method of sequentially outputting the value (counted value) during counting, (ii) a method of outputting the counted value at each end of counting "H" and "L", and (iii) a method of temporarily storing the counted value of "H" and "L" and outputting it after the counting of the bar code is finished.

The start/stop discriminator 30 discriminates the start/stop by the counted value from the counter unit 20, and resets the operation of the counter unit 20 when a starting error is judged. The stop discrimination decodes the counted value outputted from the counter unit 20. The decoder unit 40 decodes the counted value outputted from the counter unit 20 by the decoder unit 40. The decoder unit 40 decodes the counted value from the counter unit 20, and outputs the resulting reading data.

The decoder unit 40 has a function of converting (decoding) the counted value of the bar or space from the counter unit 20 into binary data ("1", "0"), and has a bit image converter 41, a bit image memory 42, a character converter 43, and an output circuit 44.

The bit image converter 41 compares the counted value of the clock signal CL corresponding to the bar or space from the counter unit 20 with a threshold value to convert it into a bit image signal, and stores it in the bit image memory 42. The character converter 43 converts the bit image signal from the bit image memory 42 into a character signal, and outputs it through the output circuit 44.

FIG. 42 shows a block diagram showing in detail the arrangement of the conventional bit image converter. A switching unit 51 connects the signal line w to the signal line 51a only when a switching signal from a comparator 68 to be described later is inputted thereto, and disconnects the signal line w from the signal line 51a except the case. A previous bit image memory 52 stores a bit image (corresponding to the bar or space read at present) from the comparator 68 inputted through the switching unit 51, and supplies the value through the signal line to a bit image discriminator 53, a switching unit 71 and a comparator 73. The bit image discriminator 53 discriminates the bit image read previously from the previous bit image memory 52, (i) applies a signal through a signal line 53a to a switching unit 69 when the bit image is "0", i.e., the narrow bar or narrow space of the bar code, and (ii) supplies a signal through a signal line 53b to the switching unit 71 when the bit image is "1", i.e., the wide bar or wide space of the bar code. The switching unit 71 supplies the signal of the signal line 52a through the signal line 71a to the previous bit image memory 72 only when the switching signal is inputted thereto. The comparator 73 compares the previous bit image value of the previous bit image memory 52 from the signal lines 52a with the before previous bit image value of the before previous bit image memory 72 from the signal line 72a, and applies a comparison output to the signal line 73a when the previous bit image value is not equal to the before previous bit image value. The switching unit 69 disconnects the signal line 53a from the signal line 69a only when the output of the comparator 73 is inputted from the signal line 73a thereto, and connects the signal line 53a to the signal line 69a except the case. The switching unit 70 disconnects the signal line 53b from the signal line 70a by the output of the comparator 73 from the signal line 73a, and connects the signal line 53b to the signal line 70a except the case.

A switching unit 54 supplies the counted value from a counter memory 67 through a signal line 67a to a previous counter memory 55 only when a switching signal is inputted thereto, and disconnects the signal line 67a from the signal line 54a except the case. The previous counter memory 55 stores the counted value of the counter memory 67 through the signal line 67a, the switching unit 54 and the signal line 54a. A multiplier 56 triples the counted value of the previous counter memory 55 from the signal line 55a, and feeds the result through the signal line 56a to a divider 57.

The divider 57 divides the multiplication output of the multiplier 56 by 2, and applies the result through the signal line 57a to a switching unit 58.

The switching unit 58 connects the signal line 57a to the signal line 58a by the signal of the signal line 69a, and disconnects the signal line 57a from the signal line 58a when no signal exists on the signal line 69a.

A multiplier 59 triples the counted value of the previous counter memory 55, and applies the value through the signal line 59a to a divider 60. The divider 60 divides the multiplication output of the multiplier 59 by 4, and applies the result through the signal line 60a to a switching unit 61. The switching unit 61 connects the signal line 60a to the signal line 58a by the signal of the signal line 70a, and disconnects the signal line 60a from the signal line 58a except the case.

A switching unit 74 stores the counted value of the previous counter memory 55 through the signal line 55a in a before previous counter memory 75 from the signal line 74a only when a switching signal is inputted thereto. The counted value stored in the before previous counter memory 75 is added to the counted value stored in the previous counter memory 55 by an adder 76, and supplied through the signal line 76a to a divider 77. The divider 77 divides the addition output of the adder 76 by 2, and applies the division output through the signal line 77a to a switching unit 78. The switching unit 78 connects the signal line 77a to the signal line 58a by the signal on the signal line 73a, and disconnects the signal line 77a from the signal line 58a except the case.

A switching unit 62 connects the signal line 66a to the signal line 62a only when a switching signal is inputted thereto, and disconnects the signal line 66a from the signal line 62a except the case.

A previous Th value memory 63 for storing the previous threshold value stores the threshold value in the previous process, and applies it through the signal line 63a to an adder 64. The adder 64 inputs any signal from the switching units 58, 61 and 78 through the signal line 58a, adds it to the previous Th value stored in the previous Th value memory 63, and applies the addition result through the signal line 65a to a divider 65.

The divider 65 divides the addition result of the adder 64 by 2, and stores the result through the signal line 65a as this time threshold value in a Th value memory 66. The threshold value stored in the Th value memory 66 is supplied to the comparator 68, and used as a reference value for binarily judging the present counted value inputted through the signal line t (the counted number of clocks corresponding to the bar or space from the counter unit 20 in FIG. 28). In other words, the comparator 68 is operated when the edge detection signal (the detection signal of the trailing edge of the bar or space) from the signal line 9 introduced by edge detecting means, not shown, provided in the counter unit 20 is inputted thereto, compares the counted value inputted from the signal line t with the threshold value, (i) feeds a "1" signal to the signal line w (corresponding to the wide bar or wide space) and generates a switching signal in case that the counted value is larger than the threshold value, and (ii) applies "0" to the signal line w (corresponding to the narrow bar or narrow space) and supplies a switching signal in case that the counted value is smaller than the threshold value.

The counter memory 67 stores the counted value from the signal line t by the edge detection signal from the signal line i, and stores it through the signal line 67a and the switching unit 54 in the previous counter memory 55.

Then, the operation of the arrangement constructed as described above will be described.

FIG. 43 is an explanatory view of the operation of the arrangements in FIGS. 28 and 42, wherein FIG. 43(a) shows a bar code, FIGS. 43(b) to 43(e) are concept views for explaining the conversion of the counted value to the bit image.

In FIG. 43(a), $B_N$ is a narrow bar, $S_N$ is a narrow space, $B_W$ is a wide bar, $S_W$ is a wide space, and C is a scanning direction of reading. In FIGS. 43(b) to 43(e), $t_A$ is the counted value of the before previous bar or space, $t_B$ is the counted value of the previous bar or space, and $t_C$ is the counted value of the present bar or space (this time).

In the prior art shown in FIG. 42, the threshold value for discriminating the binary value ("1", "0") of the present bar or space is decided by observing how the previous bar or space and the before previous bar or space are. Thus, as shown in FIG. 42, the previous bit image memory 52 and the before previous bit image memory 72 are provided to detect the same or difference and the magnitude of both, i.e., the type of the narrow bar or space or the wide bar or space, and the previous counter memory 55 and the before previous counter memory 75 are provided to set the threshold value according to the detection of the same or difference and the type of both.

More specifically, as shown in FIG. 43(b), when both are narrow by the judgement of the counted values of the counted values $t_A$, $t_B$ of the previous and before previous bar or space, the previous counted value $t_A$ stored in the previous counter memory 55 through the switching unit 69 and the switching unit 58 is multiplied by 3/2 to produce a value $3/2(t_A)$, the value $3/2(t_A)$ is applied to the adder 64, the value Th is decided with the mean value of the value (i.e., the threshold value used to decide the before previous bar or space) of the previous Th value memory, applied to the comparator 68, and set to "1" in case that $t_C$ is larger than Th, or set to "0" in case that $t_C$ is smaller than Th.

Similarly, as shown in FIG. 43(c), when the previous and the before previous bar or space are both wide, the previous counted value $t_A$ is multiplied by $\frac{3}{4}$ by the switching units 61, 70 to produce $\frac{3}{4}(t_A)$, and the $\frac{3}{4}(t_A)$ is used as the threshold value.

As shown in FIGS. 43(d) and 43(e), when the previous and the before previous bar or space are different, the switching unit 78 is opened, and the mean value $\frac{1}{2}(t_A+t_B)$ of the previous and the before previous counted values is applied as the threshold value Th to the comparator 68.

In the process described above, an error is suppressed due to the printing error or the variation of the reading speed of the width of the bar code on the medium to be accurately read.

However, as shown in FIGS. 30(1)(b), if the contaminant D exists before the bar code, the suitable discrimination of the start cannot be decided by the conventional apparatus shown in FIG. 29 even if the photoelectric converter 1 is scanned on the bar code from the starting position sufficiently separated from the bar code.

The binary signal is outputted as shown in FIG. 30(3) from the binary circuit 2 by scanning the photoelectric converter 1 as shown in FIG. 30(1)(b). Then, the edge (1)' is detected by the fall detector 5, the counter 6 starts counting, and the counted value $t_{b1}$ until the edge (2)' is detected by the edge detector 4 is smaller than the constant value. Thus, a signal is not yet outputted from comparator 12, and the third self-holding circuit 17 remains the set state, and the second switch 8 remains closed. Then, the edge detection signal outputted from the edge detector 4 at the edge (2)' is applied through the second switch 8 to the reset line 13 as a reset signal to stop counting of the counter 6, and the first and second self-holding circuits 7, 10 are reset. Thus, the counted value between the edge (2)' and the next edge (3)' is not read in the bit image converter 11. Further, the edge (3)′ is detected by the fall detector 5 to start counting of the counter 6, but if the counted value $t_{b2}$ until the next edge (4)′ is detected by the edge detector 4 is smaller than the constant value, the edge detection signal of the edge (4)′ is, similarly to the above, applied as a reset signal to the reset line 13, and the counted value between the edge (4)′ and the next edge (5)′ is not read in the bit image converter 11. In this manner, if the contaminant D exists before the bar code, the sufficient starting margin is not to be provided, and suitable start cannot be discriminated.

As shown in FIG. 30(1)(c), even if the photoelectric converter 1 is scanned on the bar code from the starting position near the bar code, suitable start cannot be discriminated. Thus, the binary signal as shown in FIG. 30(4) is outputted from the binary circuit 1 by scanning the photoelectric converter 1 as shown in FIG. 30(1)(c). Then, the counted value $t_c$ counted between the edge (1)″ and the next edge (2)″ is smaller than the constant value, and the start cannot be discriminated similarly to the above.

If the bar code surface is contaminated, the width of the bar and the space is erroneously detected, and the bar code is not suitably read. Then, the conventional optical reader of the bar code reader presumes that the bar code surface is not contaminated if no contaminant D exists on the space of the predetermined width provided immediately before the bar code. Thus, the starting margin is provided immediately before the bar code to scan the starting margin by the photoelectric converter 1. The space of the width which is ten times as large as the narrow bar is provided as the starting margin.

Therefore, the code reading apparatus of the conventional bar code reader has a problem that the bar code cannot be densely disposed in the amount of providing the starting margin of sufficient width.

There is other conventional example of a code reading apparatus of the bar code reader which compares the value responsive to the time to the rise of the initial bar from the fall of the binary signal due to the start of scanning the photoelectric converter 1 with the product of the constant value of the value responsive to the elapsed time by the width of the initial bar to discriminate the start, but still needs the space as the starting margin of the width from the starting position of starting scanning to the initial bar.

SUMMARY OF THE INVENTION

Accordingly, a first object of this invention is to provide a code reading apparatus which can eliminate the above-described drawbacks of the prior art bar code reader and which can discriminate the start even if the starting margin before the code of a bar code is short.

If the conventional code reading apparatus shown in FIG. 31 is scanned at a fast speed, the binary signal as shown in FIG. 32(3) is outputted from the binary circuit 1 near the end of the bar code. Then, the binary signal becomes "L" at the end of the last bar, the time until the signal again becomes "H" is shortened so that the counted value $t_2$ might become smaller than the third constant value $t_c$. Then, the decision signal from the second margin comparator 20 is not outputted, and the contaminant D is read as part of the bar code. Then, the bit image converter 13 or the character converter 23 cannot suitably convert, but outputs a reset signal. Thus, suitable final display cannot be decided.

In the prior art apparatus as described above, the width of the space of the stopping margin necessary immediately after the bar code is different according to the scanning speed of the photoelectric converter 1, and the space of sufficient width must be provided as the stopping margin by considering that the photoelectric converter 1 is scanned at fast speed. Thus, there is a drawback that the bar code cannot be densely disposed, and the reading of the bar code is improperly executed due to the contaminant D adhered to the stopping margin.

A second object of this invention is to provide a code reading apparatus which can eliminate the drawback of a conventional code reading apparatus having the final display discriminator of the above-mentioned bar code reader and which can decide the final display even if the width of the stopping margin immediately after the code of the bar code is narrow.

In the code reading apparatus of the prior art described with respect to FIGS. 33 to 37, since the start of the bar code is discriminated when the space immediately before the bar code is detected at a predetermined distance (longer than the width of the wide space) or longer or a predetermined time (longer than the counting time of the width of the wide space) or longer, it is necessary to provide the space immediately before the bar code at the predetermined distance or longer or at the predetermined time or longer. Thus, it is difficult to densify the bar code display, there is high possibility that a contaminant is adhered to the space to be easily erroneously operated.

Since the decoding operation is controlled with the counted value of the bar or space to be regarded as the end of the bar code when the counted value of the bar or space is larger than the predetermined value, the width of the space/bar necessary for the stopping margin is varied according to the scanning speed of the bar code reader. Thus, the width of the stopping margin must be increased to correspond to the fast scanning speed, it is difficult to density the bar code display, there is high possibility that a contaminant is adhered to the margin to be easily erroneously operated.

A third object of this invention is to provide a code reading apparatus which can eliminate the above-mentioned drawback of the prior art and which can densify the display code of the bar code to reduce the reading erroneous operation.

In the conventional code reading apparatus described with reference to FIGS. 38 and 39, the margin (stopping margin) for discriminating the stop cannot be reduced to the counted value or smaller of the wide bar or wide space, and the margin space for the code display cannot be reduced less than that.

A fourth object of this invention is to provide a code reading apparatus which can set the margin space of minimum limit necessary to discriminate the stop irrespective of the size of the bar or space of the reading code.

In the arrangement in FIG. 38, the reading is continued if there is the margin (space) more than the magnification of the constant B of the counted value $t_4$ of the contaminated part of small size between the bar code and the contaminant even if the contaminant P exists before the bar code as shown in FIG. 40, but there is a drawback that, when the contaminant P is large or when the scanner of the apparatus body is started from the state disposed steadily on the contaminant, if next bar is scanned before the counted value of the contaminant becomes the magnification of the predetermined constant B, the contaminant is identified as the bar, resulting in an error.

A fifth object of this invention is to provide a code reading apparatus which can eliminate the drawback of the prior art and which can minimize the margin space necessary to discriminate the start irrespective of the size of the contaminant to reduce errors.

In the prior art shown in FIGS. 38 and 41, the end of the reading of the code (bar code), i.e., the decision of the stop is decided when the counted value of the bar or space reading at present becomes the magnification of the predetermined constant B of the counted value of the bar or space immediately before. This constant is set according to the ordinary average scanning speed of the photoelectric converter. Thus, if the scanning speed is slower than the average speed, the reset is executed before the stop is discriminated, the read code is cleared, and the reading must be again executed. If the width of the code for forming the bar code is large, there is a drawback that the error occurrence rate during reading increases. If the constant is et by considering such a slow scanning speed, it is necessary to increase the stopping margin, the code display space is increased, the capacity of the counter must be also increased to cause the cost to be increased.

A sixth object of this invention is to provide a code reading apparatus which can eliminate the drawbacks of the prior art and which can decode by discriminating the stop as long as a correct reading is executed even if the scanning speed for reading is slower than the average speed.

In the prior art described with reference to Figs. 8, 42 and 43, since the decision of the binary value of the bar or space reading at present (now) is made with the counted value of the previous and before previous bar or space, the circuit arrangement is complicated, and the processing time is lengthened. In case of the civil simple type, the reduction in size of the code reading apparatus is disturbed to increase its cost.

A seventh object of this invention is to provide a code reading apparatus which can eliminate the drawbacks of the prior art and which does not reduce the reading probability in a simple structure.

In order to achieve the above first object of the invention, there is provided according to first aspect of the present invention a code reading apparatus of a bar code reader comprising detecting means for outputting a reading signal responsive to the code displayed on a medium, edge detecting means for detecting the edge of said reading signal, counting means for starting counting each edge detected by said edge detecting means, and discriminating means for outputting a rest signal to decoding means for reading to decode the counted value when the counted value started for counting by said counting means is a product or more of the quotient produced by dividing the allowable maximum width of the code by the allowable minimum width and the counted value counted between the edges immediately before by said counting means, when the quotient produced by dividing the counted value started for counting by said counting means by the counted value counted between the edges immediately before is a quotient or more produced by dividing the allowable maximum width of the code by the allowable minimum width, or when the quotient produced by dividing the counted value started for counting by the quotient produced by dividing the allowable maximum width of the code by the allowable minimum width is the counted value or more counted between the edges immediately before.

In order to achieve the above second object of the invention, there is provided according to second aspect of the present invention a code reading apparatus having a final display discriminator comprising detecting means for outputting a reading signal responsive to the code displayed on a medium, edge detecting means for detecting the edge of said reading signal, counting means for starting counting each edge detected by said edge detecting means, and discriminating means for outputting a decision signal representing that the code displayed is final when the counted value started for counting by said counting means is a product or more of the quotient produced by dividing the allowable maximum width of the code by the allowable minimum width and the counted value counted between the edges immediately before by said counting means, when the quotient produced by dividing the counted value started for counting by said counting means by the counted value counted between the edges immediately before is a quotient or more produced by dividing the allowable maximum width of the code by the allowable minimum width, or when the quotient produced by dividing the counted value started for counting by the quotient produced by dividing the allowable maximum width of the code by the allowable minimum width is the counted value or more counted between the edges immediately before.

In order to achieve the above third object of the invention, there is provided according to third aspect of the present invention a code reading apparatus comprising a photoelectric conversion unit for reading a variation of space/bar by scanning a bar code, a counter unit for counting a clock in response to the output of said photoelectric conversion unit, a start/stop discriminator and a decoder unit, whereby said start/stop discriminator compares the counted value of at least initial bar with that of the space to monitor whether the counted value of the space or bar is the magnification of a predetermined constant of the counted value of the space or bar immediately before or not to produce a reset signal when the counted value is more or to decide the possibility of the start when the counted value is less and to judge whether the counted value of the present bar or space is the magnification of more of the predetermined constant of the counted value of the space or bar immediately before to apply a decode command to the decoder unit when the counted value is more for reading to obtain output data, or a code reading apparatus comprising a photoelectric conversion unit for reading a variation of space/bar by scanning a bar code, a counter unit for counting a clock in response to the output of said photoelectric conversion unit, a start discriminator, a stop discriminator and a decoder unit, whereby said start/stop discriminator compares the counted value of at least initial bar with that of the space to monitor whether the counted value of the space or bar is the magnification of a predetermined constant of the counted value of the space or bar immediately before or not to produce a reset signal when the counted value is more or to decide the possibility of the start when the counted value is less, said stop discriminator 106 judges whether the counted value of the present bar or space is the magnification of more of the predetermined constant of the counted value of the space or bar immediately before to apply a decode command to the decoder unit when the counted value is more for reading to obtain output data.

In order to achieve the above fourth object of the invention, there is provided according to fourth aspect of the present invention a code reading apparatus comprising minimum counted value memory means for storing the counted value corresponding to the minimum bar or minimum space of the read code, means for comparing the value produced by multiplying the minimum counted value by the magnification of a predetermined constant with the present counted value to decide the end of the code when the present counted value is large, and memory means for storing the minimum counted value of the code corresponding to the maximum of the reading speed (the maximum of the scanning speed of said photoelectric conversion unit), whereby the minimum counted value stored in the memory means is compared with the present counted value to apply the present counted value to said decoder unit when the present counted value is larger.

In order to achieve the above fifth object of the invention, there is provided according to fifth aspect of the present invention a code reading apparatus in which the present bar of space is compared with the space or bar immediately before to discriminate the present bar or space as the start when the present bar or space is smaller than 1 divided by the constant of the space or bar immediately before.

In order to achieve the above sixth object of the invention, there is provided according to sixth aspect of the present invention a code reading apparatus in which the overflow detection output of an overflow detector having a counter unit is used as a stop decision signal.

In order to achieve the above seven object of the invention, there is provided according to seventh aspect of the present invention a code reading apparatus in which the threshold value in case of converting the clock counted value of the bar or space into binary values of "1", "0" is set by calculating only with the counted value of the previous bar or space.

OPERATIONS

The first aspect of the invention operates as below. A reset signal is applied to the decoding means by the numerical relation between the counted value started for counting by the counting means and the counted value counted between the edges responsive to the width of the code immediately before to read the new counted value in the decoding means, and the counted value is continuously read without applying the reset signal to the decoding means.

The second aspect of the invention operates as below. The final display is decided by the numerical relation between the counted value started for counting by the counting means and the counted value counted between the edges responsive to the width of the code immediately before.

The third aspect of the invention operates as below. Since the discrimination of the start or the possibility of the stop is decided by comparing the counted value immediately before with the value of the predetermined constant or with the value multiplied by the predetermined constant, the starting or stopping margin can be minimized to the necessary limit, the width of the bar or space of the bar code itself can be densified, and the reading errors can be reduced, or since the discrimination of the start or the possibility of the stop is decided by comparing the counted value immediately before with the value of the predetermined constant or with the value multiplied by the predetermined constant, the starting or stopping margin can be minimized to the necessary limit, the width of the bar or space of the bar code itself can be narrowed to be densified, and the reading errors can be reduced.

The fourth aspect of the invention operates as below. Since the stop is discriminated according to the minimum counted value in the code reading step, it is not necessary to set the wide bar or space of the final bar or space of the code as in the prior art, and since the contaminant of the code to become the counted value smaller than the counted value of the code (bar or space) at the maximum scanning speed of the photoelectric converter to be presumed can be ignored, the errors can be reduced.

The fifth aspect of the invention operates as below. Since the start is discriminated by the relation between the initial bar of the code and the space immediately before, even if a large contaminant exists on the starting margin space of the bar code, it can be ignored to improve the reading probability.

The sixth aspect of the invention operates as below. Since the detection signal is used as the stop decision signal when the overflow of the counter is detected by the overflow detector of the counter unit, the decoder can be operated as the end of the bar code reading even if the scanning speed is slow, and the capacity of the counter can be reduced.

The seventh aspect of the invention operates as below. Since the threshold value can be set only by calculating 3/2 times or ¾ times of the previous counted value, the processing speed can be raised in a simple arrangement.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIGS. 5 to 15 are views for explaining embodiments according to third aspect of the invention;

FIG. 5, is a block diagram for explaining a first embodiment of the invention;

FIG. 6 is a block diagram showing a detailed arrangement of FIG. 5;

FIG. 7 is a block diagram showing the essential arrangement of start and stop discriminator of FIGS. 6, FIG. 8 is a block diagram showing the essential arrangement of modified embodiment of FIG. 7;

FIG. 9 is a block diagram showing the essential arrangement of modified embodiment of FIG. 8;

FIG. 10 is a view for explaining the operation of start discriminator of FIGS. 6, 15;

FIG. 11 (a)-(c), a waveform diagram of FIG. 10;

FIG. 12 is a view for explaining the operation of stop discriminator of FIGS. 6, 15;

FIG. 13,(a)–(c), a waveform diagram of FIG. 12;

FIG. 14 is a block diagram for explaining a second embodiment of the invention;

FIG. 15 is a block diagram showing a detailed arrangement of FIG. 14;

FIG. 21, (a) and (b), is a view for explaining the operation of FIG. 20;

FIG. 23, (a)–(c), is a view for explaining the operation of FIGS. 22, 24 and 25;

FIG. 26 is a block diagram of essential arrangement showing an embodiment of a code reading apparatus according to seventh aspect of the invention;

FIG. 27, (a)–(c), is a view for explaining the operation of FIG. 26;

FIGS. 29 to 43,are views for explaining the prior art of various examples.

DESCRIPTION OF THE PREFERRED EMBODIMENTS

Figure 1:
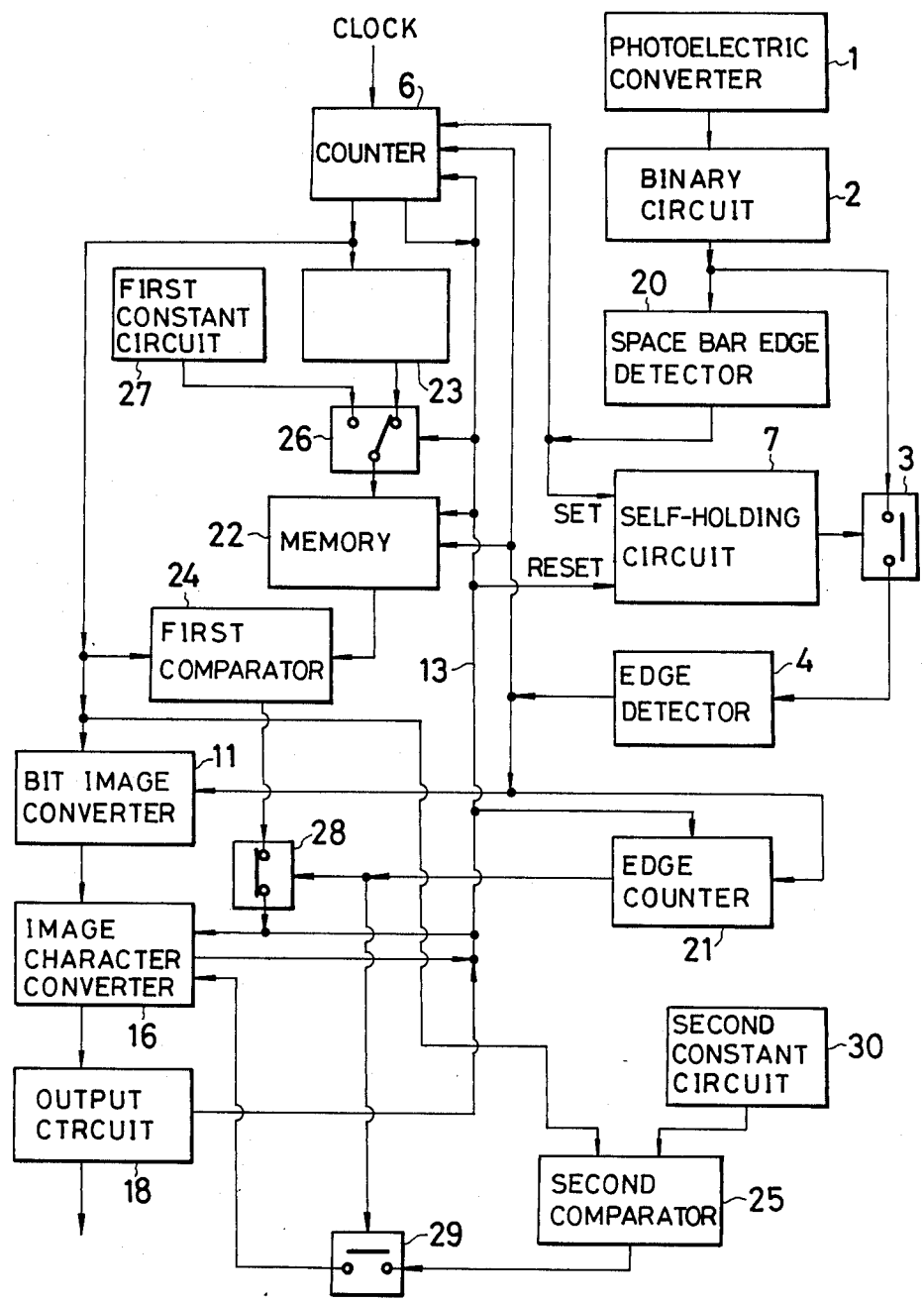
FIG. 1 is a block circuit diagram of an embodiment of a code reading apparatus of a bar code reader according to first aspect of the present invention.
Figure 2:
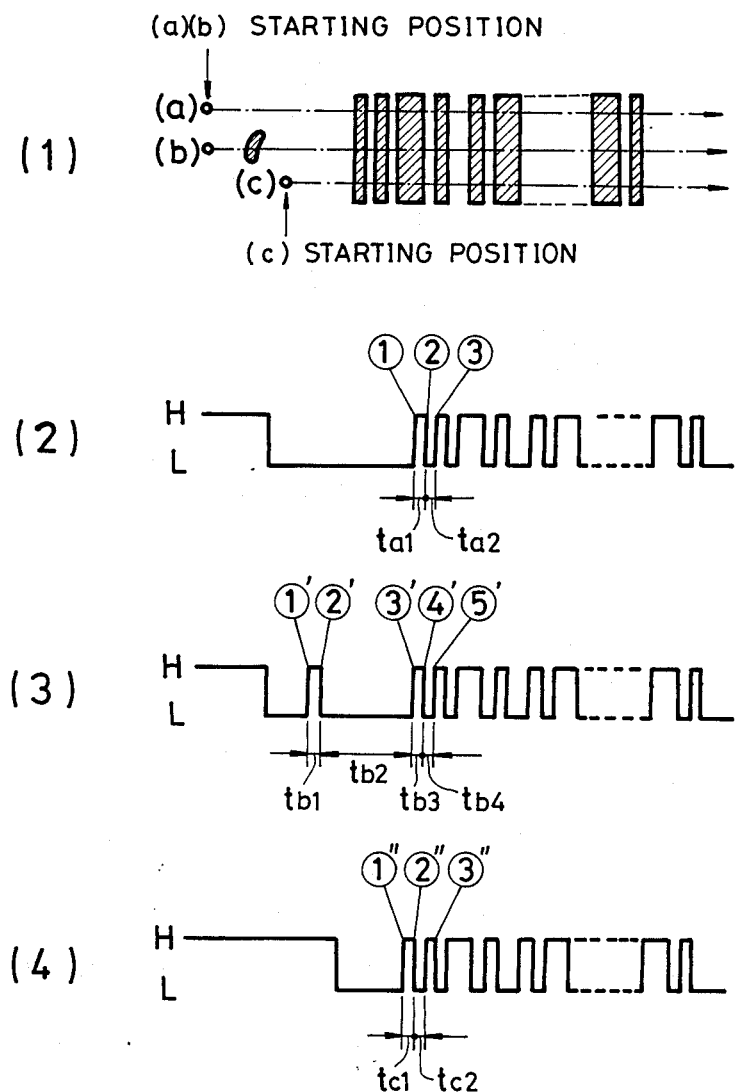
FIG. 2 is a view for explaining the operation of the apparatus of FIG. 1.
Figure 29:
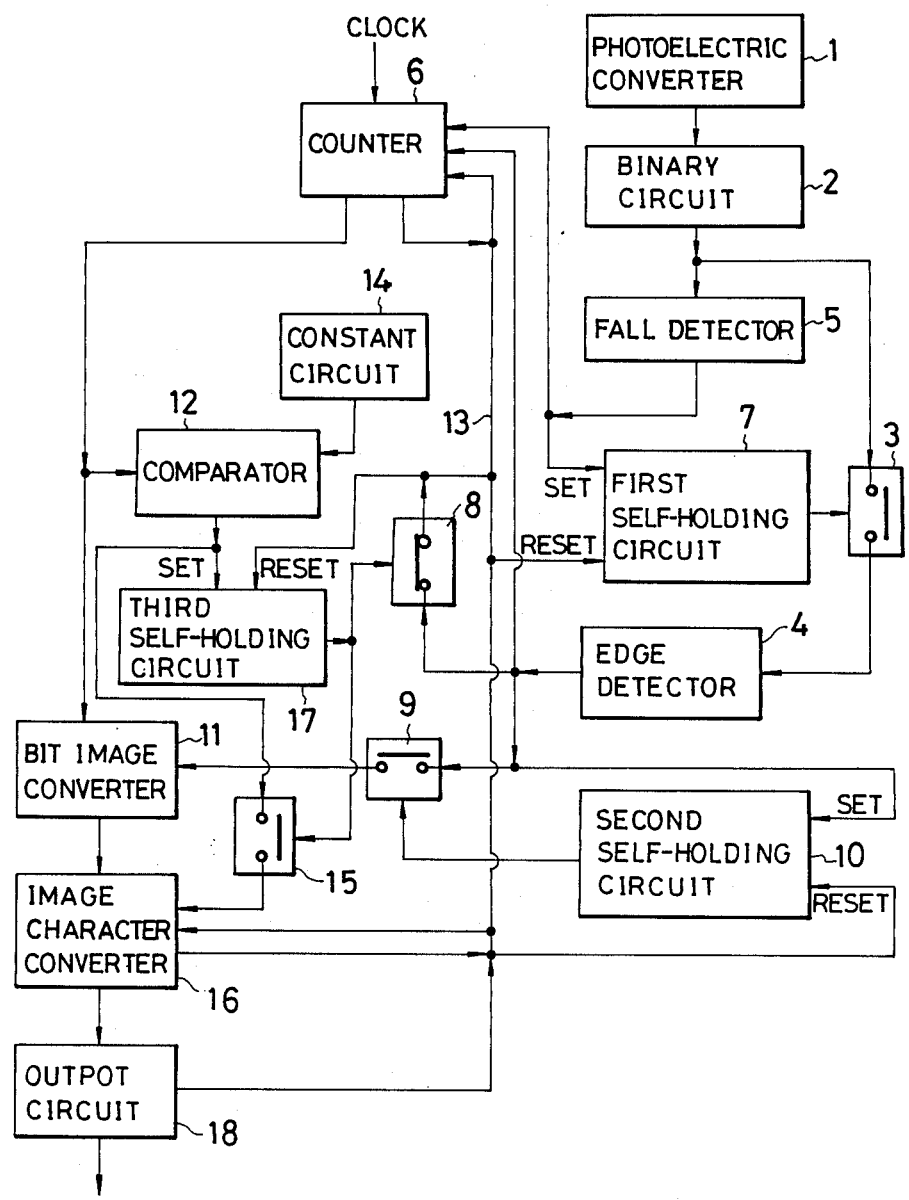
Figure 30:
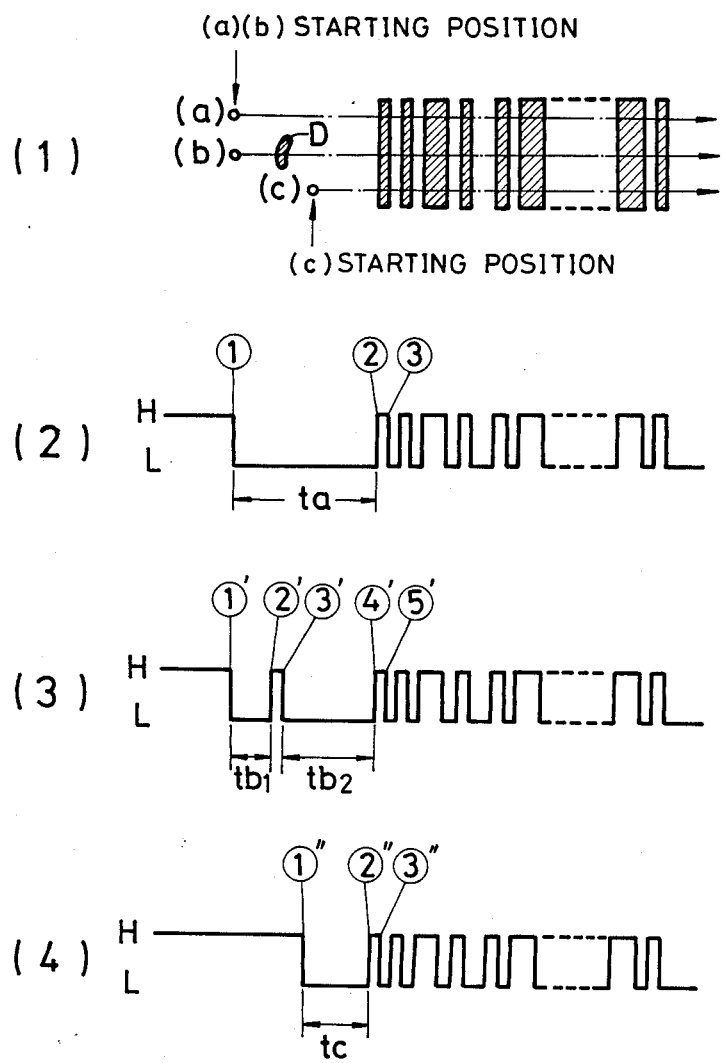

An embodiment of a code reading apparatus according to first aspect of the present invention will be described in detail with reference to FIGS. 1 and 2. FIG. 1 is a block diagram of a code reading apparatus of a bar code reader of the invention, and FIG. 2 is a view for explaining the operation of the apparatus of FIG. 1. In FIG. 1, the same reference numerals as those in FIG. 29 designate the same or corresponding components, and the detailed description thereof will be omitted.

In FIG. 1, a binary signal outputted from a binary circuit 2 is applied through a normally open first switch 3 to an edge detector 4 and a space/bar edge detector 20. The space/bar edge detector 20 detects the edge switched from "H" to "L" when a photoelectric converter 1 is fed from the space to the bar to output a short pulse-like edge detection signal. This edge detection signal is applied to a counter 6 to reset the counter 6 and to start counting, and also to a first self-holding circuit 7 to set the self-holding. The first switch 3 is closed by a slight delay from the edge detection signal by the set state of the first self-holding circuit 7. The edge detector 4 detects both the edges switched from "L" to "H" and "H" to "L" after the binary signal by the closure of the first switch 3 to output a short pulse-like edge detection signal. The edge detection signal is applied to the counter 6 to reset the counter 6 and to start counting, also applied to an edge counter 21, a memory 22 of memory means and a bit image converter 11. The counted value of the counter 6 is applied to the bit image converter 11, a multiplier 23 of multiplying means and first and second comparators 24, 25. The multiplier 23 multiplies, for example, a predetermined constant value larger than a quotient produced by dividing the allowable maximum width of a wide bar by the allowable minimum width of a narrow space, such as a constant 8 by the counted value to output a product to a switching unit 26. The switching unit 26 is applied with the product from the multiplier 23 and a first constant value from a first constant circuit 27 to ordinarily select the product but to select the first constant value only when a reset signal is applied from a reset line 13. The first constant value is set in advance to the maximum counted value or larger of the counter 6. The value selected by the switching unit 26 is applied to the memory 22 to updata the stored value whenever the edge detection signal from the edge detector 4 and the reset signal from the reset line 13 are applied, and the memory 22 outputs it to the first comparator 24. The first comparator 24 compares the new counted value started for counting by the counter 6 with the stored value, and outputs a signal when the new counted value is equal to or larger than the stored value. This signal is applied through a normally closed second switch 28 to an image character converter 16 and the reset line 13 as a reset signal. The edge counter 21 is set when counting, for example, three of edge detection signals of the edge detector 4 to open a second switch 28 and to close a normally open third switch 29, and reset by the reset signal from the reset line 13. The second comparator 25 compares the second constant value from the second constant circuit 30 with the counted value, and outputs a signal when the counted value is equal to or larger than the second constant value. This signal is applies through the third switch 29 to the image character converter 16 as a decode signal. The second constant value is set to a value larger than the counted value obtained from a wide bar by scanning the photoelectric converter 1 on the bar code at a normal speed and marginal by sufficiently considering the variation of the scanning speed of the photoelectric converter 1. Discriminating means is formed with the memory 22, the multiplier 23 and the first comparator 24.

In this configuration, as shown in FIG. 2(1)(a), a sufficient starting margin is provided before the bar code. Thus, when the photoelectric converter 1 is scanned from the starting position sufficiently separated from the bar code on the bar code, the binary circuit 2 outputs the binary signal as shown in FIG. 2(2). The edge (1) falling from "H" to "L" by the first bar is detected by the space/bar edge detector 20, and the counter 6 then starts counting. Then, a counted value $t_{a1}$ until the edge (2) varied from "H" to "L" by the initial bar is detected by the edge detector 4 becomes larger than the constant value and the counted value is smaller than the first constant value, and the signal from the first comparator 24 is not outputted. The product produced by multiplying the counted value $t_{a1}$ by the constant 8 at the edge (2) is stored in the memory 22. The space between the edge (2) and the next edge (3) is counted, and the new counted value $t_{a2}$ by the space is compared by the first comparator 24 with $8 \times t_{a1}$ stored in the memory 22. In the normal bar code, $t_{a2}$ is smaller than $8 \times t_{a1}$, and the first comparator 24 does not output a signal. Thus, it is discriminated that the start is suitably executed. When the edge detector 4 further outputs three edge detection signals, the second switch 28 is opened, the third switch 29 is closed, and the stop is then discriminated. When the decision of the stop is made, the scanning on the bar code is finished, the detection of the edge is eliminated by the stopping margin provided immediately after the last bar, the counted value of the counter 6 is increased, and, when it is increased larger than the second constant value of the second constant circuit 30, the decode signal is applied by the second comparator 25 to the image character converter 16. A character signal is outputted by the decode signal, further converted to a suitable output format by the output circuit 18, and outputted. When the output of the output circuit 18 is completed, the reset signal is outputted to the reset line 13 to reset to the initial state.

As shown in FIG. 2(1)(b), when a contaminant D exists on the bar code, a binary signal as shown in FIG. 2(3) is outputted. The binary signal is risen by the contaminant D from "L" to "H", its edge (1)' is detected by the space/bar edge detector 20, and the counter 6 is started for counting. The contaminant D is eliminated, the counted value $t_{b1}$ until the edge (2)' converted from "H" to "L" is detected by the edge detector 4 is smaller than the first constant value, and no signal is outputted from the first comparator 24. Then, the product obtained by multiplying the counted value $t_{b1}$ by the constant 8 at the edge (2)' is stored in the memory 22. Then, when the space from the contaminant D to the initial bar is wide, the counted value $t_{b2}$ is large and $t_{b2}$ is equal to or larger than $8 \times t_{b1}$, the reset signal is outputted from the first comparator 24 to the reset line 13, the image character converter 16 is cleared to be reset to the initial state. Further, the edge (3)' of the initial bar is detected by the space/bar edge detector 20, the counter 6 is started for counting, operated similarly to that when no contaminant D exists, the product obtained by multiplying the counted value $t_{b3}$ between the edge (3)' and the next edge (4)' by the constant 8 is compared with the counted value $t_{b4}$ between the edge (4) and the next edge (5)', and suitable start is discriminated similarly to the case that no contaminant exists. The constant is explained to be "8" for displaying binary level bar code. However, even in case of multilevel bar code display (3 to n values), the value based on the allowable maximum width of the wide bar and the allowable minimum width of the narrow space can be suitably selected similarly to be set.

As described above, since the contaminant D is discriminated by comparing the product obtained by multiplying the counted value $t_{b1}$ obtained from the width of the contaminant D by the constant with the new counted value $t_{b2}$ obtained from the width of the subsequent space thereafter, the width of the space is relatively widened as the width of the contaminant D is narrower to reliably discriminate the contaminant D. If the contaminant has the width of the bar, the contaminant can be easily observed by visually recognizing the bar code to be easily removed, but this can prevent the fine contaminant from being misled to be read as the bar, thereby improving the reliability of reading the bar code.

In addition to the general displaying environment, such as contaminant, even in case of new displaying environment where a frame of square (e.g., described on page 100 of "Weekly TV guide, No. 19, Sept." (issued on Sept. 19, 1986) of weekly magazine issued by Tokyo News Communication Co., Ltd., in Japan) is displayed on a front surface to be scanned at the scanning starting position by lines having high optical absorptivity, if a light reflector which is larger than at least the product of the width of the frame and the constant is disposed after the frame, the frame can be discriminated not as part of the bar code similarly to the contaminant described above.

Further, as shown in FIG. 2(1)(c), when the photoelectric converter 1 is scanned from the starting position near the bar code, a binary signal as shown in FIG. 2(4) is outputted. The edge (1)" is detected by the space/bar edge detector 20, the edge (2)" and the next edge (3)" are sequentially detected by the edge detector 4, and the suitable start is discriminated similarly to the binary signal in FIG. 2(2) from the counted value $t_{c1}$ between the edge (3)" and the next edge (2)" and the counted value $t_{c2}$ between the edge (2)" and the next edge (3)".

In the embodiment described above, the space is used as white to output "L" and the bar is used as black to output "H". However, the present invention is not limited to the particular embodiment. The space/bar edge detector 20 may detect the edge fed from the space to the bar to output an edge detection pulse.

In the embodiment described above, the start is discriminated by storing the product of the counted value counted between the edges immediately before by the counter 6 and the constant in the memory 22, and applying the stored product to the first comparator 24. However, the counted value counted between the edges immediately before by the counter 6 is stored in the memory, and the product obtained by multiplying the counted value immediately before by the constant by the multiplier may be applied to the first comparator 24.

In the embodiment described above, when the counted value started for counting by the counter 6 becomes the product or larger of the counted value counted between the edges immediately before and the constant, the reset signal is outputted from the first comparator 24. However, when the quotient obtained by dividing the counted value started for counting by the counter 6 by the counted value counted between the edges immediately before becomes the constant or larger, or when the quotient obtained by dividing the counted value started for counting by the counter 6 by the constant becomes the counted value or larger counted between the edges immediately before, the reset signal may be outputted to decoding means.

Further, in the embodiment described above, the bar code display has been described. However, if the general character or mark and symbol is displayed according to regulation of the minimum and maximum widths, the start may be discriminated by the numerical relation between the counted value started for counting by counting means and the counted value counted between the edges responsive to the width of the code immediately before to reset the decoding means or not to reset it, thereby improving the decoding probability.

Even in the apparatus for discriminating the state by reading the counted value after by storing the counted value of the counter 6 temporarily all in the memory, the decoding probability can be similarly improved. Here, in the decision of starting the character, the discrimination is decided according to the constant discriminated in accordance with the allowable maximum width of the display width of the character and the allowable minimum width of the display interval of the characters, and it is desired to process to discriminate the start after all the data of the character train are temporarily edited as data of characters.

Figure 3:
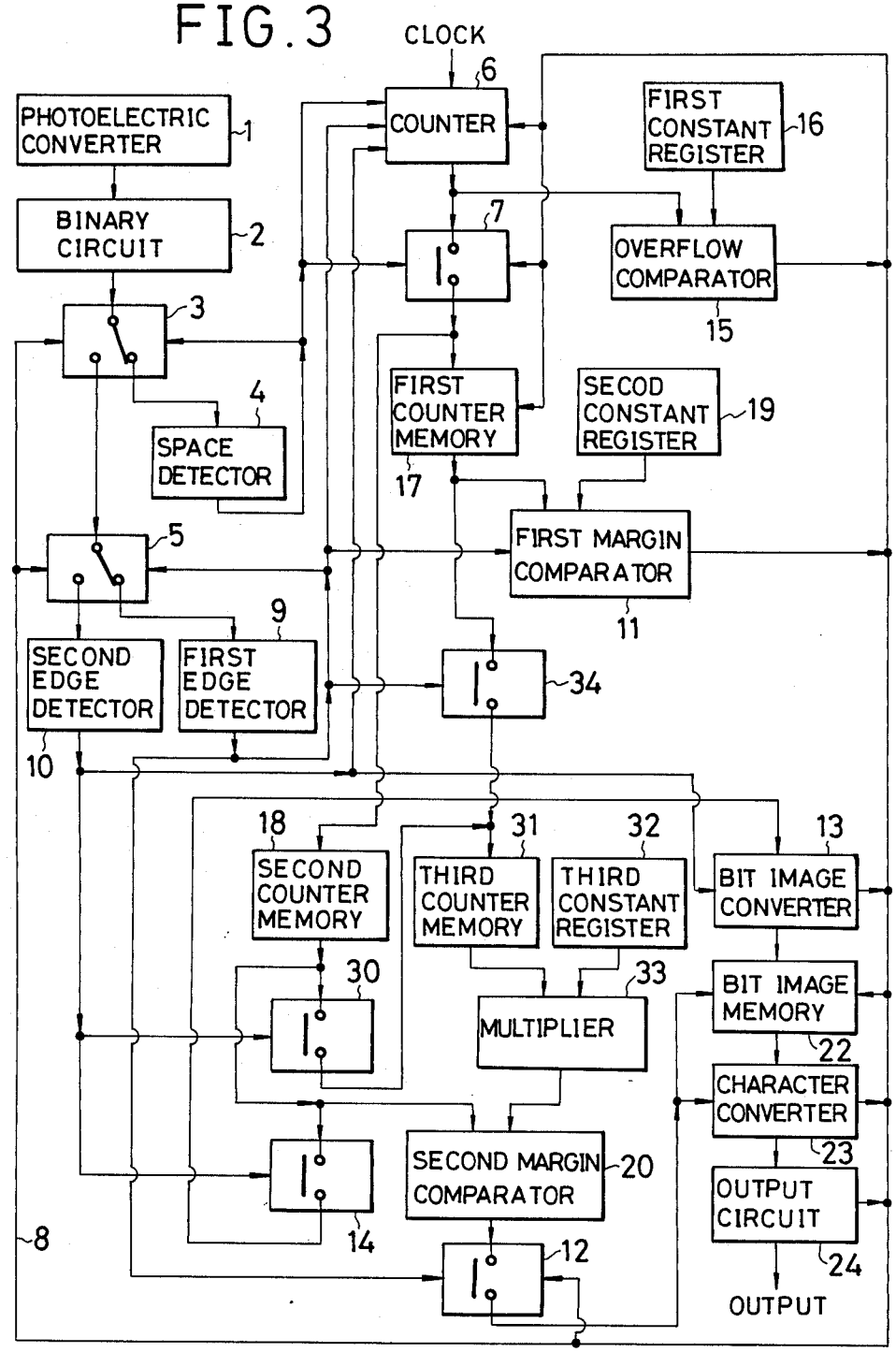
FIG. 3 is a block circuit diagram of an embodiment of a code reading apparatus having a final display discriminator of a bar code reader according to second aspect of the present invention.
Figure 4:
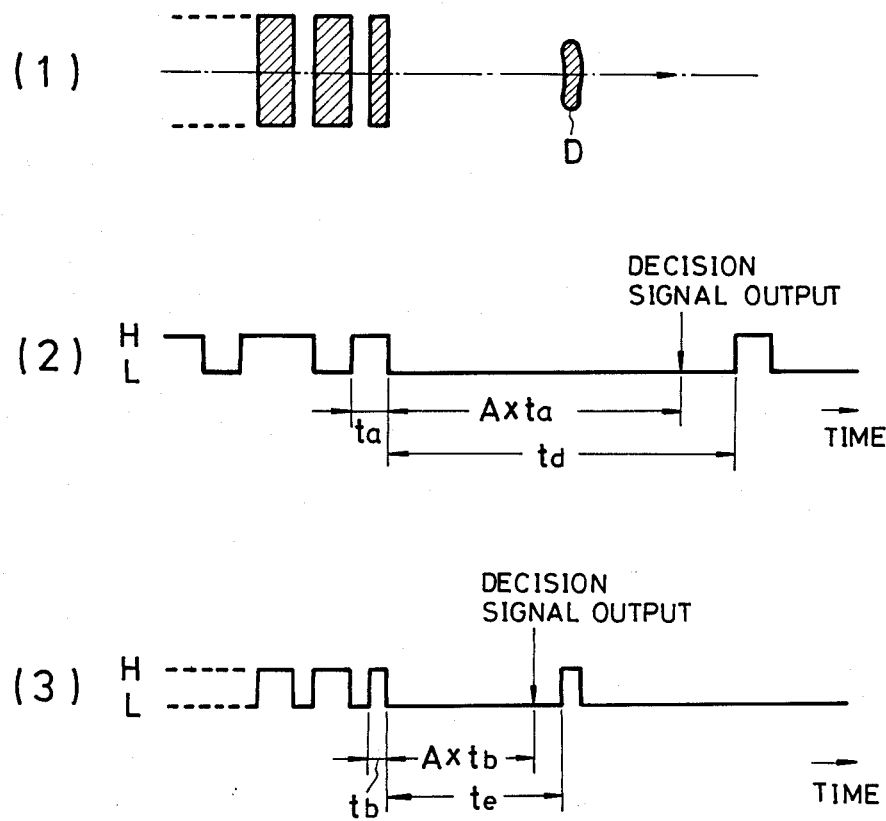
FIG. 4 is a view for explaining the operation of the circuit of FIG. 3.

An embodiment of a code reading apparatus according to second aspect of the present invention will be described in detail with reference to FIGS. 3 and 4. FIG. 3 is a block diagram of a code reading apparatus having a final display discriminator of a bar code reader of the invention, and FIG. 4 is a view for explaining the operation of the apparatus of FIG. 3. In FIG. 3, the same reference numerals as those in FIG. 31 designate the same or corresponding components, and the detailed description thereof will be omitted.

Figure 31:
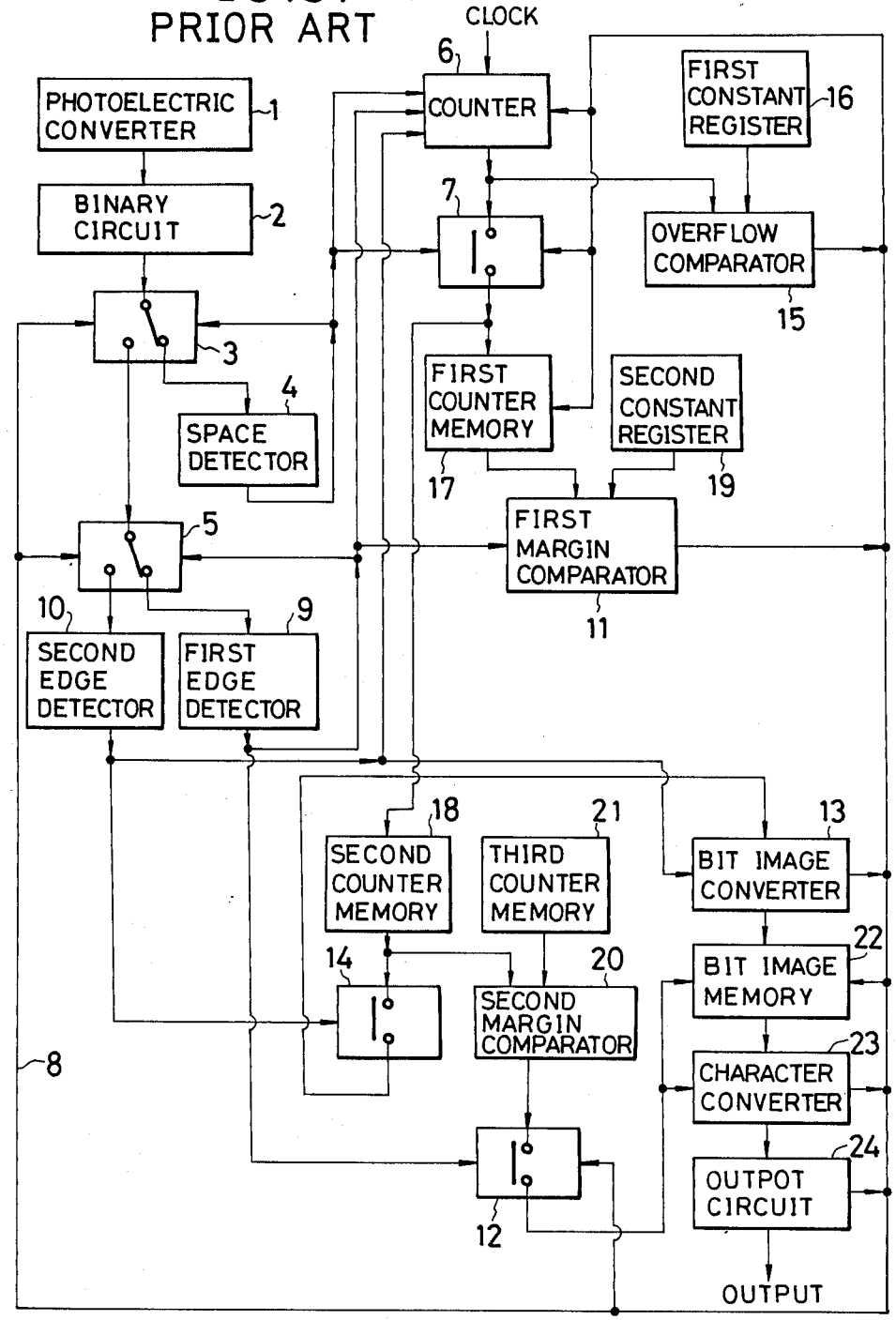
Figure 32:
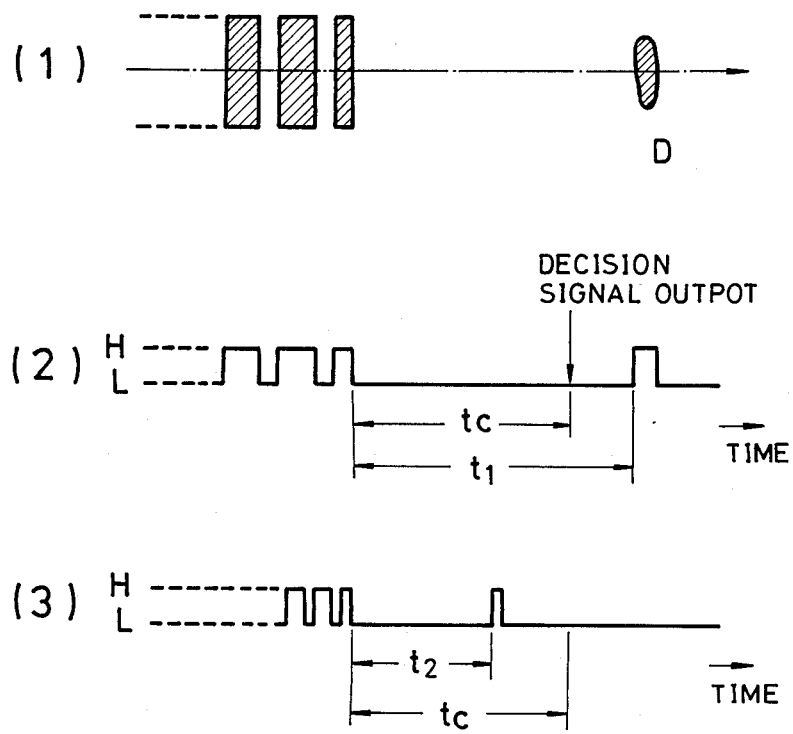
Figure 33:
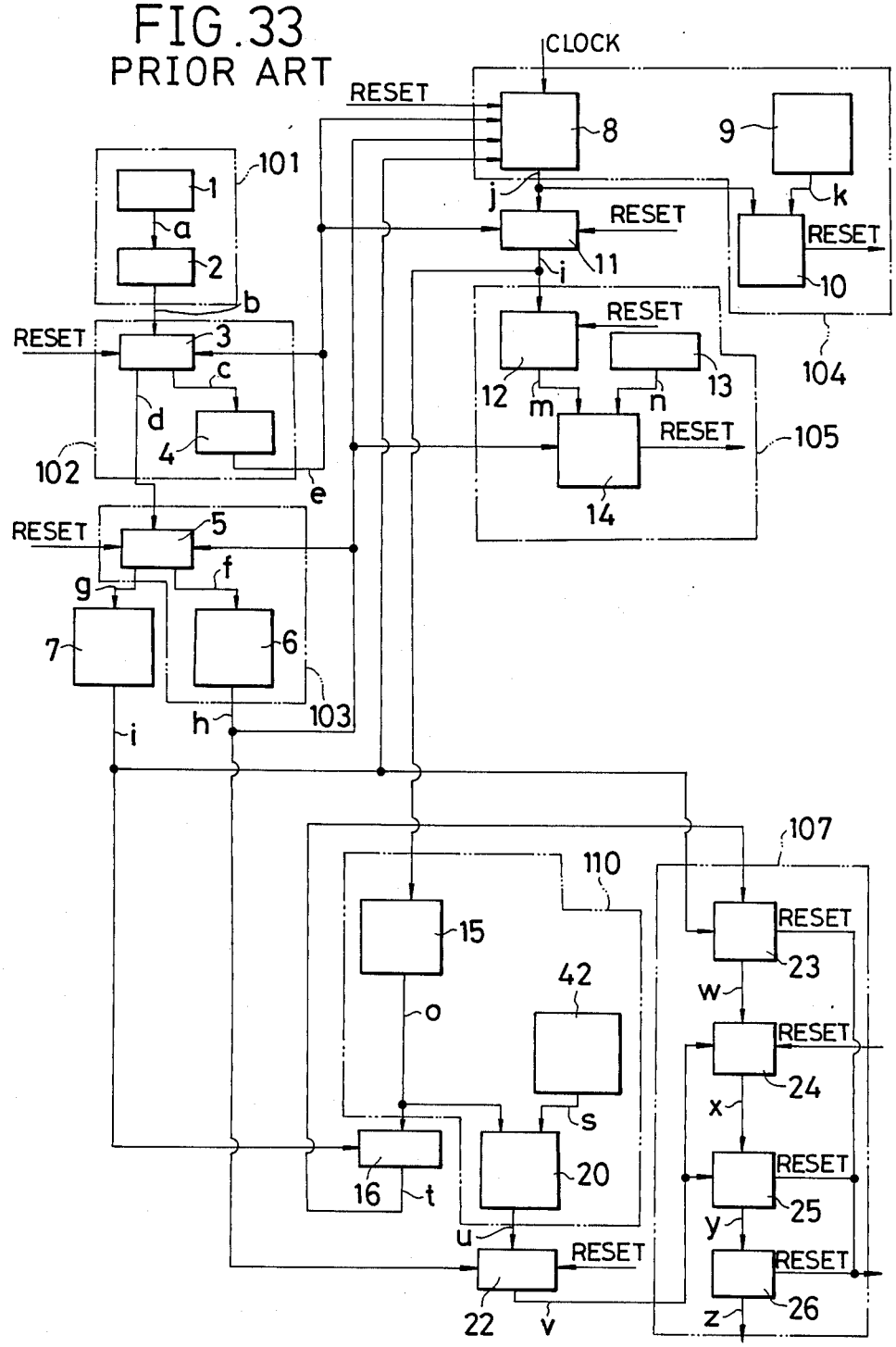
Figure 34:
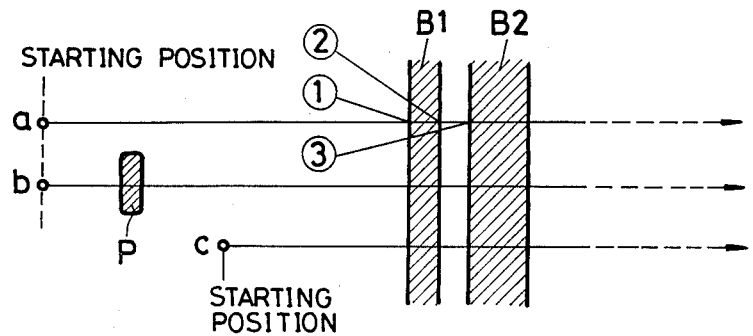
Figure 35:
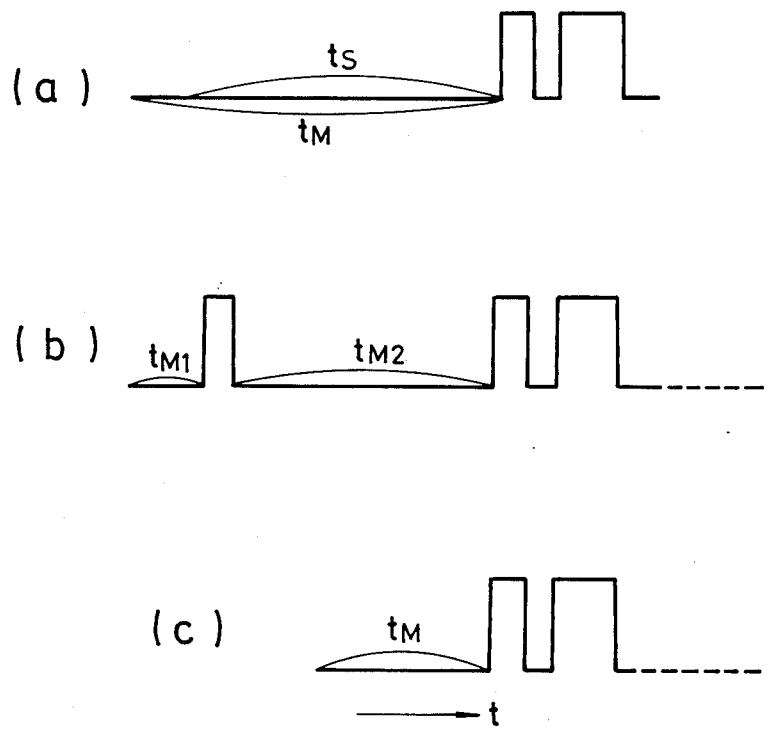
Figure 36:
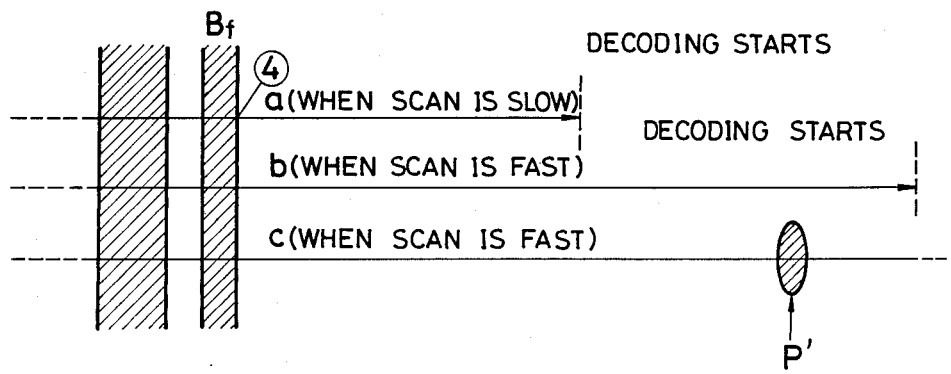
Figure 37:
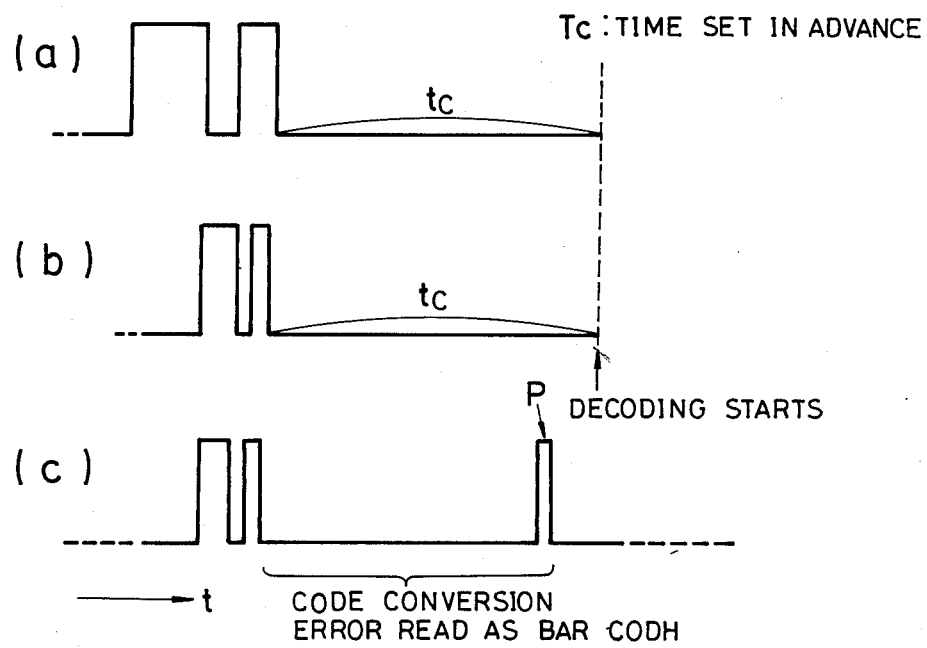

In FIG. 3, the embodiment is different from that in FIG. 31 as below. The counted value stored in a second counter memory 18 is applied not only to a fifth switching unit 14 and a second margin comparator 20 but through a normally open sixth switching unit 30 to third counter memory 31 of memory means. The sixth switching unit 30 is closed whenever an edge detection signal from a second edge detector 10 is applied thereto, and the previous counted value counted between edges before one from the counted value stored in the second counter memory 18 is stored in a third counter memory 31. A third constant value larger than a quotient obtained by dividing, for example, the allowable maximum width of a wide bar by the allowable minimum width of a narrow space is set in advance in a third constant register 32. A multiplier 33 of multiplying means multiplies the previous counted value stored in the third counter memory 31 by the third constant value, the product is compared by the second margin comparator 20 of comparing means with the counted value of the second counter memory 18, and when the counted value of the second counter memory 18 becomes the product or larger, a decision signal is outputted. The counted value stored in the first counter memory 17 is applied not only to the first margin comparator 11 but through a normally open seventh switching unit 34 to the third counter memory 31. The seventh switching unit 34 is temporarily closed by an edge detection signal from the first edge detector 9. Discriminating mean is formed with the second margin comparator 20, the third counter memory 31 and the multiplier 33.

In the arrangement described above, the counted value of the space of the starting margin of starting scanning of the photoelectric converter 1 is stored through the seventh switching unit 34 in the third counter memory 31 by the edge detection signal of the first edge detector 9. Then, when the edge detection signal is outputted from the second edge detector 10 due to the end of the initial bar, the counted value responsive to the width of the initial bar is compared by the second margin comparator 20 with the product of the previous counted value responsive to the width of the space immediately before it is stored in the third counter memory 31 and the third constant value. Here, if the starting margin is so slightly provided as to discriminate the initial bar, the product is larger, and the decision signal is not outputted from the second margin comparator 20. Further, when the edge of the second bar is detected by the second edge detector 10, the counted value responsive to the width of the space between the initial and second bars is compared by the second margin comparator 20 with the product of the previous counted value responsive to the width of the initial bar stored in the third counter memory 31 and the third constant value. When the photoelectric converter 1 is scanned on the bar code, the counted value stored in the second counter memory 18 is smaller than the product of the previous counted value counted between the edges immediately before it is stored in the third counter memory 31 and the third constant value, and a decision signal is not outputted from the second margin comparator 20. Then, the counted value of the second counter memory 18 is sequentially read in the bit image converter 13.

Further, when the bar code is finished and the photoelectric converter 1 is scanned on the stopping margin, the counted value stored in the first counter memory 18 becomes larger than the product of the counted value responsive to the width of the last bar and the third constant value. Thus, the decision signal is outputted from the second margin comparator 20, and the fourth switching unit 12 is closed. Then, the decision signal is applied to the bit image memory 22 and the character converter 23.

If the bar code is ended and the photoelectric converter 1 is slowly scanned, as shown in FIG. 4(1), on the end of the bar code and the stopping margin provided immediately after the end of the bar code and further a contaminant D, a binary signal is outputted as shown in FIG. 4(2) from the binary circuit 2. When the product $A \times t_a$ of the counted value $t_a$ and the third constant value A due to the last bar is the counted value $t_d$ or smaller from the end of the last bar to the contaminant D, a decision signal is outputted from the second margin comparator 20 when the counted value due to the space of the stopping margin becomes $Z \times t_a$, and suitable final display is discriminated.

When the photoelectric converter 1 is scanned rapidly, a binary signal as shown in FIG. 4(3) is outputted from the binary circuit 2. Here, since the scanning speed is fast, the counted value $t_e$ obtained by the space from the end of the last bar to the contaminant D is smaller than that when the scanning speed is slow, and the counted value $t_b$ responsive to the width of the last bar becomes small, and the product $A \times t_b$ of the counted value $t_b$ and the third constant value A becomes smaller than the counted value $t_e$. When the counted value by the space of the stopping margin becomes $A \times t_b$, the decision signal is outputted from the second margin comparator 20.

Therefore, according to the final display discriminator of the bar code reader of the invention, if the space or more obtained by multiplying the width of the last bar and the third constant value is provided after the last bar without influence of the scanning speed of the photoelectric converter 1, the final display can be reliably discriminated.

If the bar of the width more than that obtained by multiplying the width of the space and the third constant value is provided after the last space, the decision signal is outputted similarly from the second margin comparator 20 to discriminate the final display.

In the embodiment described above, when the edge of the initial bar is detected by the first edge detector 9, the fourth switching unit 12 is closed to apply the decision signal from the second margin comparator 20 to the bit image memory 22 and the character converter 23. However, the invention is not limited to the particular embodiment. Though not shown, after several edges are detected by the second edge detector 10, the decision signal may be applied to the bit image memory 22 and the character converter 23. In this case, an edge counter for counting the edge detection signal from the second edge detector 10 is, for example, provided, and the fourth switching unit 12 may be closed when the edge counter becomes a predetermined counted value.

In the embodiment described above, the decision signal is outputted from the second margin comparator 20 when the counted value stored in the second counter memory 18 becomes the product or larger of the counted value stored in the third counter memory 31 and the third constant value as the final display discrimination. However, the decision signal may be outputted when the quotient obtained by dividing the counted value stored in the second counter memory 18 by the counted value stored in the third counter memory 31 becomes the third constant value or larger or when the quotient obtained by dividing the counted value stored in the second counter memory 18 by the third constant value becomes the counted value or larger stored in the third counter memory 31. Then, the product of the counted value of the second counter memory 18 and the third constant value is stored in the third counter memory 31, and the product may be applied to the second margin comparator 20.

Further, in the embodiment described above, the bar code display is described to be used. However, if the general character or mark and symbol is displayed according to the regulation of the minimum and maximum widths, the final display of the character or symbol can be discriminated from the numerical relation between the counted value started for counting by the counter 6 and the counted value counted between the edges of the width of the code immediately before, and the decoding probability can be similarly improved.

Further, in the apparatus in which the counted value of the counter 6 is all stored once in the memory, the counted value is then read, and the final discrimination is then decided, the decoding probability can be similarly improved.

An embodiment of the invention having third aspect will be described with reference to the drawings.

Figure 5:
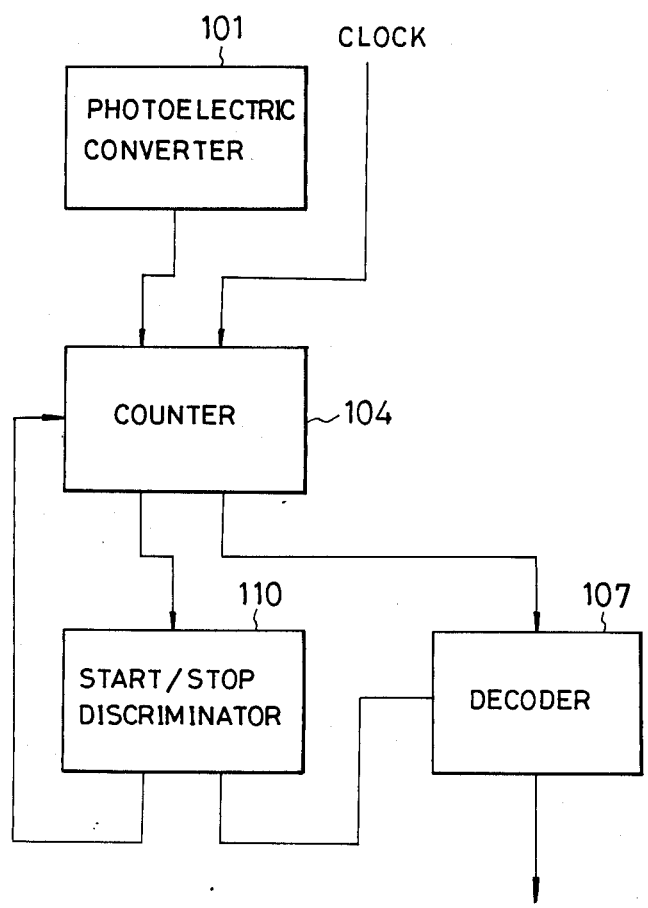

FIG. 5 is a block diagram of an essential portion of a bar code reader for explaining an embodiment of a code reading apparatus according to the present invention. Reference numeral 101 designates a photoelectric conversion unit, numeral 104 indicates a counter unit, numeral 107 denotes a decoder unit and numeral 110 depicts a start/stop discriminator.

In FIG. 5, the photoelectric conversion unit 101 scans the bar code to read it to convert it to a binary signal of "H", "L", and outputs it. The counter unit 104 counts a clock signal CL to output the time of "H" and "L" from the photoelectric conversion unit 101. There are considered as the counting (i) a method of sequentially outputting the value (counted value) during counting, (ii) a method of outputting the counted value at each end of counting "H" and "L", and (iii) a method of temporarily storing the counted value of "H" and "L" and outputting it after the counting of the bar code is finished.

The start/stop discriminator 110 discriminates the start/stop by the counted value from the counter unit 104, and resets the operation of the counter unit 104 when a starting error is judged. The stop discrimination decodes the counted value outputted from the counter unit 104. The decoder unit 107 decodes the counted value outputted from the counter unit 104 by the decoder unit 107. The decoder unit 107 decodes the counted value from the counter unit 104, and outputs the resulting reading data.

Figure 6:
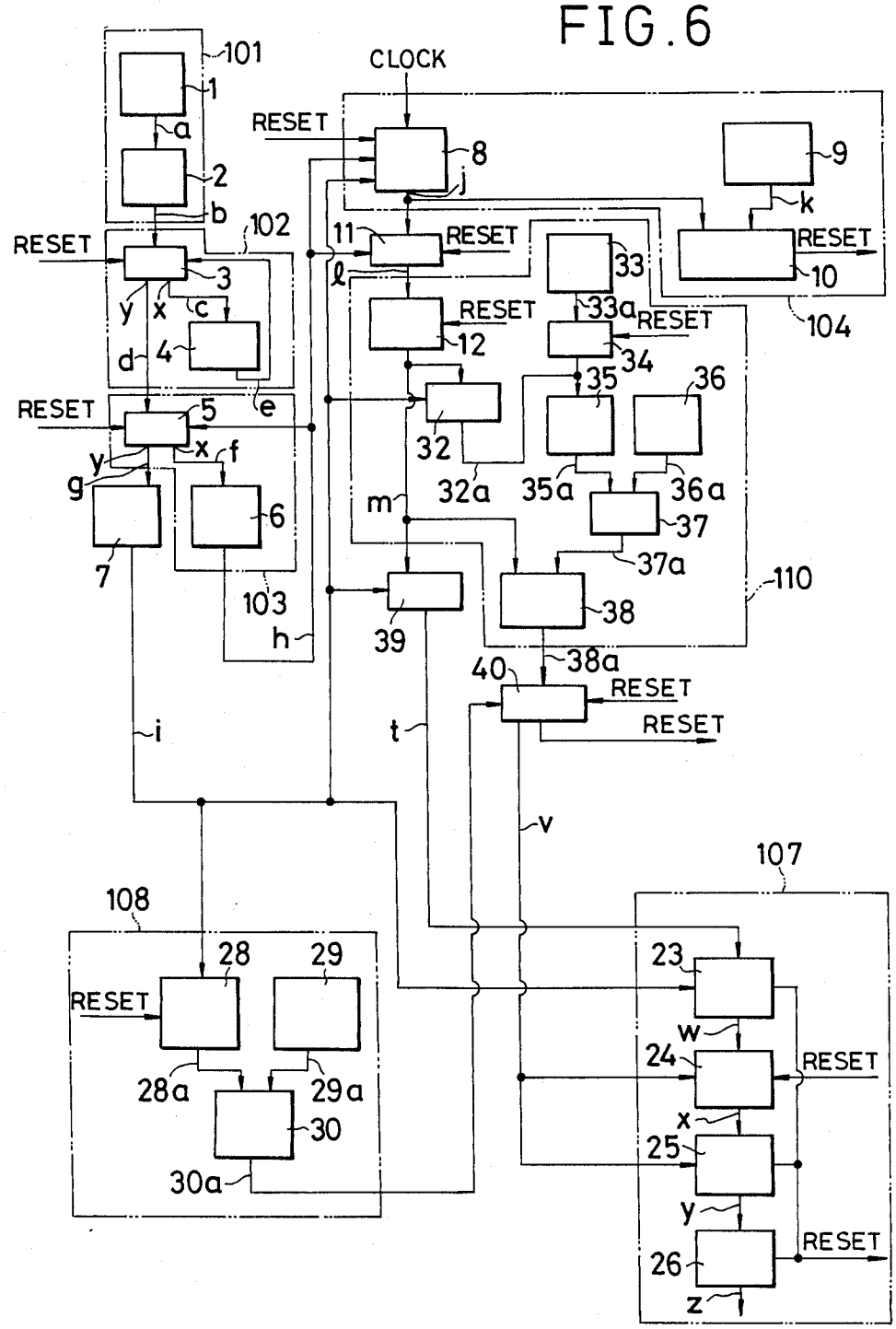

FIG. 6 is a block diagram showing the detailed arrangement of an embodiment in FIG. 5. Reference numeral 101 designates a photoelectric conversion unit, numeral 102 denotes a first space detection unit, numeral 103 depicts a first edge detection unit, numeral 104 indicates a counter unit, numeral 107 denotes a decoder unit, numeral 108 depicts a first bar/space discriminator, numeral 110 depicts a start/stop discriminator, numeral 7 indicates a second edge detector, and numerals 11, 39, 40 designate switching units.

The operation of the arrangement in FIG. 6 will be described.

The photoelectric converter 101 reads a code of the bar code by a photoelectric converter 1, applies the read signal through a signal line a to a binary circuit 2, converts it to a binary signal of "0", "1" ("H", "L"), and applies the conversion signal to a switching unit 3.

The switching unit 3 is connected initially by the reset signal to the side x, and switched to the side y by the signal of the signal line e. Thus, the switching unit 3 connects the signal line b to the space detector 4, applies an output to the signal line e when the signal of the signal line c is a signal (e.g., "L") corresponding to the space, and switches itself to the side y. Thus, the signal b of the output line of the photoelectric converter 101 is connected through the switching unit 3 from the signal line d to the switching unit 5. Since the switching unit 5 is connected by the reset signal to the side x, the signal line d is connected through the signal line f to the first edge detector 6.

The first edge detector 6 detects a variation of the signal from the signal line f from the space to the bar ("L" to "H") or a variation of the signal from the base to the space ("H" to "L") to apply an output to the signal line h. The edge detection signal on the signal line h switches the switching unit 5 to the side y, and is connected to the first counter 8 of the counter unit 104 to set the counted value of the first counter 8 to "0", thereby starting counting of the clock CL. The first counter 8 is cleared similarly as the counter value "0" by the signal from the output line i of the second edge detector 2 to be described later to the input of the reset signal to simultaneously start counting, thereby applying the counted value to the signal line j. The first counter 8 is compared with the overflow value set in the first constant register 9 by the overflow comparator 10, and the reset signal is outputted from the overflow comparator 10 when the counter is overflowed (e.g., the scanner is stopped on the way).

The second edge detector 7 inputs a signal from the photoelectric converter 101 through switching units 3 and 5 according to the detection of the first edge of the first edge detector 6, and applies the detection signal through the signal line i to the second counter 28 of the first bar/space discriminator 108 when the signal on the input signal line g is varied ("H" to "L" or "L" to "H").

The first bar/space discriminator 108 counts the sum of the bar and the space from the detection of the first bar (the content of the second counter 28), and outputs a signal to the signal line 30a when it arrives at the number set in advance in the fourth constant register 29 (counting the number of the space and the bar to be discriminated at the start).

The second counter 28 sequentially increments the counter by the signal form the signal line i and applies the counted value to the signal line 28a. The counter 28 is cleared to "0" by the reset signal. The sum (2 or more) of the number of the bar and the space used to discriminate the start of the bar code is set in advance in the fourth constant register 29. and the value is applied through the signal line 29a to the comparator 30. The comparator 30 compares the counted value from the signal lines 28a with the value from the signal line 29a, and outputs the signal to the signal line 30a when the counted value is the set value or larger of the fourth constant register 29.

The switching unit 11 is operated by the signal from the first edge detector 6, and applies the counted value from the counter unit 104 to the start/stop discriminator 110.

The start/stop discriminator 110 is operated to compare at least counted value of the initial bar and space, and applies a reset signal to a signal line 38a when the counted value (the content of the counter memory 12) of the space or bar becomes the magnification of a predetermined constant (the content of the sixth constant register 36) of the counted value (the content of the previous counter memory 35) immediately before. In other words, in case of discriminating the start, at least counted value of the initial bar and space is compared without observing the start margin, and the reset signal is outputted when no start is judged as described above.

The counter memory 12 (i) stores the counted value from a signal line l, and applies it to the signal line m. Then, the stored counted value is reset by the reset signal.

The larger counted value (than the wide bar or space/the slow scanning speed) is set in advance in the fifth constant register 33, the value is applied to the signal line 33a, and stored in the previous counter memory 35 through the switching unit 34 for connecting the signal line 33a to the signal line 32a only when the reset signal is inputted thereto. The stored counted value is applied through a signal line 35a to a multiplier 37, in which it is multiplied by the constant set in the sixth constant register 36, i.e., the larger value (than the wide bar or space/narrow bar or space). The multiplied result is supplied through a signal line 37a to a margin comparator 38.

The margin comparator 38 compares the output signal (counted value) of the counter memory 12 from the signal line m with the multiplied output value of the multiplier 37, and outputs a signal to the signal line 38a when the counted value is equal to or larger than the multiplied output value.

The switching unit 40 (i) connects the signal lie 38a to the reset line when the reset signal is inputted, and outputs the signal of reading stop from the signal line 38a as a reset signal, and (ii) disconnects the signal line 30a from the reset output line and connects the signal line 38a to the signal line v when the signal (the output signal of the first bar/space discriminator 108) from the signal line 30a is inputted thereto.

The switching unit 39 connects the signal line m to the signal line t only when the signal from the signal line i is inputted thereto, and supplies the value of the first counter memory 12 to the decoder unit 107.

The stop discrimination applies a signal to the signal line 37a when the counted value of the bar or space to be read at present, i.e., the content of the first counter memory 12 becomes the counted value of the space or bar immediately before, i.e., the magnification of the constant (the value set in the third constant register 36) of the content of the previous counter memory 35. The counter memory 12 stores the signal from the signal line 1, i.e., the counted value of the first counter 8 of the counter unit 104, and applies it to the signal line m. The switching unit 32 applies the value of the counter memory 12 to the previous counter memory 35 by the signal from the signal line i. The previous counter memory 35 stores the signal from the signal line 32a, and applies the value through a signal line 35a to the first multiplier 37. A value larger than the counted value of (wide bar or space/narrow bar or space) of the bar code is set in advance in the sixth constant register 36, the set value is applied through a signal line 38a to the multiplier 37, multiplied by the value stored in the previous counter memory 35, and outputted through the signal line 37a to the margin comparator 38.

The margin comparator 38 compares the value of the counter memory 12 with the multiplied output of the multiplier 37, and applies a comparison output to the signal line 38a when the value from the counter memory 12, i.e., the counted value of the first counter 8 of the counter unit 104 is the output value or more of the multiplier 37.

The switching unit 40 which inputs the output of the margin comparator 38 disconnects the signal line 38a from the signal line v when the reset signal is inputted thereto, and connects the signal line 38a to the signal line v by the output signal from the first bar/space discriminator 108 from the signal line 30a. In other words, the output signal from the stop discriminator 108 is applied to the decoder unit 107 from when the first bar/space decision signal (starting margin decision signal) from the first bar/space discriminator 108 is inputted to control the decoding operation.

The decoder unit 107 decodes the meaning of the code of the bar code according to the counted value of the clock CL corresponding to the width of the bar or space of the read bar code, and has an arrangement as shown in FIG. 6.

The functions of the blocks of the decoder unit 107 shown in FIG. 6 are as described below.

The bit image converter 23 converts the counted value inputted from the signal line t, and stores it through a signal line 2 in a bit image memory 24. When an error is generated at the time of the conversion, a reset signal is outputted to stop reading. The bit image memory 24 operates (i) to store a bit image from the signal line w, (ii) to apply a bit image stored by a signal input from the signal line v through a signal line x to a character converter 25, and (iii) to clear the bit image stored when the reset signal is inputted.

The character converter 25 starts operating by a signal input from the signal line v, converts a bit image inputted from the bit image memory 24 into a character, and applies it through a signal line y to the output circuit 26. If an error is generated in case of the character conversion, the reset signal is outputted.

The output circuit 26 applies a data character signal from the signal line y to an output line z, and supplies it to display means, not shown, or other information processor. The reset signal is outputted when the signal is completely outputted.

Figure 7:
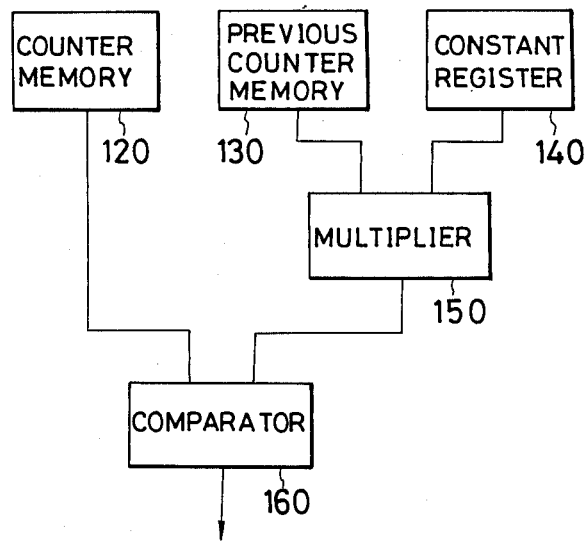

FIG. 7 is a block diagram for explaining the arrangement of the essential portion of the start/stop discriminator 110 in the embodiment of the invention, where the same reference numerals as those in FIG. 6 designate the same or equivalent components. In FIG. 7, reference numeral 120 designates a counter memory (corresponding to the counter memory 12 of the start/stop discriminator 110), numeral 130 denotes a previous counter memory (similarly corresponding to the previous counter memory 35), numeral 140 depicts a constant register (similarly corresponding to the sixth constant register 36), numeral 150 indicates a multiplier (similarly corresponding to the multiplier 37), and numeral 160 designates a comparator (similarly corresponding to the margin comparator 38).

In the embodiment of the invention described above, to decide the starting margin or the stopping margin, the counted value of the present bar or space by scanning of reading the bar code is compared by the value multiplied by a predetermined constant of the counted value of the space or bar of the previous time to discriminate the start or stop, i.e., to decide the start space or stop space.

This invention is not limited to the particular embodiment, and the start or stop can be also discriminated by an embodiment as will be described below.

Figure 8:
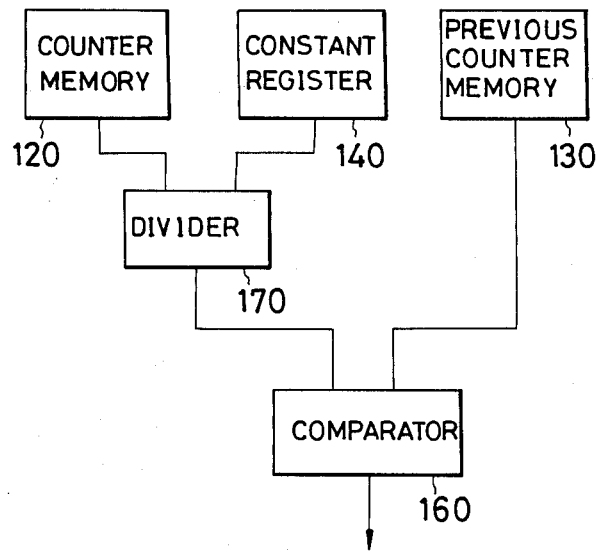

FIG. 8 is a block diagram of the arrangement of an essential portion of a start/stop discriminator for explaining another embodiment of the invention. Reference numeral 170 designates a divider, wherein the same reference numerals as those in FIG. 7 designate the same or equivalent components.

In FIG. 8, the quotient obtained by dividing the counted value of the counter memory 120 by the constant set in the constant register 140 is compared with the counted value of the previous counter memory. The similar advantages as those in FIG. 7 can be provided by this arrangement.

Figure 9:
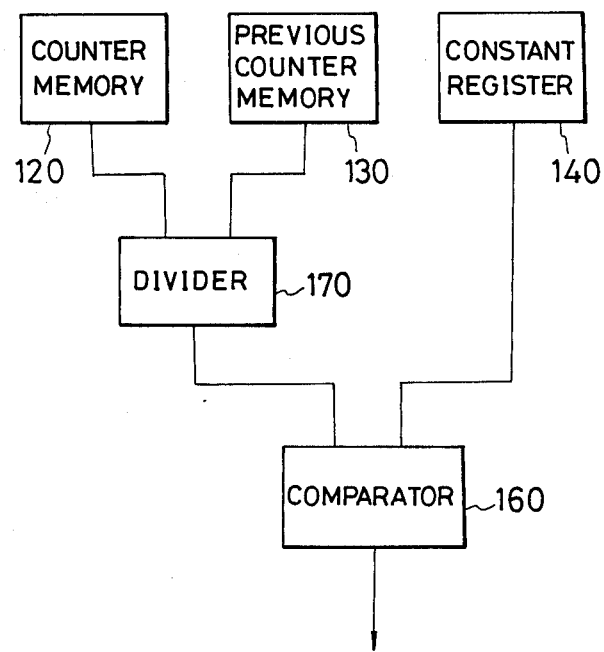

FIG. 9 is a block diagram of the arrangement of an essential portion of a start/stop discriminator for explaining modified embodiment of the invention, wherein the same reference numerals as those in FIG. 8 designate the same or equivalent components.

In FIG. 8, the quotient obtained by dividing the counted value of the counter memory 120 by the counted value of the previous counter memory 130 by the divider 170 is compared with the constant set in the constant register 140 by the comparator 160. The similar advantages as those can be provided by this arrangement.

FIG. 10 is a view for explaining the discriminating operation of the start of the invention, and FIG. 11 is a waveform diagram of FIG. 10.

In FIG. 10, a is a scanning line when the starting position is sufficiently separated from the bar code, and FIG. 11(a) shows its reading waveform, and $t_B$ is smaller than $A \times t_A$, where $t_A$ is the counted value corresponding to the reading time of a first bar B1 in FIG. 10, $t_B$ is the counted value corresponding to the reading time of the first space S1, and A is a predetermined constant, and the the possibility of the start of the bar code can be discriminated.

As shown by b in FIG. 10, even if the starting position is sufficiently separated from the bar code, if a contaminant P exists on the way, as shown in FIG. 11(b), quasi-counted value $t_{A1}$ is outputted by the contaminant P. However, the counted value $t_{B1}$ of the space continued to the contaminant becomes $t_{B1}$ larger than $A \times t_{A1}$ is not observed as the bar code. Since the counted value $t_A$ of the first bar B1 of the bar code is smaller than $A \times t_A$ of the counted value $t_B$ of the space S1 continued thereto, this time point is judged to be the start of the bar code.

Then, as shown by c in FIG. 10, even when the starting position is near the bar code, since the counted value $t_A$ of the first bar B1 is smaller than $A \times t_B$ of the counted value $t_B$ of the first space S1, it is judged to be the start of the bar code.

More specifically, since the start of the bar code is discriminated when the counted value $t_B$ of the first space of the bar code is smaller than the magnification of the constant A of the counted value $t_A$ of the first bar of the bar code, the space immediately before the bar code may be small. Thus, the bar code can be densified, the probability of adhering a contaminant to the space of the start is reduced, and an error is hardly generated.

As described above, the predetermined constant A may be larger than (wide bar or space/narrow bar or space).

FIG. 12 is a view for explaining the discriminating operation of the stop of the invention, and FIG. 13 is a waveform diagram of FIG. 12.

Symbol a in FIG. 12 is a scanning line when the scanning speed is slow, FIG. 13(a) is a waveform of reading, FIG. 13(b) is a waveform of reading when the scanning speed is fast, and FIG. 13(c) is a waveform of reading when the scanning speed is fast as shown by c in FIG. 13 and a contaminant exist on the stop space.

In the drawings, when the counted value of the bar or space read by scanning is larger than the value of the magnification of the constant of the counted value ($t_a$ or $t_b$) of the space or bar immediately before, it is regarded as being the end of the bar code, and the decoding operation is started.

Thus, the widths of the space and the bar necessary for the stopping margin are decided irrespective of the scanning speed, the bar code having small width of the stopping margin can be provided, the bar code display can be densified, the possibility of adhering a contaminant can be reduced, and errors can be decreased.

The predetermined constant A may be larger than the value (wide bar or space/narrow bar or space) as described above, e.g., A=8 to be executed.

An embodiment of the invention having third aspect will be described with reference to FIG. 14.

Figure 14:
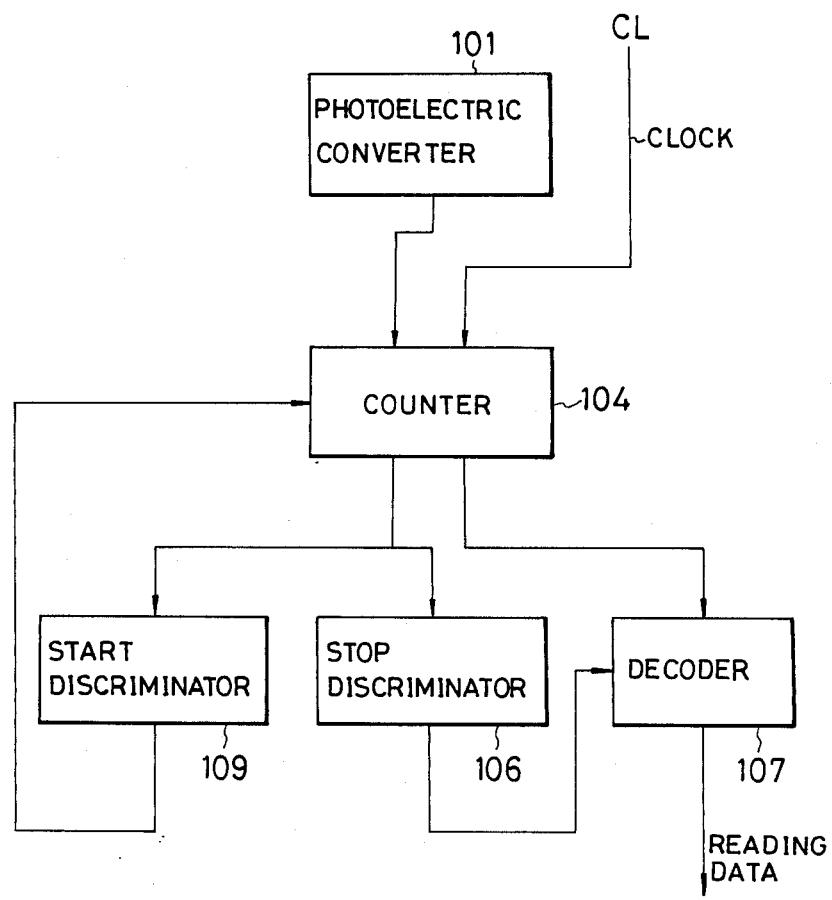

FIG. 14 is a block diagram of an essential portion of an arrangement of a bar code reader for explaining th embodiment of a code reading apparatus according to the invention. Reference numeral 101 designates a photoelectric conversion unit, numeral 104 denotes a counter unit, numeral 106 depicts a stop discriminator, numeral 107 indicates a decoder unit, and numeral 109 designates a start discriminator.

In FIG. 14, the photoelectric conversion unit 101 scans to read the bar code, converts it to a binary level signal of "H", "L", and outputs it. The counter unit 104 counts and outputs the time of "H" and "L" from the photoelectric conversion unit 101 by a clock signal CL, and there are considered as the counting (i) a method of sequentially outputting the value (counted value) during counting, (ii) a method of outputting the counted value at each end of counting "H" and "L", and (iii) a method of temporarily storing the counted value of "H" and "L" and outputting it after the counting of the bar code is finished.

The start discriminator 109 discriminates the start by the counted value from the counter unit 104, and resets the operation of the counter unit 104 when a starting error is judged. The stop discriminator 106 discriminates the stop by the counted value outputted from the counter unit 104, and decodes the counted value outputted from the counter unit 104 by the decoder unit 107. The decoder unit 107 decodes the counted value from the counter unit 104, and outputs the resulting reading data.

Figure 15:
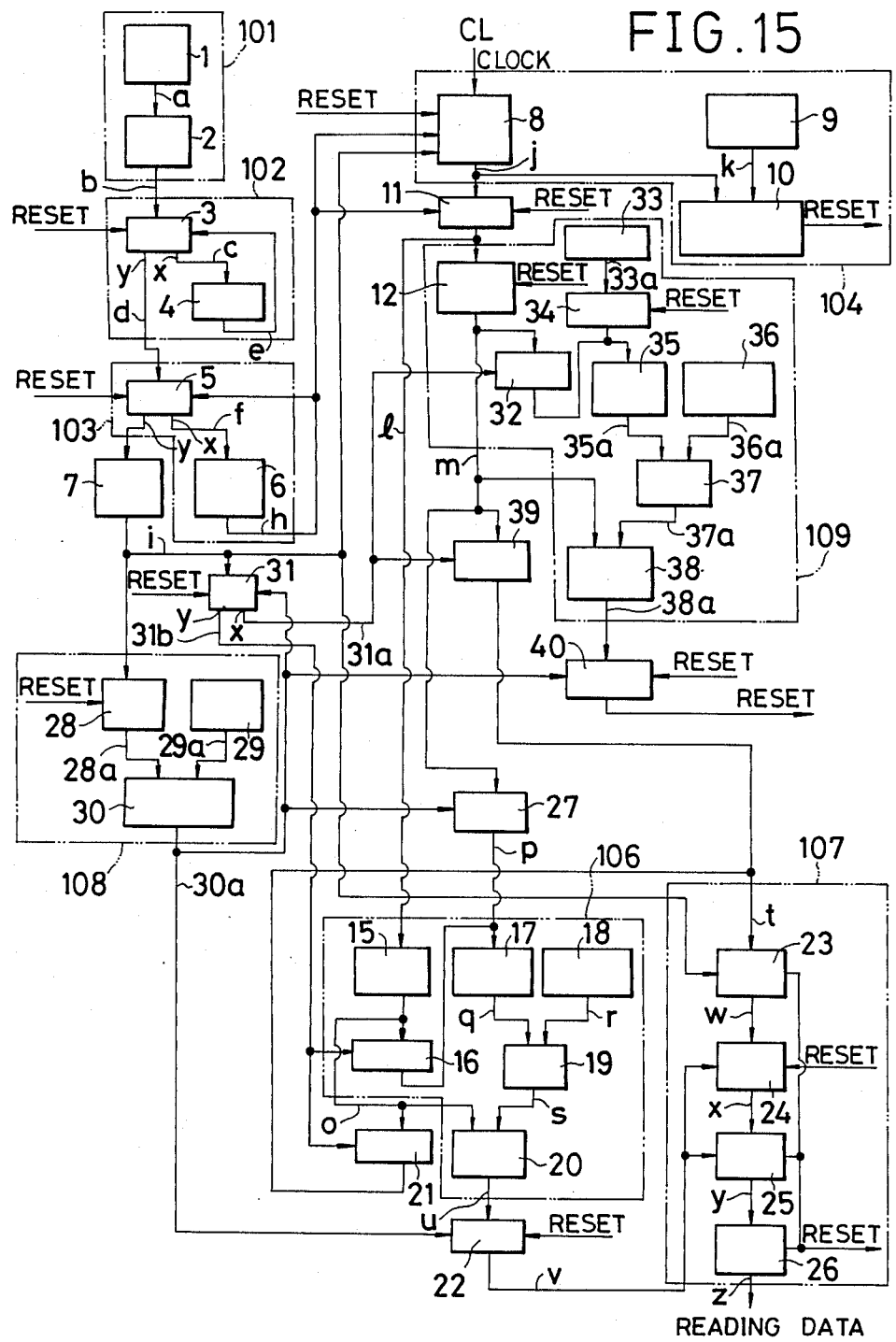

FIG. 15 is a block diagram showing the detailed arrangement of an embodiment in FIG. 14. Reference numeral 101 designates a photoelectric conversion unit, numeral 102 denotes a first space detection unit, numeral 103 depicts a first edge detection unit, numeral 104 indicates a counter unit, numeral 106 designates a stop discriminator, numeral 107 denotes a decoder unit, numeral 108 depicts a first bar/space discriminator, numeral 109 indicates a start discriminator, numeral 7 denotes a second edge detector, and numerals 11, 21, 22, 27, 31, 39 and 40 designate switching units.

The operation of the arrangement in FIG. 15 will be described.

The photoelectric converter 101 reads a code of the bar code by a photoelectric converter 1, applies the read signal through a signal line a to a binary circuit 2, converts it to a binary signal of "0", "1" ("H", "L"), and applies the conversion signal to a switching unit 3.

The switching unit 3 is connected initially by the reset signal to the side x, and switched to the side y by the signal of the signal line e. Thus, the switching unit 3 connects the signal line b to the space detector 4, applies an output to the signal line e when the signal of the signal line c is a signal (e.g., "L") corresponding to the space, and switches itself to the side y. Thus, the signal b of the output line of the photoelectric converter 101 is connected through the switching unit 3 from the signal line d to the switching unit 5. Since the switching unit 5 is connected by the reset signal to the side x, the signal line d is connected through the signal line f to the first edge detector 6.

The first edge detector 6 detects a variation of the signal from the signal line f from the space to the bar ("L" to "H") or a variation of the signal from the base to the space ("H" to "L") to apply an output to the signal line h. The edge detection signal on the signal line h switches the switching unit 5 to the side y, and is connected to the first counter 8 of the counter unit 104 to set the counted value of the first counter 8 to "0", thereby starting counting of the clock CL. The first counter 8 is cleared similarly as the counter value "0" by the signal from the output line i of the second edge detector 2 to be described later to the input of the reset signal to simultaneously start counting, thereby applying the counted value to the signal line j. The first counter 8 is compared with the overflow value set in the first constant register 9 by the overflow comparator 10, and the reset signal is outputted from the overflow comparator 10 when the counter is overflowed (e.g., the scanner is stopped on the way).

The second edge detector 7 inputs a signal from the photoelectric converter 101 through switching units 3 and 5 according to the detection of the first edge of the first edge detector 6, and applies the detection signal through the signal line i to the second counter 28 of the first bar/space discriminator 108 when the signal on the input signal line g is varied ("H" to "L" or "L" to "H").

The first bar/space discriminator 108 counts the sum of the bar and the space from the detection of the first bar (the content of the second counter 28), and outputs a signal to the signal line 30a when it arrives at the number set in advance in the fourth constant register 29 (counting the number of the space and the bar to be discriminated at the start).

The second counter 28 sequentially increments the counter by the signal form the signal line i and applies the counted value to the signal line 28a. The counter 28 is cleared to "0" by the reset signal. The sum (2 or more) of the number of the bar and the space used to discriminate the start of the bar code is set in advance in the fourth constant register 29. and the value is applied through the signal line 29a to the comparator 30. The comparator 30 compares the counted value from the signal lines 28a with the value from the signal line 29a, and outputs the signal to the signal line 30a when the counted value is the set value or larger of the fourth constant register 29.

The switching unit 31 applies the signal from the second edge detector to either the start discriminator 109 and the switching unit 39 or the stop discriminator 106 and the switching unit 21. This switching is executed by the reset signal and the output signal of the first bar/space discriminator 108. When the reset signal is inputted, the switching unit is switched from the side y to the side x, and when the signal is inputted from the signal line i, the switching unit is switched to the side y.

The switching unit 11 is operated by the signal from the first edge detector 6, and applies the counted value from the counter unit 104 to the start discriminator 109 and the stop discriminator 106.

The start discriminator 109 compares at least initial bar with the counted value of the space, and judges as a start if the counted value of the space or the bar (the content of the first counter memory 12) is less than the magnification of a predetermined constant (the content of the sixth constant register 36) of the counted value of the space or the bar immediately before (the content of the second previous counter memory 35) to apply a reset signal to the signal line 38a when it becomes the magnification or more of the predetermined constant. In other words, in case of judging the start, at least initial counted value of the bar or space is compared without observing the starting margin, and the reset signal is output to stop reading when judging no start as described above.

The first counter memory 12 stores the counted value from the signal line l, and applies it to a signal line m. Then, the stored counted value is reset by the reset signal.

Larger counted value (than a wide bar or a space/slow scanning speed) is set in advance in the fifth constant register 33, applied to the signal line 33a, and stored in the second previous counter memory 35 through a switching unit 34 for connecting the signal line 33a to the signal line 32a only when the reset signal is applied thereto. The counted value thus stored is applied through the signal line 35a to a second multiplier 37, in which it is multiplied by the larger value than (wide bar or space/narrow bar or space) set in the sixth constant register 36. The multiplied result is supplied through the signal line 37a to a third margin comparator 38.

The third margin comparator 38 compares the output signal (counted value) of the first counter memory 12 from the signal line m with the multiplied output value of the second multiplier 37, and outputs a signal to the signal line 38a when the counted value is the multiplied output value or larger.

The switching unit 40 operates (i) to connect the signal line 38a to the reset line when the reset signal is inputted to output the signal from the signal line 38a as a reset signal, and (ii) to separate the signal line 38a from the reset output line when the signal from the signal line 30a (the output of the first bar/space discriminator 108) is inputted. The switching unit 32 connects the signal line m to the signal line 32a only when a signal is inputted from the signal line 31a, supplies the stored value of the first counter memory 12 to the second previous counter memory 35, and disconnect the signal line m from the signal line 32a except the above cases.

The switching unit 39 connects the signal line m to the signal line t only when the signal from the signal line 31a is inputted and supplies the value of the first counter memory 12 to the decoder unit 107.

The switching units 39, 21 are operated by the signal from the second edge detector 7, the switching unit 39 applies the counted value of the bar or space from the first counter memory 12 and the switching unit 21 applies the counted value of the bar or space from the second counter memory 15 to be described later, to the decoder unit 107.

The switching unit 27 is operated only when the signal from the signal line 30a is inputted, i.e., by the signal from the first bar/space discriminator 108 to lead the signal from the signal line m to the signal line p to supply the counted value of the final bar or space used to decide in the start discriminator 109 to the first previous counter memory 17 of the stop discriminator 106.

Then, the operation of the stop discriminator 106 will be described.

The stop discriminator 106 applies a signal to the signal line u when the counted value of the bar or space to be read at present, i.e., the content of the second counter memory 15 becomes the counted value of the space or bar immediately before, i.e., the magnification of the constant (the value set in the third constant register 18) of the content of the previous counter memory 17. The second counter memory 15 stores the signal from the signal line 1, i.e., the counted value of the first counter 8 of the counter unit 104, and applies it to the signal line o. The switching unit 16 connects the signal line o to the signal line p only when the signal from the signal line 31b, i.e, the output signal of the second edge detector 7 through the switching unit 31 is inputted and applies the value of the second counter memory 15 to the first previous counter memory 17. The first previous counter memory 17 stores the signal from the signal line p, and applies the value through a signal line q to the first multiplier 19. A value larger than the counted value of (wide bar or space/narrow bar or space) of the bar code is set in advance in the third constant register 18, the set value is applied through a signal line r to the first multiplier 19, multiplied by the value stored in the first previous counter memory 17, and outputted through the signal line s to the second margin comparator 20.

The second margin comparator 20 compares the value of the second counter memory 15 inputted through the signal line o with the multiplied output of the first multiplier 19, and applies a comparison output to the signal line 7 when the value from the second counter memory 15, i.e., the counted value of the first counter 8 of the counter unit 104 is the output value or more of the first multiplier 19.

The switching unit 22 which inputs the output of the stop discriminator 106 disconnects the signal line u from the signal line v when the reset signal is inputted, and connects the signal line u to the signal line v by the output signal from the first bar/space discriminator 108 from the signal line 30a. In other words, the output signal from the stop discriminator 106 is applied to the decoder unit 107 from when the first bar/space decision signal (starting margin decision signal) from the first bar/space discriminator 108 is inputted to control the decoding operation.

Figure 38:
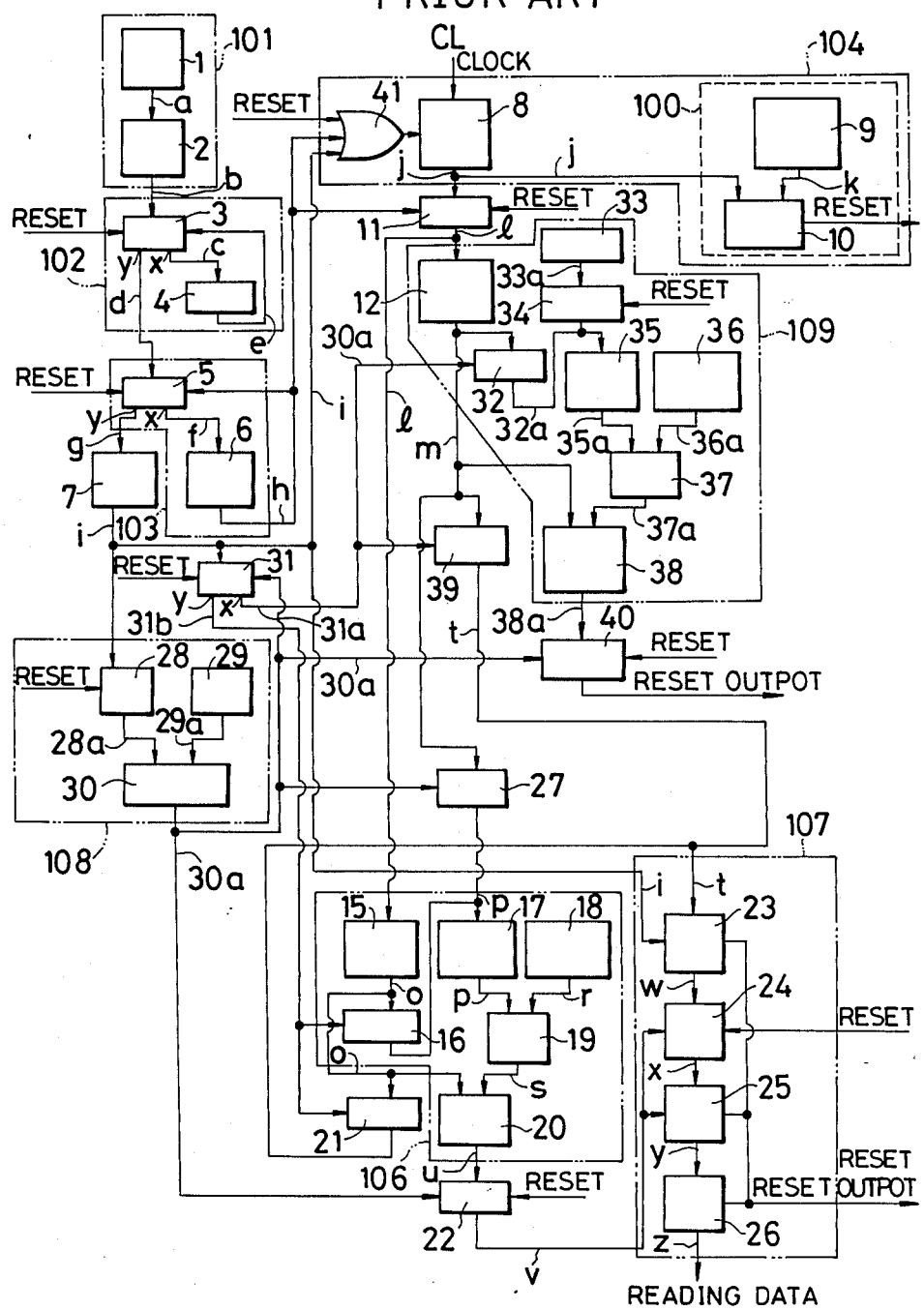

The decoder unit 107 decodes the meaning of the code of the bar code according to the counted value of the clock CL corresponding to the width of the bar or space of the read bar code, and has an arrangement as shown in FIG. 38.

The functions of the blocks of the decoder unit 107 shown in FIG. 38 are as described below.

The bit image converter 23 is operated by the detection output of the second edge detector 7 from the signal line i to convert the counted value inputted from the signal line t, and stores it through a signal line 2 in a bit image memory 24. When an error is generated at the time of the conversion, a reset signal is outputted. The bit image memory 24 operates (i) to store a bit image from the signal line w, (ii) to apply a bit image stored by a signal input from the signal line v through a signal line x to a character converter 25, and (iii) to clear the bit image stored when the reset signal is inputted.

The character converter 25 starts operating by a signal input from the signal line v, converts a bit image inputted from the bit image memory 24 into a character, and applies it through a signal line y to the output circuit 26. If an error is generated in case of the character conversion, the reset signal is outputted.

The output circuit 26 applies a data character signal from the signal line y to an output line z, and supplies it to display means, not shown, or other information processor. The reset signal is outputted when the signal is completely outputted.

FIG. 7 is a block diagram for explaining the arrangement of the essential portion of the start discriminator 109 and the stop discriminator 106 in the embodiment of the invention, where the same reference numerals as those in FIG. 15 designate the same or equivalent components. In FIG. 7, reference numeral 120 designates a counter memory (corresponding to the counter memory 12 of the start discriminator 109 and the stop discriminator 106), numeral 130 denotes a previous counter memory (similarly corresponding to the second previous counter memory 35 and the first previous counter memory 17), numeral 140 depicts a constant register (similarly corresponding to the sixth constant register 36 and the third constant register 18), numeral 150 indicates a multiplier (similarly corresponding to the second multiplier 37 and the first multiplier 19), and numeral 160 designates a comparator (similarly corresponding to the third margin comparator 38 and the second margin comparator 20).

In the embodiment of the invention described above, to decide the starting margin or the stopping margin, the counted value of the present bar or space by scanning of reading the bar code is compared by the value multiplied by a predetermined constant of the counted value of the space or bar of the previous time to discriminate the start or stop, i.e., to decide the start space or stop space.

This invention is not limited to the particular embodiment, and the start or stop can be also discriminated by an embodiment as will be described below.

FIG. 8 is a block diagram of the arrangement of an essential portion of a start discriminator and a stop discriminator for explaining another embodiment of the invention. Reference numeral 170 designates a divider, wherein the same reference numerals as those in FIG. 7 designate the same or equivalent components.

In FIG. 8, the quotient obtained by dividing the counted value of the counter memory 120 by the constant set in the constant register 140 is compared with the counted value of the previous counter memory. The similar advantages as those in FIG. 7 can be provided by this arrangement.

FIG. 9 is a block diagram of the arrangement of an essential portion of a start discriminator and a stop discriminator for explaining modified embodiment of the invention, wherein the same reference numerals as those in FIG. 8 designate the same or equivalent components.

In FIG. 8, the quotient obtained by dividing the counted value of the counter memory 120 by the counted value of the previous counter memory 130 by the divider 170 is compared with the constant set in the constant register 140 by the comparator 160. The similar advantages as those can be provided by this arrangement.

FIG. 10 is a view for explaining the discriminating operation of the start of the invention, and FIG. 11 is a waveform diagram of FIG. 10.

In FIG. 10, a is a scanning line when the starting position is sufficiently separated from the bar code, and FIG. 11(a) shows its reading waveform, and $t_B$ is smaller than $A \times t_A$, where $t_A$ is the counted value corresponding to the reading time of a first bar B1 in FIG. 10, $t_B$ is the counted value corresponding to the reading time of the first space S1, and A is a predetermined constant, and the the possibility of the start of the bar code can be discriminated.

As shown by b in FIG. 10, even if the starting position is sufficiently separated from the bar code, if a contaminant P exists on the way, as shown in FIG. 11(b), quasi-counted value $t_{A1}$ is outputted by the contaminant P. However, the counted value $t_{B1}$ of the space continued to the contaminant becomes $t_{B1}$ larger than $A \times t_{A1}$ is not observed as the bar code. Since the counted value $t_A$ of the first bar B1 of the bar code is smaller than $A \times t_A$ of the counted value $t_B$ of the space S1 continued thereto, this time point is judged to be the start of the bar code.

Then, as shown by c in FIG. 10, even when the starting position is near the bar code, since the counted value $t_A$ of the first bar B1 is smaller than $A \times t_B$ of the counted value $t_B$ of the first space S1, it is judged to be the start of the bar code.

More specifically, since the start of the bar code is discriminated when the counted value $t_B$ of the first space of the bar code is smaller than the magnification of the constant A of the counted value $t_A$ of the first bar of the bar code, the space immediately before the bar code may be small. Thus, the bar code can be densified, the probability of adhering a contaminant to the space of the start is reduced, and an error is hardly generated.

As described above, the predetermined constant A may be larger than (wide bar or space/narrow bar or space).

FIG. 12 is a view for explaining the discriminating operation of the stop of the invention, and FIG. 13 is a waveform diagram of FIG. 12.

Symbol a in FIG. 12 is a scanning line when the scanning speed is slow, FIG. 13(a) is a waveform of reading, FIG. 13(b) is a waveform of reading when the scanning speed is fast, and FIG. 13(c) is a waveform of reading when the scanning speed is fast as shown by c in FIG. 13 and a contaminant exist on the stop space.

In the drawings, when the counted value of the bar or space read by scanning is larger than the value of the magnification of the constant of the counted value ($t_a$ or $t_b$) of the space or bar immediately before, it is regarded as being the end of the bar code, and the decoding operation is started.

Thus, the widths of the space and the bar necessary for the stopping margin are decided irrespective of the scanning speed, the bar code having small width of the stopping margin can be provided, the bar code display can be densified, the possibility of adhering a contaminant can be reduced, and errors can be decreased.

The predetermined constant A may be larger than the value (wide bar or space/narrow bar or space) as described above, e.g., $A = 8$ to be executed.

An embodiment of the invention having fourth aspect will be described with reference to FIG. 16.

Figure 16:
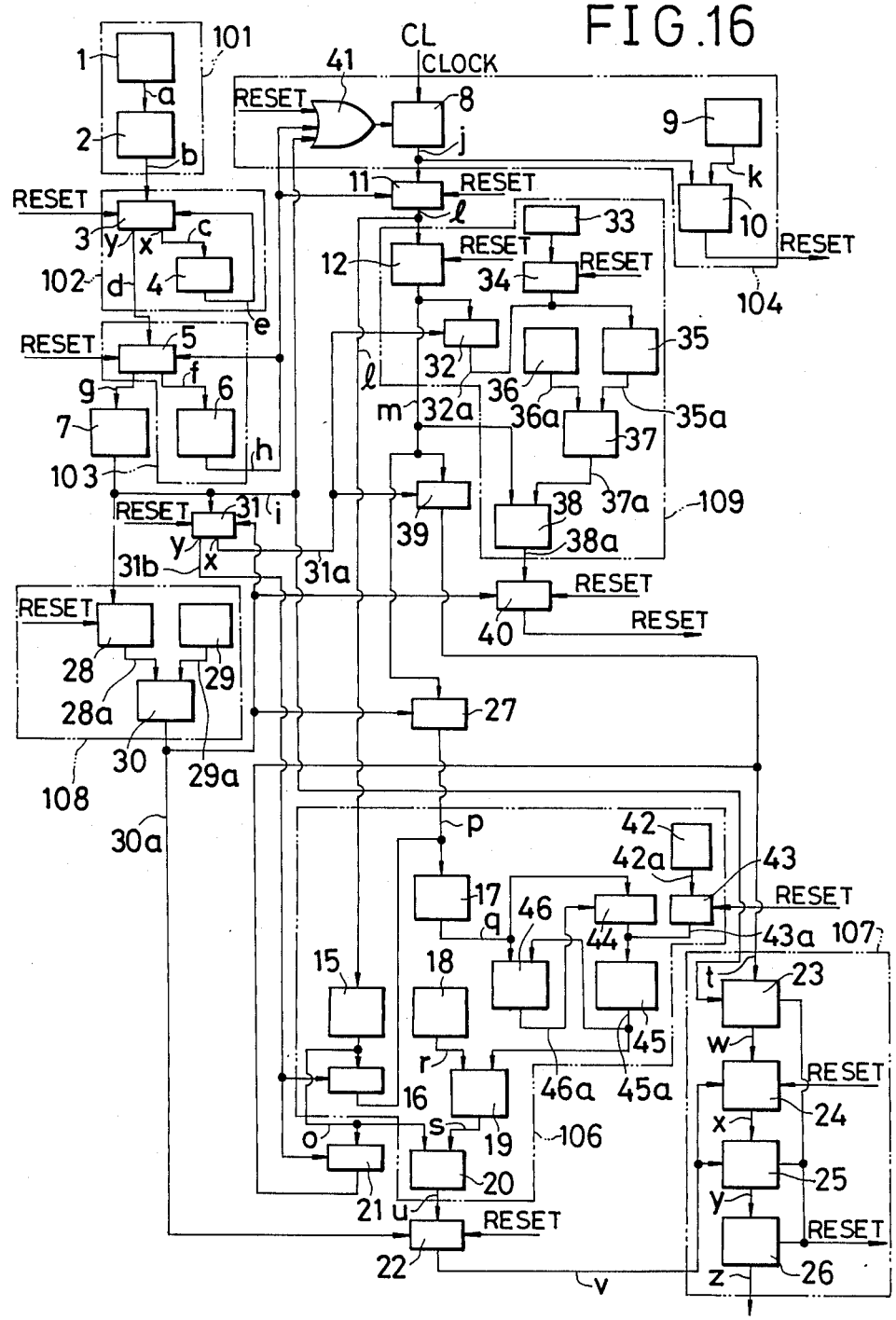
FIG. 16 is a block diagram showing an embodiment of a code reading apparatus according to fourth aspect of the invention.

FIG. 16 is a block diagram of an arrangement of a bar code reader for explaining the embodiment of a code reading apparatus according to the invention, and constructed in a stop discriminator 106. Reference numeral 15 designates a second counter memory, numeral 16 denotes a switching unit, numeral 17 depicts a first previous counter memory, numeral 18 indicates a third constant register, numeral 19 designates a first multiplier, numeral 20 denotes a second margin comparator, numeral 42 depicts a seventh constant register, numerals 43, 44 indicate switching units, numeral 45 designates a minimum value counter memory, and numeral 46 denotes a minimum value comparator, where the same reference numerals as those in FIG. 38 indicate the same or equivalent components, and the other arrangement except the stop discriminator 106 is the same as that in FIG. 38.

In FIG. 16, a binary signal from the photoelectric converter 101 is first supplied to a first space detector 102. After the first space is detected, the first edge of the initial bar or space of the bar code is detected by a first edge detector 102. When the first edge is detected, the switching unit 5 is switched, and the next edge, i.e. the varying point of the bar or space is detected by the second edge detector 7. The first bar/space discriminator 108 detects the first bar and then counts the sum of the bar and the space by the second counter 28, and outputs a signal from the second edge detector 7 to the stop discriminator 106 when the sum arrives at the set number set in the fourth constant register 29 (the numbers of the space and the bar to discriminate the start) by switching the switching unit 31. The switching unit 31 applies the signal from the second edge detector 7 to the start discriminator 109 by the reset signal. The start discriminator 109 compares at least initial bar with the counted value of the space, and judges as a start if the counted value of the space or the bar (the content of the first counter memory 12) is less than the magnification of a predetermined constant A (the content of the sixth constant register 36) of the counted value of the space or the bar immediately before (the content of the second previous counter memory 35) to produce an output from the third margin comparator 38 to the switching unit 40. The first counter memory 12 stores the counted value from the counter unit 104, and applies it from the switching unit 32 to the second previous counter memory 35 and the third margin comparator 38. Larger counted value (than a wide bar or a space/slow scanning speed), i.e., the counted value larger than that of the wide bar or wide space at the lowest speed presumed by the scanning speed of the photoelectric conversion unit is set in advance in the fifth constant register 33, and stored in the second previous counter memory 35 when the reset signal is inputted to the switching unit 34. The stored counted value is multiplied by the value larger than (wide bar or space/narrow bar or space) set in the sixth constant register 36 by the second multiplier 37, and supplied to the third margin comparator 38. The switching unit 39 supplies the value of the first counter memory 13 to the decoder unit 107 when the switching unit 31 is switched to the side x. The switching unit 21 applies the counted value of the bar or space from the second counter memory 15 of the stop discriminator 106 to the decoder unit 107 as will be described, and the switching unit 27 supplies the counted value of the last bar or space used to discriminate the start by the start discriminator 109 to the first previous counter memory 17 of the stop discriminator 106 when the first bar/space discriminator 108 has an output (to be described later).

The operation of the arrangement described above is the same as that in FIG. 38, and the detailed description thereof will be omitted.

In the embodiment shown in FIG. 16 is different from the prior art disclosed in FIG. 38 in the arrangement and the operation of the stop discriminator.

The arrangement and the operation of the stop discriminator 106 will be described.

The stop discriminator 106 applies a stop decision output from the second margin comparator 20 to the signal line u when the counted value of the bar or space to be read at present, i.e., the content of the second counter memory 15 becomes the magnification or more of the predetermined constant B (the content set in the third constant resistor 18) of the minimum value (the content of the minimum value counter memory 45) of the counted value (the content of the second counter memory 15) of the space or bar reading at present. The value larger than the counted value of (wide bar or space/slow scanning speed) is set in advance in the constant register 42, and stored in the minimum value counter memory 45 when the switching unit 43 is operated by the reset signal. The minimum value comparator 46 compares the counted value of the first previous counter memory 17 with the value stored in the minimum value counter memory 45, operates the switching unit 44 when the value of the first previous counter memory 17 is smaller than the value of the minimum value counter memory 45 to store the value of the first previous counter memory 17 in the minimum value counter memory 45. In other words, the minimum counted value of the bar or space reading so far at present is stored in the minimum value counter memory 45.

Figure 18:
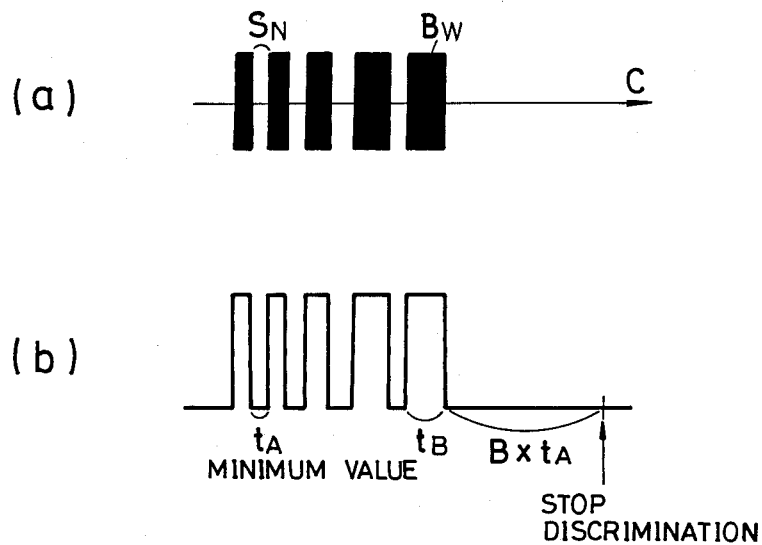
FIG. 18, (a) (b), and (c) is a view for explaining the operation of FIG. 16.

FIG. 18 is an explanatory view of the top discrimination by the arrangement in FIG. 16, wherein FIG. 18(a) shows a bar code, where $S_N$ is a narrow space, $B_W$ is a wide bar, and C is the scanning direction. FIG. 18(b) is a waveform diagram of the waveform obtained by scanning the bar code in FIG. 18(a), where $t_A$ is the counted value of the narrow space (minimum space) $S_N$, $t_B$ is the counted value of the wide bar $B_W$, and B is a predetermined constant set to (wide bar or space/narrow bar or space).

As shown in FIGS. 18, the discrimination of the stop is executed when the magnification of the predetermined constant B of the minimum counted value (the counted value of the minimum narrow space in this case) of the code reading so far. Thus, this does not has a limit that the stop margin of the magnification or more of the predetermined constant A of the wide bar must be obtained by presuming that the final code is of a wide bar to reduce the space of the code.

According to the arrangement described above, a contaminant exists on a code region, a reset signal is generated as an error to operate to inhibit the decoding. However, if an error occurs at a fine contaminant, the reading probability decreases, and it is not preferable in its operability.

An embodiment of the invention in which the error of such a fine contaminant is not generated, but ignored to enhance the reading probability will be described.

Figure 17:
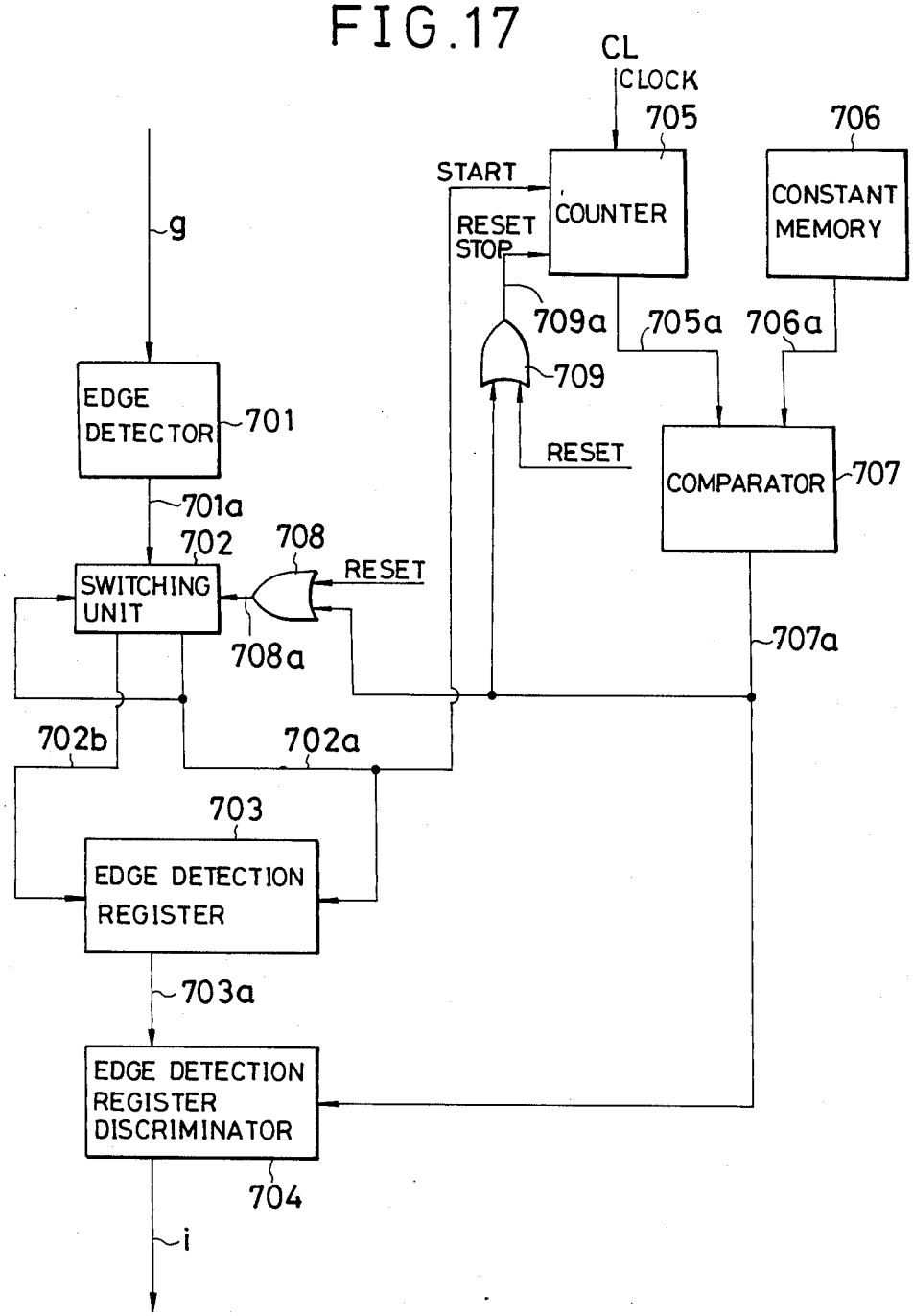
FIG. 17 is a block diagram of an essential arrangement of other embodiment.

FIG. 17 is a block diagram for explaining an essential portion of other embodiment of the present invention illustrating the arrangement of the second edge detector 7 in FIG. 16.

In FIG. 17, reference numeral 701 designates an edge detector, numeral 702 denotes a switching unit, numeral 703 depicts an edge detection register, numeral 704 indicates an edge detection register discriminator, numeral 705 designates a counter, numeral 706 denotes a constant memory, numeral 707 depicts a comparator, and numerals 708, 709 indicate OR circuits.

The edge detector 701 applies a signal to a signal line 701a only when the signal from a signal line g, i.e., the output signal of the photoelectric converter 101 in FIG. 16 is varied from "H" to "L" or "L" to "H". The switching unit 702 applies an edge detection signal from the edge detector 701 from the signal line 701a to a signal line 702a to set the edge detection signal in the edge detection register 703 when the reset signal is inputted through the OR circuit 708, sets the edge detection signal in the edge detection register 703, applies a start signal to the counter 705 to start the clock counting of the counter 705, and switches the switching unit 702 to the side of the signal line 702b. The edge detection register discriminator 704 operates when a signal is fed from the signal line 707a thereto to apply an output signal to the signal line i only when the edge detection register 703 is set. The edge detection register 703 is reset by the signal from the signal line 702b.

The counter 705 sets the counter to "0" by the signal from the output signal line 707a through the OR circuit 709 to stop counting, starts counting of the clock signal CL by the signal input from the signal line 702a, and applies the content through the signal line 705a to the comparator 707. The value smaller than the counted value of the minimum bar of space at the maximum scanning speed to be presumed of the scanning speed of the photoelectric converter (narrow bar or space/maximum scanning speed) is set in advance in the constant memory 706, and this value is applied through the signal line 706a to the comparator 707, and compared with the counted value from the signal line 705a. As a result of comparison, the counted value of the counter 705 is fed as the comparison output to the signal line 707a when it becomes larger than the set value of the constant memory 706.

The comparison output on the signal line 707a is set by the counter 705 to stop counting, to set the content to "0", to switch the switching unit 702 to the signal line 702a, and to operate the edge detection register discriminator. In other words, if the edge is again detected within a predetermined count (the value of the constant memory 706) after the edge is initially detected, the edge detection register is reset. Thus, the edge detection signal is not outputted from the signal line i even if the edge detection register discriminator is operated by the signal from the signal line 707a.

As described above, the second edge detector 7 of FIG. 16 is constructed as described above, a contaminant which becomes a value smaller than the counted value of the minimum bar or space at the maximum scanning speed to be presumed at the scanning of reading by the photoelectric converter of the code reading apparatus, set in the constant memory 706 is ignored.

Figure 19:
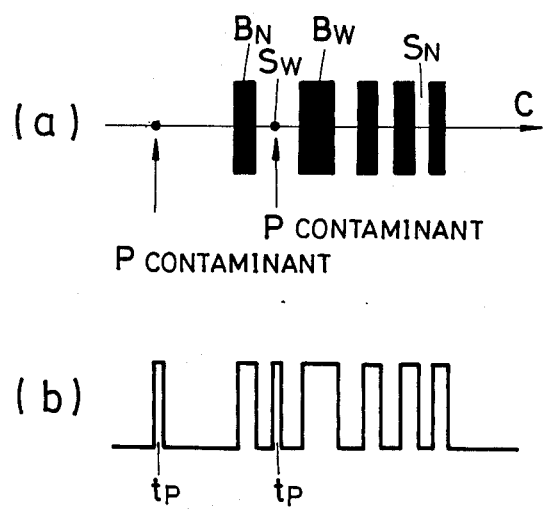
FIG. 19, (a) (b), and (c) is a view for explaining the operation of FIG. 17.

FIG. 19 is an explanatory vie of the operation of the arrangement in FIG. 17, wherein FIG. 19(a) shows a bar code, where $B_N$, $B_W$ are bars, $S_N$, $S_W$ are spaces, C is scanning direction, and P is a fine contaminant. FIGS. 19(b) is a waveform diagram of the waveform obtained by scanning the bar code of FIG. 19(a), where $t_P$ designates a counted value of the contaminant P.

The counter counts the clock CL by the contaminant P of the bar code shown in FIG. 19 to apply the counted value of $t_P$. When this counted value does not exceed the value set in the constant memory 706 of FIG. 17, the edge detection of the contaminant P is reset.

Thus, the generation of the error due to the fine contaminant can be reduced to decrease an unnecessary error, and the reading probability is improved.

An embodiment of the invention having fifth aspect will be described with reference to the drawings.

Figure 20:
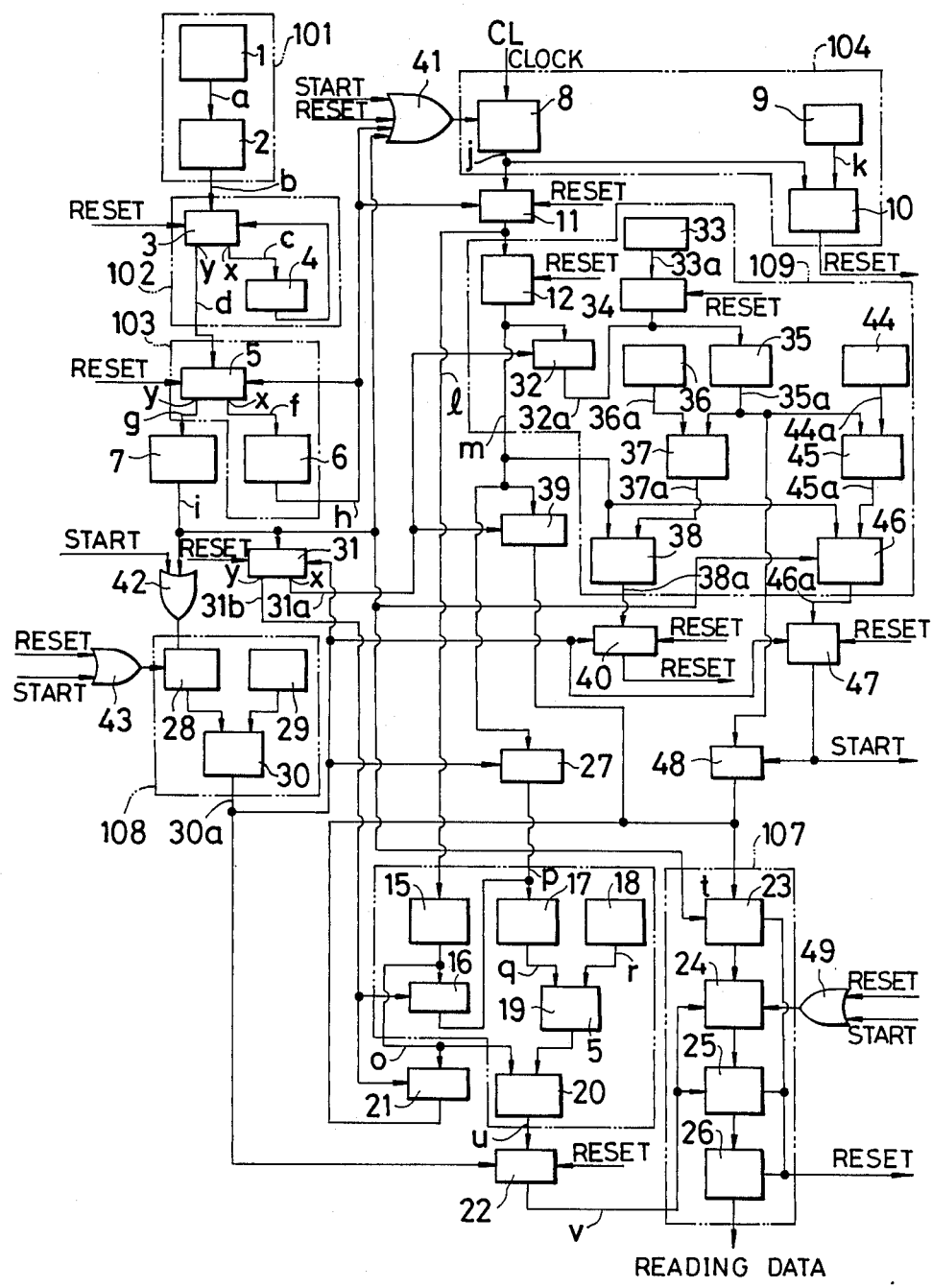
FIG. 20 is a block diagram sowing an embodiment of a code reading apparatus according to fifth aspect of the invention.

FIG. 20 is a block diagram of an arrangement of a bar code reader for explaining the embodiment of a code reading apparatus according to the invention. Reference numeral 109 designates a start discriminator which comprises a first counter memory 12, a switching unit 32, a fifth constant register 33, a switching unit 34, a second previous counter memory 37, a third margin comparator 38, a seventh constant register 44, a divider 45, and a fourth margin comparator 46. Numerals 42, 43, 49 designate OR circuits, numerals 47, 48 denote switching units. Other arrangement except these components is the same as that of the prior art described with reference to FIG. 38, wherein the same reference numerals as those in FIG. 38 designate the same or equivalent components.

In FIG. 20, a binary signal from the photoelectric converter 101 is first supplied to a first space detector 102. After the first space is detected, the first edge of the initial bar or space of the bar code is detected by a first edge detector 102. When the first edge is detected, the switching unit 5 is switched, and the next edge, i.e. the varying point of the bar or space is detected by the second edge detector 7. The first bar/space discriminator 108 detects the first bar and then counts the sum of the bar and the space by the second counter 28, and outputs a signal from the second edge detector 7 to the stop discriminator 106 when the sum arrives at the set number set in the fourth constant register 29 (the numbers of the space and the bar to discriminate the start: 2 or more) by switching the switching unit 31. The switching unit 31 applies the signal from the second edge detector 7 to the start discriminator 109 by the reset signal.

The start discriminator 109 compares at least initial bar of the read bar code with the counted value of the space, and applies a reset signal through the signal line 38a to reset the reading when the counted value of the space or bar becomes the magnification or more of the predetermined constant (the content of the sixth constant register 36) of the counted value of the space or bar immediately before. Further, when the second edge detection signal is inputted through the signal line i from the second edge detector 7 to the fourth margin comparator 46, an output is generated at the signal line 46a from the fourth margin comparator 46 to apply the restart signal through the switching unit 47 when the counted value of the present space or bar becomes 1 or less divided by the predetermined constant (the content of the seventh constant register) of the counted value of the bar or space immediately before.

In the start discriminator 109, the value (predetermined constant) larger than (wide bar or wide space/narrow bar or narrow space) is set in advance in the seventh constant register 44, the value is fed to the signal line 44a, the counted value from the second previous counter memory 35 is divided by the predetermined constant from the signal line 44a, and the result is supplied through the signal line 45a to the fourth margin comparator 46. The fourth margin comparator 46 operates only when the signal is inputted from the second edge detector 7 supplied through the signal line 8, compares the counted value of the first counter memory 12 inputted through the signal line m with the output value of the divider 45 from the signal line 45a, applies an output to the signal line 46a when the counted value of the first counter memory 12 is the output value or lower of the divider 45, and applies it as a reset signal to the switching unit 47. The switching unit 47 is operated to connect the signal line 46a to the start signal line by the input of the reset signal, and then (ii) disconnect the signal line 30a to the start signal line by the output signal of the first bar/space discriminator 108 inputted through the signal line 30a. The switching unit 48 connects the signal line 30a to the signal line t only when the restart signal is inputted thereto, and supplies the counted value of the second previous counter memory 35 to the decoder unit 107.

The OR circuit 43 feeds the signal to the second counter 28 when the reset signal or the restart signal is inputted thereto to clear the counter to "0", and the OR circuit 49 clears the content of the bit image memory 24 of the decoder unit 107 when the reset signal or the restart signal is inputted thereto. The OR circuit 41 clears the first counter 8 of the counter unit 104 to "0" when the restart signal, the reset signal or the signal from the signal line h or the signal from the signal line i is inputted thereto to start counting, and the OR circuit 42 increments the second counter 28 of the first bar/space discriminator 108 when the restart signal or the signal from the signal line i is inputted thereto.

As described above, the start discriminator 109 compares at least initial bar with the counted value of the space, and applies an output from the third margin comparator 38 to the switching unit 40 when the counted value (the content of the first counter memory 12) of the space or bar becomes the magnification or more of the predetermined constant A (the content of the sixth constant register 36) of the counted value (the content of the second previous counter memory 35) of the space or bar immediately before. The first counter memory 12 stores the counted value from the counter unit 104, and supplies it from the switching unit 32 to the second previous counter memory 35. The counted value larger than (wide bar or wide space/slow scanning speed), i.e., the counted value of the wide bar or wide space is set in advance at the minimum speed to be presumed of the scanning speed of the photoelectric conversion unit 101 in the fifth constant register 33, and when the reset signal is inputted to the switching unit 34, it is stored in the second previous counter memory 35. The stored counted value is multiplied by the value larger than (wide bar or wide space/narrow bar or narrow space) set in the sixth constant register 36 by the second multiplier 37, and supplied to the third margin comparator 38.

At this time, the counted value of the second previous counter memory 35 is divided by the constant set in the seventh constant register 44, i.e., the value larger than (wide bar or wide space/narrow bar or narrow space), the divided result is compared by the fourth margin comparator 46 with the counted value of the first counter memory 12, and the fourth margin comparator 46 applies the restart signal as the comparison output when the counted value of the first counter memory 12 is smaller. In other words, the start of reading is initialized when the present counted value is smaller than the value obtained by dividing the counted value immediately before by the predetermined constant. the FIG. 21 is an explanatory view of the operation of the embodiment of the invention in FIG. 20, wherein FIG. 21($a$) shows a bar code, FIG. 21($b$) shows the counted value of the clock CL in the reading waveform of the bar code, and in FIG. 21($a$) where P is contaminant, $B_N$ is a narrow bar, $S_N$ is a narrow space, $B_W$ is a wide bar, and $S_W$ is a wide space, and in FIG. 21($b$) where $t_A$ is the counted value of the contaminant P, $t_B$ is the counted value of the space (first starting space) of the contaminant P, $t_C$ is the counted value of the first bar $B_N$, and A is a predetermined constant (the set value of the seventy constant register 44 of FIG. 20).

In the discrimination of the start in the prior art disclosed in FIG. 38, the counted value $t_A$ of the contaminant P is multiplied by the constant B (the value larger than (wide bar or wide space/narrow bar or narrow space)) set in the sixth constant register 36 ($B \times t_A$), reset if the value of ($B \times t_A$) is smaller than the counted value $t_B$ of the space from the contaminant P to the first bar $B_N$, the next bar ($N_B$) is discriminated at the start as the first bar, and the reading is executed. However, when the value of ($B \times t_A$) is larger than the value of $t_B$, the contaminant P is inputted as the bar, and reading error is resultantly generated.

On the contrary, according to the present invention, as shown in FIG. 21($b$), the start is discriminated by $t_B/A$ larger than $t_C$, and the restart is initialized. Thus, since the reading is executed with the initial bar $B_N$ in FIG. 21($a$) as the start of the bar code (the first bar in this case), the contaminant P is ignored.

The discrimination of the stop and the other operation in FIG. 20 are the same as the prior art shown in FIG. 38, and the description thereof will be omitted.

An embodiment of the invention having sixth aspect will be described with reference to the drawings.

Figure 22:
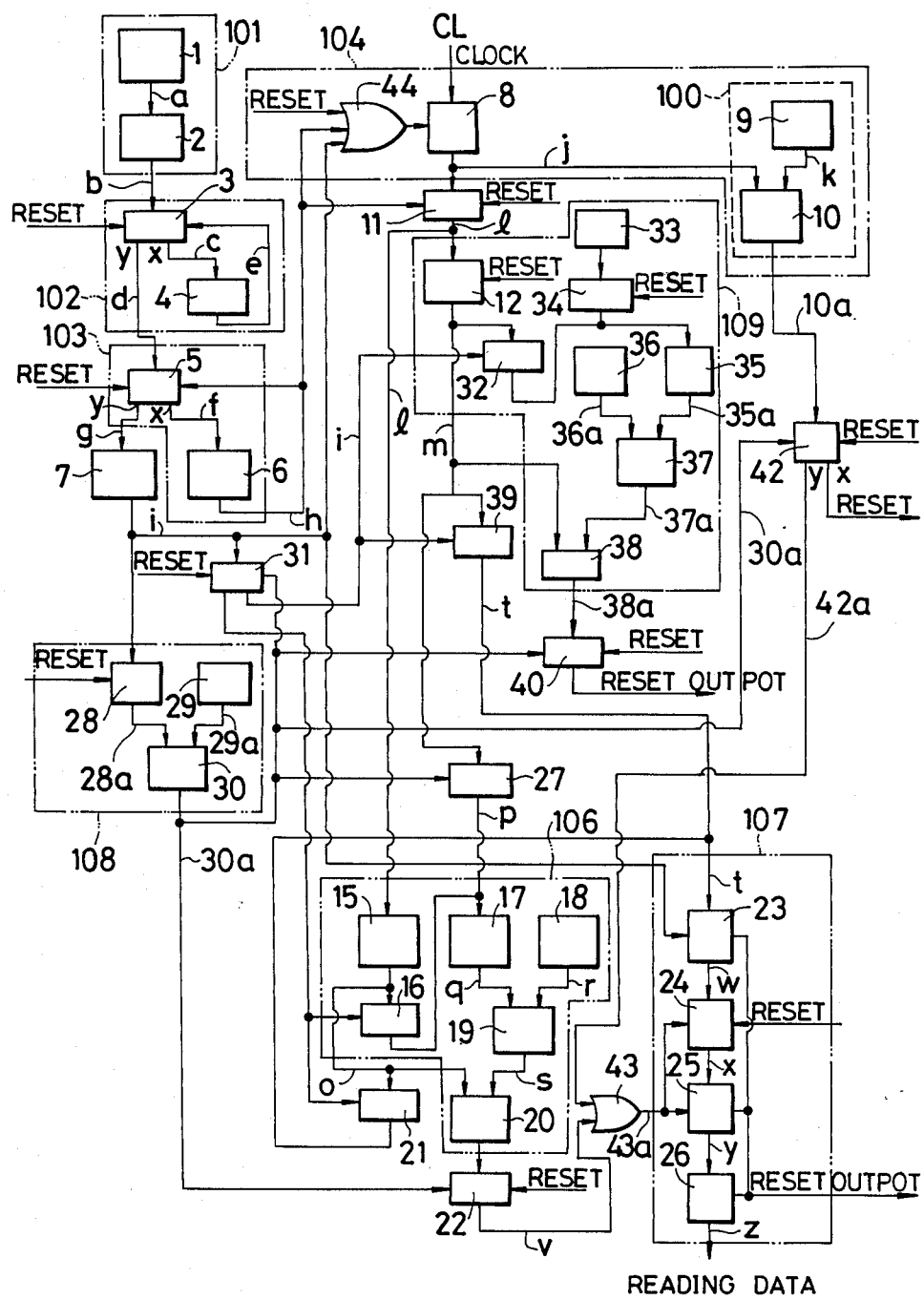
FIG. 22 is a block diagram sowing an embodiment of a code reading apparatus according to sixth aspect of the invention.

FIG. 22 is a block diagram showing an embodiment of the invention. The arrangements of photoelectric conversion unit 101, first space detector 102, first edge detector 103, second edge detector 7, switching unit 31, first bar/space discriminator 108, counter unit 104, switching unit 11, start discriminator 109, switching units 39, 40, 27, stop discriminator 106, switching units 21, 22, and decoder unit 107 are the same as those of the prior art described with respect to FIG. 38, and the operation is the same except that one of the stop decision signals is used as the detection signal of the overflow detection unit 100 of the counter unit 104.

Here, the arrangement and the operation for discriminating the stop by the overflow detection signal of the essential point of this embodiment will be described, and the arrangement and the operation common to the prior art will be omitted.

In FIG. 22, the counter unit 104 comprises a first counter 8 cleared to "0" by the signal inputted through the OR circuit 44 to start counting, a first constant register 9 for setting the constant for deciding the overflow value and an overflow comparator 10 for comparing the counted value of the first counter 8 with the set value of the first constant register 9 to output an overflow detection signal.

The counter unit constructed as described above counts the clock CL corresponding to the reading width of the bar or space of the code, discriminates the start at the counted value by the start discriminator 109, discriminates the stop by the stop discriminator 106, and bit image-convert in the decoder unit 107. On the other hand, the counted value is inputted to the overflow detection unit 100, and compared with the constant set in the first constant register 9 in the overflow comparator 10.

The detection signal (the signal on the signal line 10$a$) of the overflow detection unit 100 is inputted to the switching unit 42 switched to the side y by the signal on the signal line 30$a$ generated when the first bar/space discriminator 108 detected the first bar or fist space of the code. The switching unit 42 is switched to the side x by the input of the reset signal to output the overflow detection signal of the overflow detection unit as the reset signal.

When the overflow is generated in the first counter 8 of the counter unit 104 in the state that the switching unit 42 is switched to the side y, the overflow detection signal is applied from the switching unit 42 through the OR circuit 43 to the decode command signal of the decoder unit 107.

FIG. 23 is an explanatory view of the operation described above, where FIG. 23($a$) shows a bar code of the code, and C is the scanning direction, FIG. 23($b$) is a waveform of reading by fastly scanning the bar code of FIG. 23($a$), $t_A$ is the counted value of the bar or space, A is the constant set in the third constant register 18 of the stop discriminator 106 of FIG. 22, and FIG. 23($c$) is a waveform of reading by slowly scanning the bar code.

In FIG. 23, the counted value $t_A$ of th clock CL of the last bar or space (the bar in this case) is small in FIG. 23($b$) of reading the bar code of FIG. 23($a$) at the fast scanning speed, and when it is multiplied by the constant A, the stop decision signal is applied from the second margin comparator 20 of the stop discriminator 106 through the switching unit 22 from the OR circuit 43 to the decoder unit 107. Thus, the counted value of the read code is decoded.

Of course, the constant A set in the third constant register 18 is set to be smaller than the constant set in the first constant register 9 of the overflow detector 100 of the counter unit 104.

On the other hand as shown in FIG. 23($c$), if the value of $t_A$ of the last bar of the code is increased and the value obtained by multiplying the value $t_A$ by the constant A becomes larger than the constant set in the first constant register 9 of the overflow detector 100 since the reading is executed at the slow scanning speed, it is reset by the detection signal of generating the overlow in the arrangement in FIG. 38. However, in the arrangement of the embodiment of the invention shown in FIG. 22, the overflow detection signal is applied through the switching unit 42 and the OR circuit 43 to the decoder unit 107 to function as the stop decision signal, thereby obtaining the output data by decoding the read code.

As described above, even at the slow speed that the rereading operation must be executed in the prior art, correct reading data can be obtained in the embodiment of the invention.

Figure 24:
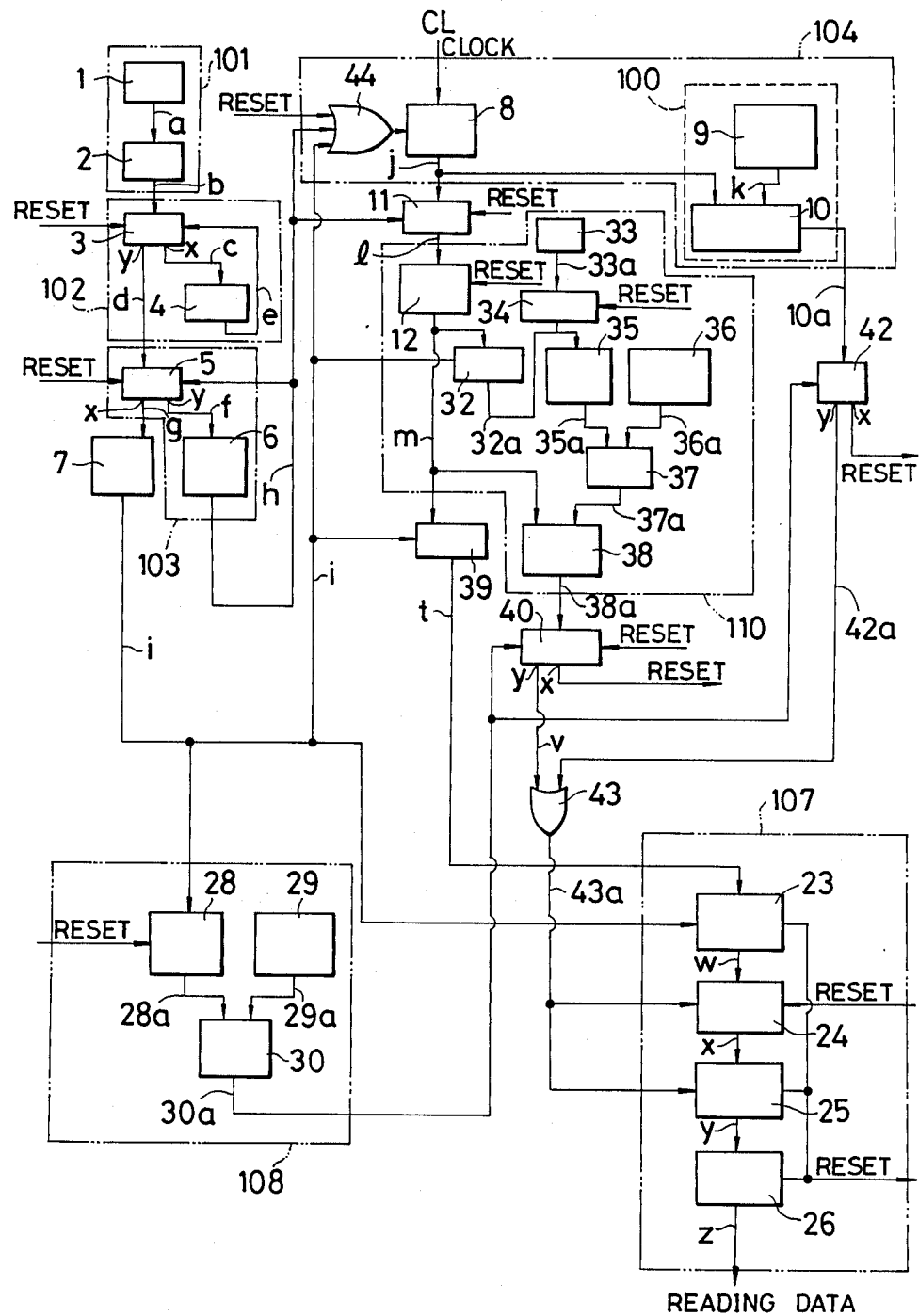
FIG. 24 is a block diagram showing other embodiment of FIG. 22.
Figure 41:
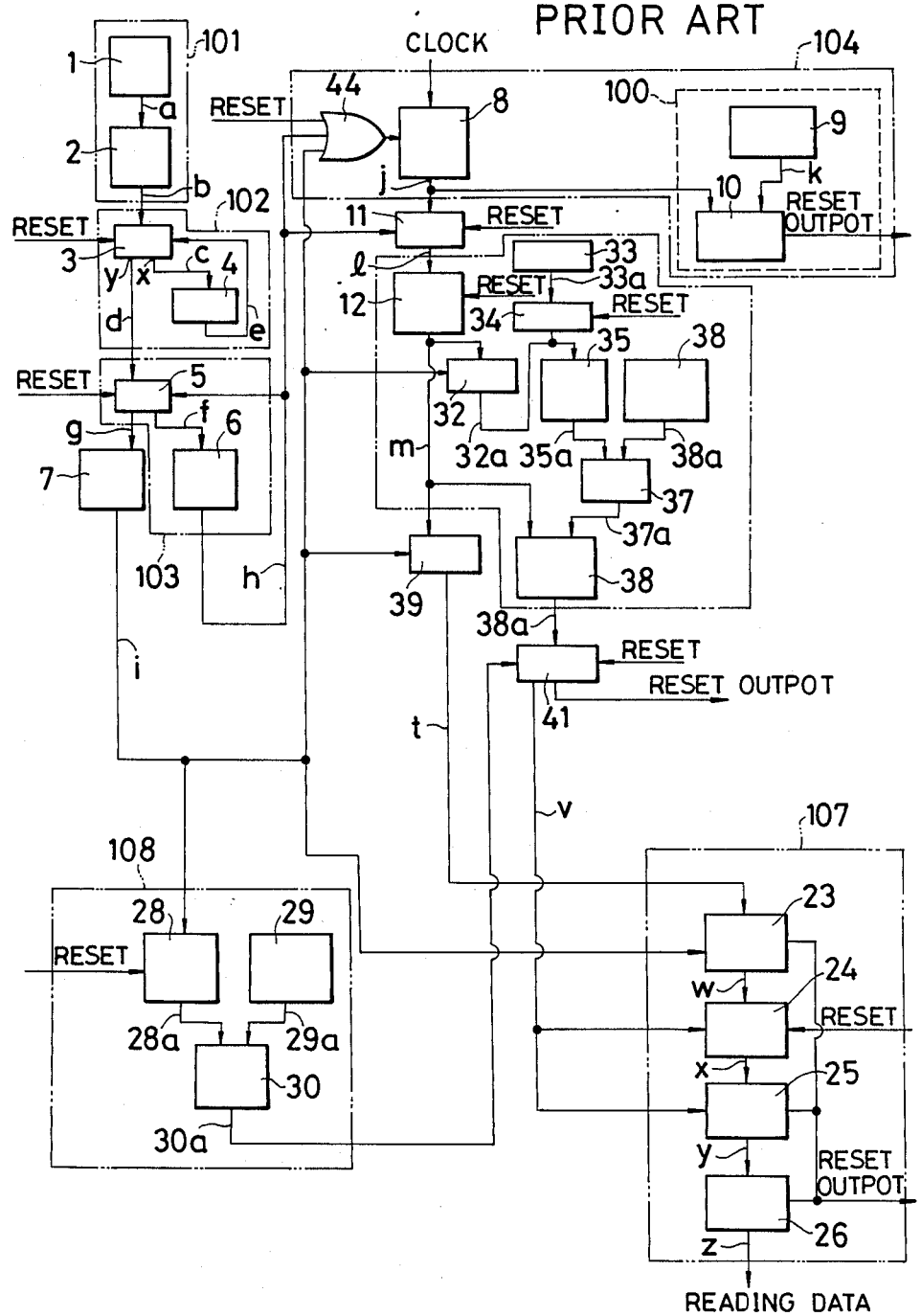

FIG. 24 is a block diagram showing other embodiment of the invention, corresponding to the prior art shown in FIG. 41.

In the arrangement in FIG. 24, the functions of discriminating both the start and the stop of reading the code are provided by the same start/stop discriminator 110, the components of the photoelectric conversion unit 101, first space detection unit 102, first edge detection unit 103, second edge detector 7, first bar/space discriminator 108, counter unit 104, start/stop discriminator 110, decoder unit 107 and switching units 11, 39, 40 are the same in the arrangement and the functions as those in FIG. 41. In this embodiment, the feature resides in the provision of the switching unit 42 for switching from the side x to the side y by the decision signal of the first bar/space discriminator 108 to the output side of the overflow detector 100 of the counter unit 104.

In this embodiment, instead of the start/stop discriminator 110 which discriminates both the start and stop of reading the code by separate arrangements, a common start/stop discriminator 110 is provided, and the overflow detection signal of the overflow detector 100 of the counter unit 104 is applied, similarly to the embodiment in FIG. 22, as a stop decision signal through the OR circuit 43 to the decoder unit 107.

In the arrangement described above, as shown in FIG. 23(c) of FIG. 23, since the overflow detection signal is applied through the switching unit 42 to the decoder unit 107 as a stop decision signal even if the overflow is detected in the overflow detector 100 of the counter unit before the counted value of the last code is increased at the present counted value than the value obtained by multiplying it by the constant set in the sixth constant register 36 to discriminate the stop when the code is read at the slow scanning speed and the start/stop discriminator 110 functions as discriminating the stop, the read code is decoded, and it is not necessary to reread the code as in the arrangement of FIG. 41.

Figure 25:
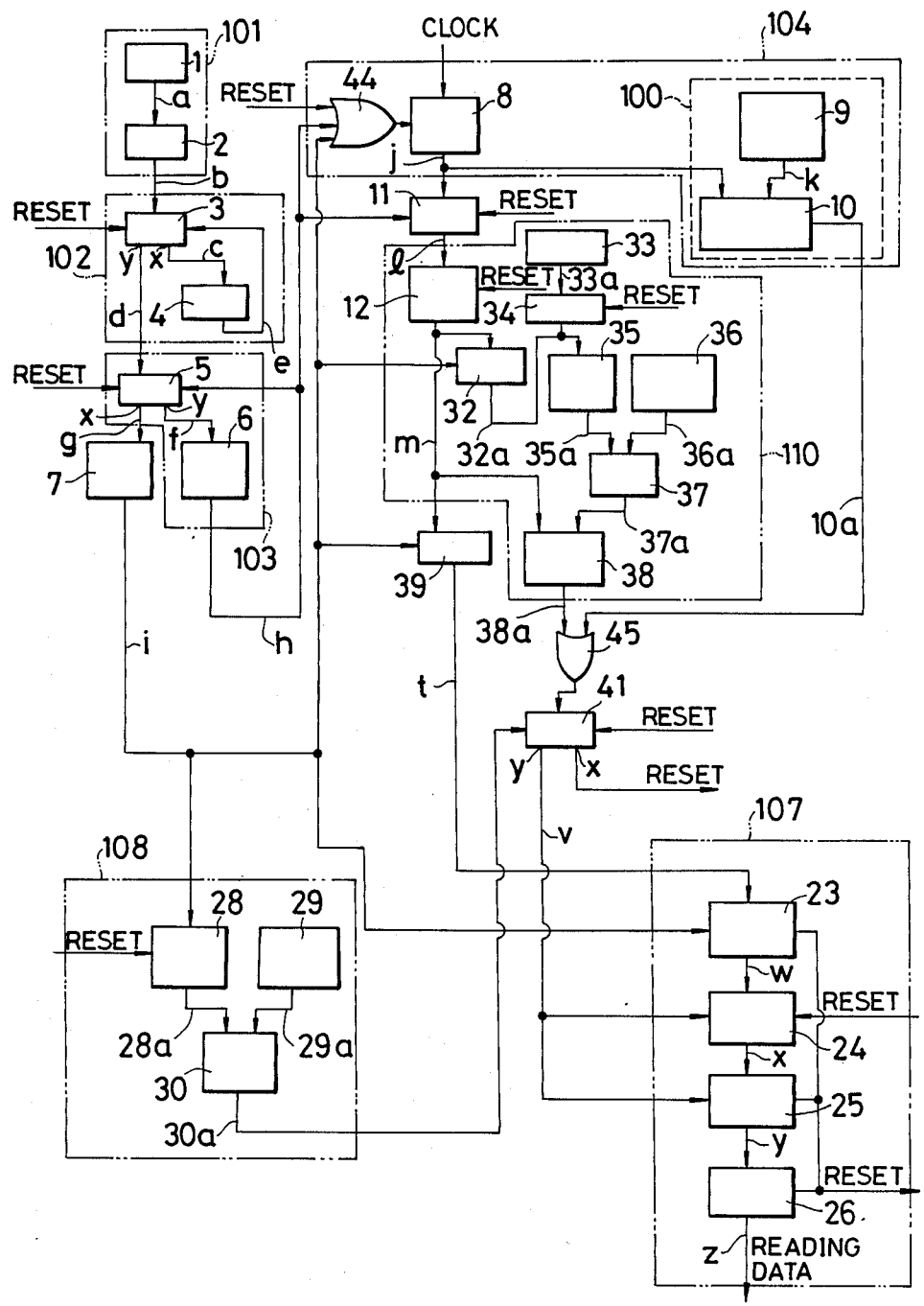

FIG. 25 is a block diagram of further modified embodiment of the invention, corresponds to the prior art of FIG. 41 similarly to FIG. 24.

The code reading apparatus of the embodiment in FIG. 25 is the same as that of the embodiment described with respect to FIG. 24 except the operation to input the decision signal of the start/stop discriminator 110 and the overflow detection signal of the overflow detector 100 of the counter unit 104 through the OR circuit 45 to the switching unit 41 to decode in the decoder unit 107 by any of the stop decision signal of the stop discriminator 110 and the overflow detection signal of the overflow detector 100.

In FIG. 25, the switching unit 41 is switched by the reset input to the side x to output the start/stop detection signal on the signal line 45a from the OR circuit 45 or the overflow detection signal on the signal line 10a as the reset signal, and is switched to the side y when the signal exists on the output signal line 30a of the first space discriminator 108, inputs the signal on the output signal line 45a of the OR circuit 45 through the signal line v to the decoder unit 17 to operate the bit image memory 34 and the character converter 25.

Even by the arrangement described above, when the code is read at a slow scanning speed as shown in FIG. 23(c) and the overflow detector 100 detects the overflow before the start/stop discriminator 110 outputs the stop decision signal, the overflow detection signal instructs through the OR circuit 45 and the switching unit 41 the decoder unit 107 with the decoding operation. Thus, it is not necessary to reread it as in the prior art shown in FIGS. 38 and 41.

The OR circuit 44 in the embodiment described above is provided to apply the reset signal, the first edge detection signal of the first edge detection unit 103 and the decision signal of the first bar/space discriminator 108 to the first counter 8 of the counter unit 104 to clear the counter to "0", thereby starting counting, corresponding to the OR circuit 41 of FIG. 38 and the OR circuit 44 in FIG. 41. Still another embodiment of the invention having seventh aspect will be described with reference to the drawings.

Figure 26:
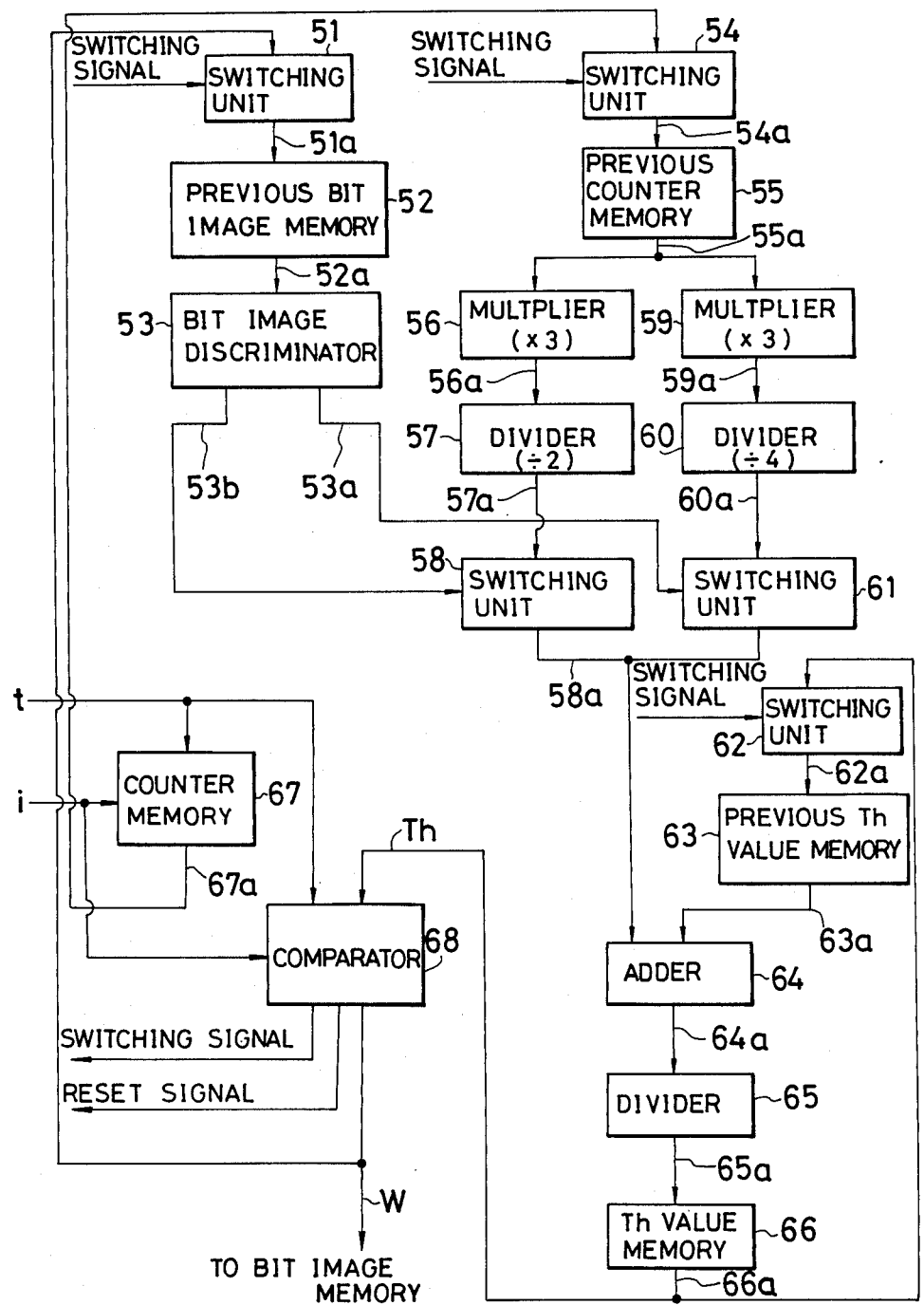
FIG. 26 is a block diagram showing other embodiment of FIG. 24.

FIG. 26 is a block diagram showing an embodiment of the arrangement of the essential portion of a code reading apparatus according to the invention. Reference numeral 51 designates a switching unit, numeral 52 denotes a previous bit image memory, numeral 53 depicts a bit image discriminator, numeral 54 indicates a switching unit, numeral 55 designates a previous counter memory, numeral 56 denotes a multiplier, numeral 57 depicts a divider, numeral 58 indicates a switching unit, numeral 59 designates a multiplier, numeral 60 denotes a divider, numeral 61 depicts a switching unit, numeral 62 indicates a switching unit, numeral 63 designates a previous Th value memory, numeral 64 denotes an adder, numeral 65 depicts a divider, numeral 66 indicates a Th value memory, numeral 67 designates a counter memory, and numeral 68 denotes a comparator.

Symbol t is an input line of the counted value of the clock CL outputted from the counter unit in response to the size of "H", "L" from the photoelectric conversion unit, symbol i is an input line of the detection signal (the trailing edge detection signal of the bar or space) of the varying point of "H", "L", and symbol w is a bit image conversion signal line.

Figure 28:
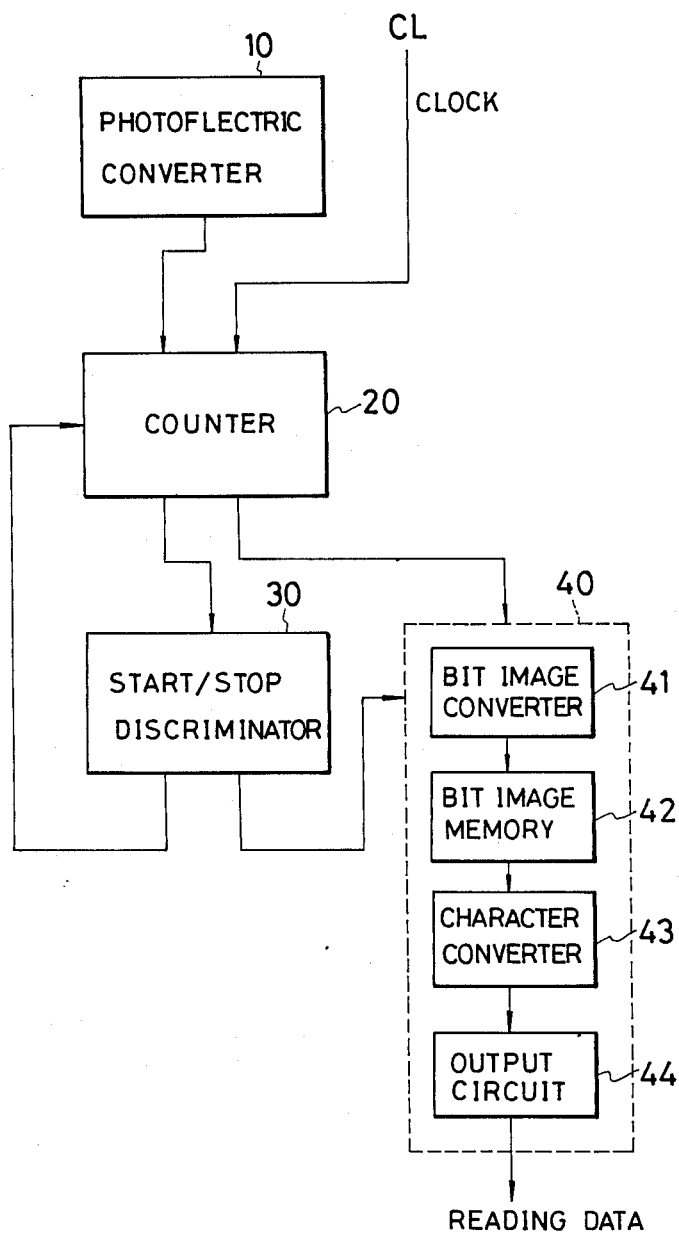
FIG. 28 is a block diagram of a code reading apparatus of FIGS. 26, 42.
Figure 42:
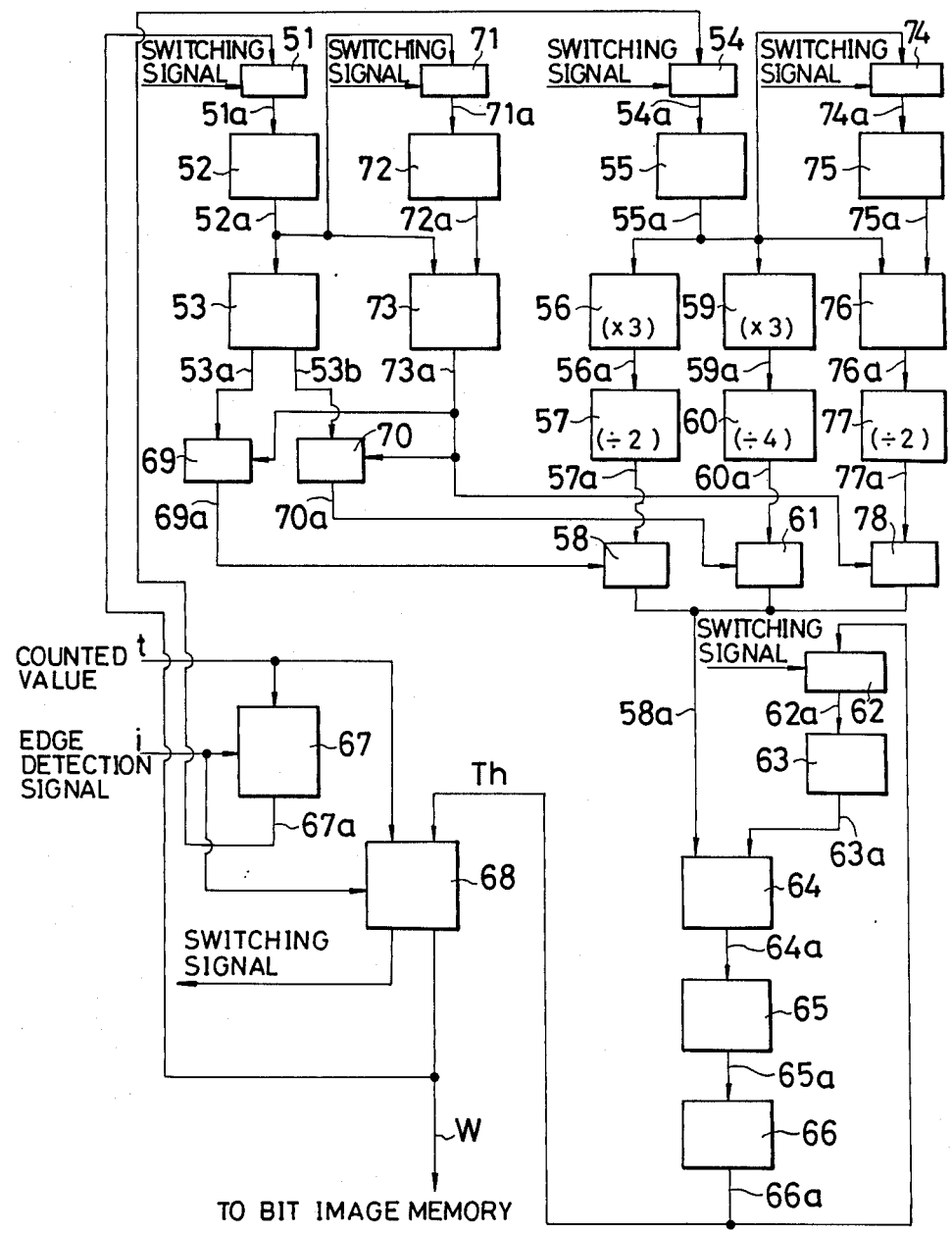
Figure 43:
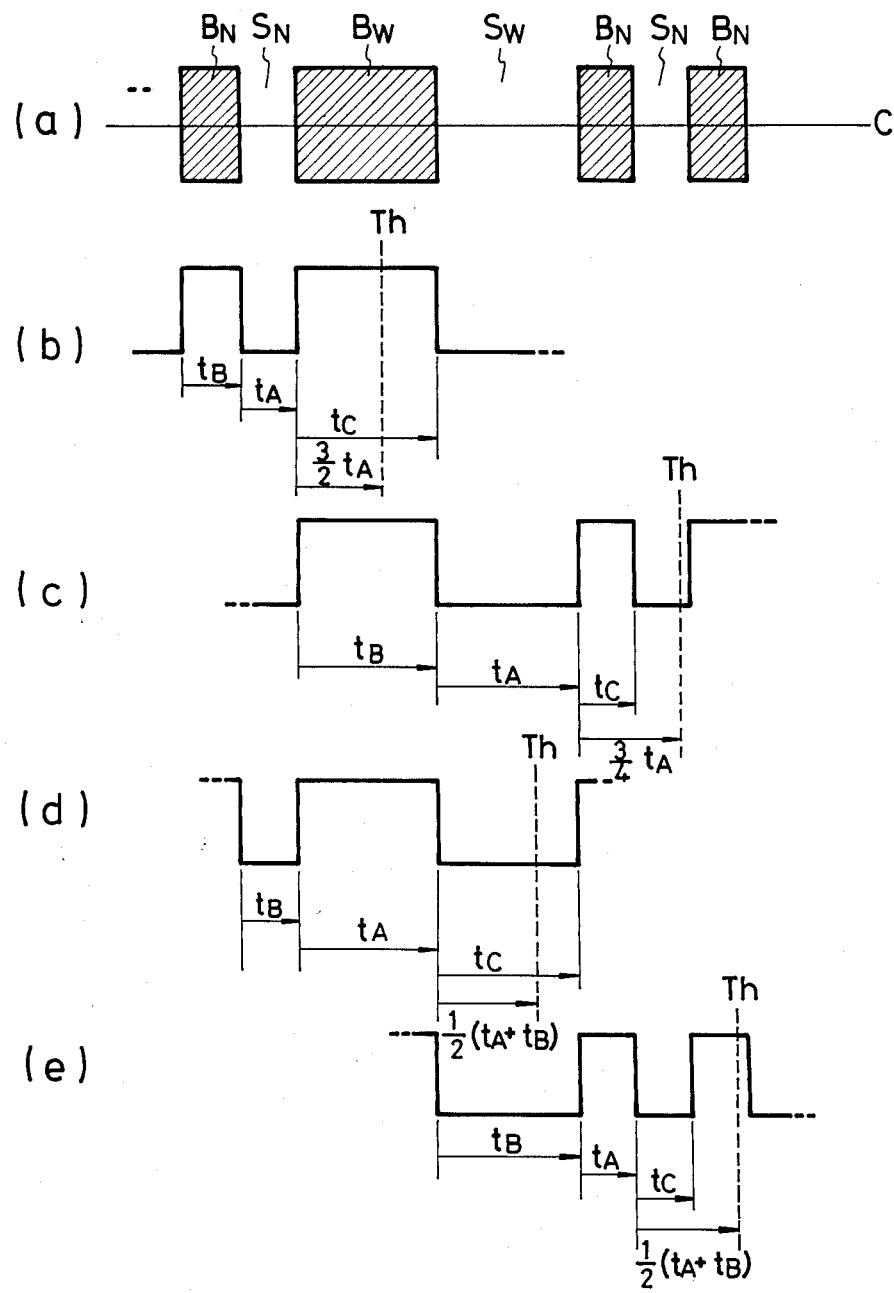

FIG. 26 is a view of the arrangement of the bit image converter 41 of the decoder unit 40 in FIG. 28, similarly to FIG. 42. In FIG. 26, a switching unit 51 stores the output signal of the comparator 48 on the signal line 2 through the signal line 51a in the previous bit image memory 52 when when a switching signal is inputted thereto. A previous bit image memory 52 applies the value of the previous bit image stored through the signal line 52a to a bit image discriminator 53. The bit image discriminator 53 discriminates the value of the bit image, (i) applies a signal through a signal line 53b to a switching unit 58 to connect the signal line 57a to the signal line 58a, and (ii) supplies a signal through a signal line 53b to the switching unit 61 when the bit image is "1", i.e., the wide bar or wide space of the bar code to connect the signal line 60a to the signal line 58a.

A switching unit 54 stores the present counted value of the counter memory 67 in the previous counter memory 55. The previous counted value stored in the previous counter memory 55 is applied through the signal line 55a to the multipliers 56, 59 to be tripled and applied to dividers 57 and 60.

The divider 57 divides the counted value tripled from the signal line 56a by 2, and applies the result a switching unit 58. The divider 60 divides the output tripled from the signal line 59a by 4, and applies the result to a switching unit 61.

As described above, the switching units 58, 60 are relatively operated according to the decisions of "1", "0" of the bit image discriminator 53, and either one is applied from the dividers 57, 60 to the adder 64.

Then, similarly to the description with respect to FIG. 42, the Th value of the previous Th value memory 63 and the counted values multiplied by 3/2 or ¾ from the divider 58 or 60 are added by the adder 64, the value then divided by the divider 65, i.e., the mean value of the previous threshold value is stored as new threshold value in the Th memory 66, the stored value is supplied to the comparator 68, which compares it with the present counted value form the signal line t, and the compared result is stored in the bit image memory 42 (FIG. 28) of the decoder unit through the signal line w. In other words, the comparator 68 starts operating by the signal from the signal line 8 to compare the counted value from the signal line t with the threshold value Th from the signal line 66a, (i) applies "1" to the signal line w (corresponding to wide bar or wide space) when the counted value is larger than the Th value, (ii) applies "0" to the signal line w (corresponding to the narrow bar or narrow space) when the counted value is smaller than Th value and outputs a switching signal, and further (iii) outputs a reset signal as a bit image error when the counted value=Th value. The reset signal resets the sections of the code reading apparatus of the invention for rereading.

Then, the operation of the embodiment will be described with reference to FIG. 27.

FIG. 27 is an explanatory view of the operation of FIG. 26, wherein FIG. 27(a) shows a bar code, where $B_N$ is a narrow bar, $S_N$ is a narrow space, $B_W$ is a wide bar, $S_W$ is a wide space, and an arrow C is a scanning direction. FIGS. 27(b), 27(c) are concept views for converting the counted value to the bit image, where $t_A$ is the counted value of $t_A$, $t_C$ is the counted value at present, and Th is the threshold value.

In FIG. 27(b), when reading the bar code in FIG. 27(a), if the previous bar or space is narrow, the value obtained by multiplying the counted value $t_A$ of the previous bar or space by 3/2 times is used as the threshold value Th to judge the present space or bar. Here, the value of $t_C$ larger than Th is judged as "1", and the value of $T_C$ smaller than Th is judged as "0".

At this time, the threshold value Th obtained in the route of the previous counter memory 55, the multiplier 56, the divider 57, the switching unit 58 and the adder 64 in FIG. 26 is used.

In FIG. 27(c), when the previous bar or space is wide, the value obtained by multiplying the counted value $t_A$ of the previous bar or space by ¾ times is used as the threshold value Th to judge the present space or bar.

Here, the value of $t_C$ larger than Th is judged as "1", and the value of $t_C$ smaller than Th is judged as "0". At this time, the threshold value Th obtained in the route of the previous counter memory 55, the multiplier 59, the divider 60, the switching unit 61 and the adder 64 of FIG. 26 is used.

In the embodiment as described above, the counted value of the bar or space for counting the clock read at present (now) is judged for the bit image by the threshold value decided whether the space or bar immediately before (previous time) is narrow or wide. Therefore, the arrangement can be simplified to raise the processing speed.

When the arrangement described above is operated in a time division manner with the functions by RAM, ROM, input/output units of a microprocessing IC. Thus, a compact apparatus can be provided to be practical.

According to the present invention as described above, the reset signal is applied to the decoding means if the numerical relation between the counted value started for counting by the counting means and the counted value counted between the edges responsive to the width of the code immediately before to discriminate the start to be improper. Thus, when the counted value responsive to the improper code is read in the decoding means, it is immediately reset to read new counted value, thereby enhancing the decoding probability of information read in the decoding means. The discrimination of whether the start is proper or not is not affected by the influence of the reading scanning speed in the detecting means of the code, and discriminated at the time responsive to the scanning speed. Further, the space for providing before the code to be displayed may be narrower than the prior art apparatus to reduce the errors of reading due to a contaminant and to be able to read the codes displayed in high density.

According to the final display discriminator of the bar code reader of the invention having second aspect, the final display is discriminated from the numerical relation between the counted value started for counting by the counting means and the counted value counted between the edges of the code immediately before. Therefore, the code is not affected by the influence of the reading scanning speed by detecting means, and the space for providing after the displayed code can be narrower than the apparatus of the prior art of this type. Thus, it can prevent the erroneous reading due to a contaminant, can read the code densified highly, and further discriminate the final display at a time responsive to the scanning speed.

Since the start and the stop is discriminated in the relation between the present counted value and the counted value immediately before, the width of the space (starting and stopping margins) to install the display code of the bar code can be reduced, and since the width of the bar or space for forming the code is not affected by the scanning speed of reading, the code display can be densified. Thus, the probability of contaminant to adhere to the code display is reduced to decrease the errors.

Further, according to the invention having the fourth aspect, the stop margin for discriminating the stop can be reduced, the reading probability can be improved to provide excellent functions of the code reading apparatus of the invention.

Moreover, according to the invention having fifth aspect, the start is discriminated by the relation between the counted value of the present bar or space and the counted value of the space or bar immediately before. Therefore, even if a contaminant exists on the starting space, since the start of reading is initialized from the start of normal bar or space, excellent functions are provided in the code reading apparatus of the invention.

In addition, according to the invention having sixth aspect, the arrangement that the overflow detection signal is used as the stop decision signal when the counter which outputs the counted value is overflowed in the stop discriminating mechanism for discriminating the end of the code when the counted value of the bar or space of the code becomes the magnification or more of the predetermined constant (wide bar or space/narrow bar or space) of the counted value of the space or bar immediately before. Thus, even if the scanning speed is slow to read the code and the code is correctly read, difficulties that rereading must be executed due to the reset and similar execution occurs when the width of the code is large can be eliminated to improve the reading rate. Further, the capacity of the clock counter can be reduced.

According to the invention having seventh aspect, it is not necessary to consider the before previous counted value as the prior art. Thus, the arrangement can be simplified, the processing speed is fast, the cost can be reduced to be adapted particularly for civil equipments of the code reading apparatus.

What is claimed is:

1. A code reading apparatus comprising detecting means for outputting a reading signal responsive to the code displayed on a medium, edge detecting means for detecting the edge of said reading signal, counting means for starting counting each edge detected by said edge detecting means, and discriminating means for outputting a rest signal to decoding means for reading to decode the counted value when the counted value started for counting by said counting means is a product or more of the quotient produced by dividing the allowable maximum width of the code by the allowable minimum width and the counted value counted between the edges immediately before by said counting means, when the quotient produced by dividing the counted value started for counting by said counting means by the counted value counted between the edges immediately before is a quotient or more produced by dividing the allowable maximum width of the code by the allowable minimum width, or when the quotient produced by dividing the counted value started for counting by the quotient produced by dividing the allowable maximum width of the code by the allowable minimum width is the counted value or more counted between the edges immediately before.

2. A code reading apparatus according to claim 1, wherein said discriminating means comprises multiplying means for multiplying the counted value counted by said counting means by a constant value of a quotient or more obtained by dividing the allowable maximum width of said code by the allowable minimum width, memory means for storing a product outputted from said multiplying means, and comparing means for comparing the memory value stored in said memory means with the counted value started for counting by said counting means.

3. A code reading apparatus comprising detecting means for outputting a reading signal responsive to the code displayed on a medium, edge detecting means for detecting the edge of said reading signal, counting means for starting counting each edge detected by said edge detecting means, and discriminating means for outputting a decision signal representing that the code displayed is final when the counted value started for counting by said counting means is a product or more of the quotient produced by dividing the allowable maximum width of the code by the allowable minimum width and the counted value counted between the edges immediately before by said counting means, when the quotient produced by dividing the counted value started for counting by said counting means by the counted value counted between the edges immediately before is a quotient or more produced by dividing the allowable maximum width of the code by the allowable minimum width, or when the quotient produced by dividing the counted value started for counting by the quotient produced by dividing the allowable maximum width of the code by the allowable minimum width is the counted value or more counted between the edges immediately before.

4. A code reading apparatus according to claim 3, wherein said discriminating means comprises memory means for storing the counted value counted between the edges, multiplying means for multiplying the counted value stored in said memory means by a constant value of a quotient or more obtained by dividing the allowable maximum width of said code by the allowable minimum width, and comparing means for comparing the product outputted from said multiplying means with the counted value started for counting by said counting means.

5. A code reading apparatus comprising a photoelectric conversion unit for reading a code displayed on a medium, a counter unit for counting a time responsive to the variation of a binary signal outputted from said photoelectric conversion unit by a clock signal, a start/stop discriminator for discriminating the start and the stop of reading according to the counted value outputted from said counter unit, and a decoder unit for decoding the counted value outputted from said counter unit, whereby said start/stop discriminator comprises means for resetting said counter at the time of start discriminating error, and means for operating said decoder at the time of stop discrimination.

6. A code reading apparatus according to claim 5, wherein said counter unit sequentially outputs the counted value to said start/stop discriminator during counting.

7. A code reading apparatus according to claim 5, wherein said counter unit outputs the counted value to said start/stop discriminator at each completion of counting the binary signal from said photoelectric conversion unit.

8. A code reading apparatus according to claim 5, wherein memory means for temporarily storing the counted values of the binary signal from said photoelectric conversion unit counted by said counter unit to output the same to said start/stop discriminator after the code is counted.

9. A code reading apparatus comprising a photoelectric conversion unit for reading a code displayed on a medium, a counter unit for counting a time responsive to the variation of a binary signal outputted from said photoelectric conversion unit by a clock signal, a start discriminator for discriminating the start of reading according to the counted value outputted from said counter unit, a stop discriminator for discriminating the stop of reading according to the counted value outputted from said counter unit, and a decoder unit for decoding the counted value outputted from said counter unit, whereby said start discriminator comprises means for resetting said counter unit at the time of start discrimination error, and said stop discriminator comprises means for operating said decoder unit at the time of stop discriminating error.

10. A code reading apparatus according to claim 9, wherein said counter unit sequentially outputs the counted value to said start and stop discriminators during counting.

11. A code reading apparatus according to claim 9, wherein said counter unit outputs the counted value to said start and stop discriminators at each completion of counting the binary signal from said photoelectric conversion unit.

12. A code reading apparatus according to claim 9, wherein memory means for temporarily storing the counted values of the binary signal from said photoelectric conversion unit counted by said counter unit to output the same to said start and stop discriminators after the code is counted.

13. A code reading apparatus comprising a photoelectric conversion unit for reading a code displayed on a medium, a counter unit for counting a time responsive to the variation of a binary signal outputted from said photoelectric conversion unit by a clock signal, a start discriminator for discriminating the start of reading according to the counted value outputted from said counter unit, a stop discriminator for discriminating the stop of reading according to the counted value outputted from said counter unit, and a decoder unit for decoding the counted value outputted from said counter unit, whereby said stop discriminator comprises minimum counted value memory means for means for storing the minimum counted value of the code read so far, and comparing means for comparing the value obtained by multiplying the minimum counted value stored in said minimum counted value memory means by a predetermined constant with the present counted value to discriminate the end of the code when the counted value of the code read at present is larger than the value obtained by multiplying the minimum counted value by the constant.

14. A code reading apparatus comprising a photoelectric conversion unit for reading a code displayed on a medium, a counter unit for counting a time responsive to the variation of a binary signal outputted from said photoelectric conversion unit by a clock signal, a start discriminator for discriminating the start of reading according to the counted value outputted from said counter unit, a stop discriminator for discriminating the stop of reading according to the counted value outputted from said counter unit, and a decoder unit for decoding the counted value outputted from said counter unit, further comprising memory means for storing the minimum counted value of the code at the maximum scanning speed of said photoelectric conversion unit, comparing means for comparing the minimum counted value stored in said memory means with the present counted value to apply the present counted value to said decoder unit only when the present counted value is larger than the minimum counted value.

15. A code reading apparatus comprising a photoelectric conversion unit for reading a code displayed on a medium, a counter unit for counting a time responsive to the variation of a binary signal outputted from said photoelectric conversion unit by a clock signal, a start discriminator for discriminating the start of reading according to the counted value outputted from said counter unit, a stop discriminator for discriminating the stop of reading according to the counted value outputted from said counter unit, and a decoder unit for decoding the counted value outputted from said counter unit, whereby said start discriminator comprises present counted value memory means for storing the counted value of the binary level signal corresponding to the code of the present bar or space, previous counted value memory means for storing the counted value of the binary level signal corresponding to the code of previous space or bar, and comparing means for comparing the value obtained by dividing the counted value stored in said previous counted value memory means by a predetermined constant with the counted value stored in said present counted value memory means to discriminate the start of the code when the present counted value is smaller than the value obtained by dividing the present counted value by the predetermined constant.

16. A code reading apparatus comprising photoelectric conversion means for reading a code displayed on a medium, counter means for counting a time responsive to the variation of a binary outputted from said photoelectric conversion means by a clock signal, reading discriminating means for discriminating the start and the stop of reading according to the counted value outputted from said counter means, and decoder means for decoding the counted value outputted from said counter means, whereby said counter means comprises a counter for counting the clock signal, overflow detecting means having a constant register and an overflow comparator, switching means for supplying the overflow detection output as the stop decision signal of reading the overflow detection output to said decoder means when the overflow detection output exists in said overflow before said discriminating means discriminates the stop of reading to eliminate the rereading due to the overflow of said counter before discriminating the stop of reading of said discriminating means.

17. A code reading apparatus comprising a photoelectric conversion unit for reading a code displayed on a medium, a counter unit for counting a time responsive to the variation of a binary signal outputted from said photoelectric conversion unit by a clock signal, a start discriminator for discriminating the start of reading according to the counted value outputted from said counter unit, a stop discriminator for discriminating the stop of reading according to the counted value outputted from said counter unit, and a decoder unit for decoding the counted value outputted from said counter unit, whereby said decoder unit comprises a bit image converter for converting the counter value from said counter unit into a bit image, said bit image converter comprised discriminating means for discriminating the previous bar/space is narrow bar/narrow space or wide bar/wide space, and means for selecting the threshold value for discriminating the bit image of this time bar/space in response to the decision of said discriminating means.

* * * * *

UNITED STATES PATENT AND TRADEMARK OFFICE
CERTIFICATE OF CORRECTION

PATENT NO. : 4,859,840

DATED : August 22, 1989

INVENTOR(S) : Kazuo Hasegawa et al

It is certified that error appears in the above-identified patent and that said Letters Patent is hereby corrected as shown below:

Column 56, line 35, insert -- detector -- after "overflow".

Column 51, "counter" should read -- counted --.

Column 56, line 53, "comprised" should read --comprises--.

Signed and Sealed this

Twenty-eighth Day of August, 1990

Attest:

HARRY F. MANBECK, JR.

*Attesting Officer*     *Commissioner of Patents and Trademarks*